US012362562B2

(12) United States Patent
Baumgartner et al.

(10) Patent No.: US 12,362,562 B2
(45) Date of Patent: Jul. 15, 2025

(54) FREQUENCY RESPONSE CONTROL SYSTEM WITH CLIPPING PARAMETER DETERMINATION

(71) Applicant: Johnson Controls Technology Company, Auburn Hills, MI (US)

(72) Inventors: Ryan A. Baumgartner, Milwaukee, WI (US); Michael J. Wenzel, Grafton, WI (US); Kirk H. Drees, Cedarburg, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 851 days.

(21) Appl. No.: 15/887,575

(22) Filed: Feb. 2, 2018

(65) Prior Publication Data

US 2019/0245368 A1    Aug. 8, 2019

(51) Int. Cl.
  *H02J 3/12*    (2006.01)
  *H02J 3/24*    (2006.01)
  (Continued)

(52) U.S. Cl.
  CPC .................. *H02J 3/12* (2013.01); *H02J 3/24* (2013.01); *H02J 3/241* (2020.01); *H02J 3/32* (2013.01);
  (Continued)

(58) Field of Classification Search
  CPC .... H02J 7/0068; H02J 3/12; H02J 3/32; H02J 3/28; H02J 2203/20; H02J 3/24;
  (Continued)

(56) References Cited

U.S. PATENT DOCUMENTS

| 7,580,775 B2 | 8/2009 | Kulyk et al. |
| 7,894,946 B2 | 2/2011 | Kulyk et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Extended European Search Report for EP Application No. 19154979.9, mailed Jun. 12, 2019, 8 pages.

(Continued)

*Primary Examiner* — Richard Isla
*Assistant Examiner* — Manuel Hernandez
(74) *Attorney, Agent, or Firm* — Foley & Lardner LLP

(57) ABSTRACT

A frequency response optimization system includes a battery, a power inverter, and a frequency response controller. The battery is configured to store and discharge electric power. The power inverter is configured to control an amount of the electric power stored or discharged from the battery. The frequency response controller includes a high level controller configured to determine values of clipping parameters and a low level controller configured to use the values of the clipping parameters to modify battery power setpoints. The power inverter is configured to use the modified battery power setpoints to control the amount of the electric power stored or discharged from the battery.

21 Claims, 8 Drawing Sheets

(51) Int. Cl.
*H02J 3/28* (2006.01)
*H02J 3/32* (2006.01)
*H02J 7/00* (2006.01)

(52) U.S. Cl.
CPC .............. *H02J 7/0068* (2013.01); *H02J 3/28* (2013.01); *H02J 2203/20* (2020.01)

(58) Field of Classification Search
CPC .......... H02J 3/241; G05B 15/02; Y02E 60/00; Y04S 40/20
USPC ................................................ 320/128, 135
See application file for complete search history.

(56) References Cited

U.S. PATENT DOCUMENTS

| | | | |
|---|---|---|---|
| 8,527,108 B2 | 9/2013 | Kulyk et al. | |
| 8,527,109 B2 | 9/2013 | Kulyk et al. | |
| 8,903,554 B2 | 12/2014 | Stagner | |
| 8,918,223 B2 | 12/2014 | Kulyk et al. | |
| 9,110,647 B2 | 8/2015 | Kulyk et al. | |
| 9,429,923 B2 | 8/2016 | Ward et al. | |
| 9,447,985 B2 | 9/2016 | Johnson | |
| 9,703,339 B2 | 7/2017 | Kulyk et al. | |
| 10,056,757 B2* | 8/2018 | Sakuma ............... | H02J 13/0006 |
| 10,139,877 B2 | 11/2018 | Kulyk et al. | |
| 10,614,146 B2* | 4/2020 | Song ....................... | G06F 17/11 |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2006/0087291 A1* | 4/2006 | Yamauchi ............... | B60L 53/20 320/137 |
| 2007/0145954 A1* | 6/2007 | Kawahara ............. | H02J 7/0021 320/150 |
| 2012/0200160 A1* | 8/2012 | Pratt ....................... | B60L 53/51 307/48 |
| 2014/0162091 A1* | 6/2014 | Hatta ................. | H01M 10/3909 429/50 |
| 2015/0380956 A1* | 12/2015 | Kaji ......................... | H02J 7/007 320/134 |
| 2016/0211668 A1* | 7/2016 | Becker ..................... | H02J 7/007 |
| 2016/0365726 A1* | 12/2016 | Bamberger ........... | H02J 7/0068 |
| 2016/0377306 A1* | 12/2016 | Drees ....................... | H02J 3/32 700/295 |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2017/0285111 A1* | 10/2017 | Fife ......................... | H02J 3/14 |
| 2017/0317528 A1* | 11/2017 | Fife ......................... | H02J 3/00 |
| 2018/0031641 A1 | 2/2018 | Drees | |
| 2018/0034285 A1 | 2/2018 | Baumgartner et al. | |
| 2018/0034286 A1 | 2/2018 | Dorneanu et al. | |
| 2018/0138710 A1* | 5/2018 | Kocarev ................... | H02J 3/32 |

FOREIGN PATENT DOCUMENTS

| | | |
|---|---|---|
| EP | 3 186 687 A4 | 7/2017 |
| EP | 3 248 260 A1 | 11/2017 |
| EP | 3 497 377 A1 | 6/2019 |
| WO | WO-2014/019607 A1 | 2/2014 |
| WO | WO-2017/026287 A1 | 2/2017 |
| WO | WO-2017/062896 A1 | 4/2017 |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

U.S. Appl. No. 15/474,511, filed Mar. 30, 2017.

U.S. Appl. No. 15/663,496, filed Jul. 28, 2017.

Office Action on EP 19154979.9, dated Oct. 20, 2020, 6 pages.

EP Office Action on EP Appl. Ser. No. 19154979.9 dated Dec. 22, 2021 (8 pages).

Calma, "Tesla promises cars that connect to the grid, even if Elon Musk doesn't really want them to," The Verge, Sep. 23, 2020, https://www.theverge.com/2020/9/23/21451642/tesla-ev-electric-vehicle-energy-grid-battery-day-elon-musk; retrieved from the internet May 1, 2023 (7 pages).

Coolinglogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).

Delbert, "Tesla's Virtual Power Plant Is Already a Success, and it's only getting bigger," Popular Mechanics, Apr. 10, 2020, https://www.popularmechanics.com/science/a31977069/tesla-virtual-power- plant/; retrieved from the internet May 1, 2023 (7 pages).

Incomplete File of Communication with Various Companies, etc. in 2016 - 2021, URL: http://coolinglogic.com/documents/22072101_ Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-

(56) References Cited

OTHER PUBLICATIONS

Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building- Automation-System -- Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building- Automation-System-Plymouth-Michigan.html, retrieved from internet Oct. 27, 2022 (8 pages).
Johnson Heating and Cooling L.L.C., "Jla Medical Building Building Automation," URL: http://cooljohnson.com/Building-Automation-Systems-Michigan/Waterford-Michigan/Building- Automation-System -- JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation- Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township- Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation- System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building- Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building- Automation-Systems-WIM.html, retrieved from internet Oct. 27, 2022 (3 pages).
Johnson Heating and Cooling, Llc, "Building Automation Clawson Michigan 2.0," URL: http://cooljohnson.com/Building-Automation-Systems-Michigan/Clawson-Michigan/Building- Automation-Clawson-Manor-2.html, retrieved from the internet Oct. 27, 2022 (6 pages).
Johnson Heating and Cooling, Llc, "Building Automation Images Clawson Michigan 2.0," URL: http://cooljohnson.com/Building-Automation-Systems-Michigan/Clawson-Michigan/Building- Automation-Clawson-Manor-2-Images.html, retrieved from the internet Oct. 27, 2022 (14 pages).
Johnson Heating and Cooling, Llc, "Building Automation System Clawson Michigan Clawson Manor," URL: http://cooljohnson.com/Building-Automation-Systems-Michigan/Clawson- Michigan/Building-Automation-System-Clawson-Manor.html; retrieved from the internet Oct. 27, 2022 (3 pages).
Johnson Heating and Cooling, Llc, "Building Automation System in Michigan Images," URL: http://cooljohnson.com/Building-Automation-Systems-Michigan/Macomb-County-Michigan/Building- Automation-Images.html; retrieved from the internet Oct. 27, 2022 (13 pages).
Johnson Heating and Cooling, Llc, "Building Automation System in Michigan," URL: http://cooljohnson.com/Building-Automation-Systems-Michigan/Macomb-County-Michigan/Building- Automation-Confidential-Customer.html; retrieved from the internet, Oct. 27, 2022 (4 pages).
Johnson Solid State Llc, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State Llc, "Building Automation Gui," Url: http://cooljohnson.com/Video/Building_Automation/Confidential_Customer_BLD_2/Building_Automation_GUI.mp4, retrieved from internet Oct. 27, 2022 (24 pages).
Johnson Solid State Llc, "Cooling Logic Overview," URL: http://coolinglogic.com/documents/CoolingLogic_Overview_High_Quality.mp4, retrieved from internet Oct. 27, 2022 (16 pages).
Johnson Solid State Llc, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, Llc, Url: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, Llc, Url: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, Llc, Url: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford- Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Lambert, "Honda is working on bi-directional charging technology for its electric vehicles, installs station at HQ," Elektrek, Dec. 7, 2017, https://electrek.co/2017/12/07/honda-bi-directional- charging-technology-electric-vehicles/; retrieved from the internet May 1, 2023 (6 pages).
Lambert, "Nissan launches 'Nissan Energy' to commercialize vehicle-to-home/building with the Leaf," Elektrek, Nov. 28, 2018, https://electrek.co/2018/11/28/nissan-energy-leaf-vehicle-to- home-building/, retrieved from the internet May 1, 2023 (8 pages).
Lambert, "Tesla announces unlimited overnight charging for $30 per month," Elektrek, Mar. 1, 2023, https://electrek.co/2023/03/01/tesla-unlimited-overnight-charging-30-month/; retrieved from the internet May 1, 2023 (6 pages).
Lambert, "Tesla launches new feature to help solar homeowners charge with excess solar power," Elektrek, Mar. 16, 2023, https://electrek.co/2023/03/16/tesla-launches-feature-help-solar- homeowners-charge-excess-solar-power/; retrieved form the internet May 1, 2023 (6 pages).
Lopatto, "I went to Australia to test out Tesla's vision of the future," The Verge, Jun. 25, 2019, https://www.theverge.com/2019/6/25/18715585/tesla-australia-renewable-energy-houses-electrical- grid-battery-installation; retrieved from the internet May 1, 2023 (22 pages).
Lyons, "Here are Tesla's biggest announcements from Battery Day," The Verge, Sep. 22, 2020, https://www.theverge.com/2020/9/22/21450840/tesla-battery-day-production-elon-musk-tabless-range-cathode-cobalt-plaid; retrieved for the internet on May 1, 2023 (6 pages).
Shahan, "Tesla Cto Jb Straubel on Why EVs Selling Electricity to The Grid Is Not As Swell As It Sounds," Clean Technica, Aug. 22, 2016, https://cleantechnica.com/2016/08/22/vehicle-to-grid- used-ev-batteries-grid-storage/; retrieved from the internet May 1, 2023 (13 pages).
TESLA - "How Powerwall Works" tesla.com, Publication Date: Unknown; first date this website was archived on the Wayback

(56) References Cited

OTHER PUBLICATIONS

Machine was May 13, 2020, https://www.tesla.com/support/energy/powerwall/learn/how-powerwall-works; retrieved from the internet on May 1, 2023 (4 pages).

Walton, "Tesla software update allows Powerwall 2 owners to optimize for time-varying rates," Utility Dive, May 15, 2018, https://www.utilitydive.com/news/tesla-software-update-allows-powerwall-2-owners-to-optimize-for-time-varyin/523588/; retrieved from the internet May 1, 2023 (4 pages).

* cited by examiner

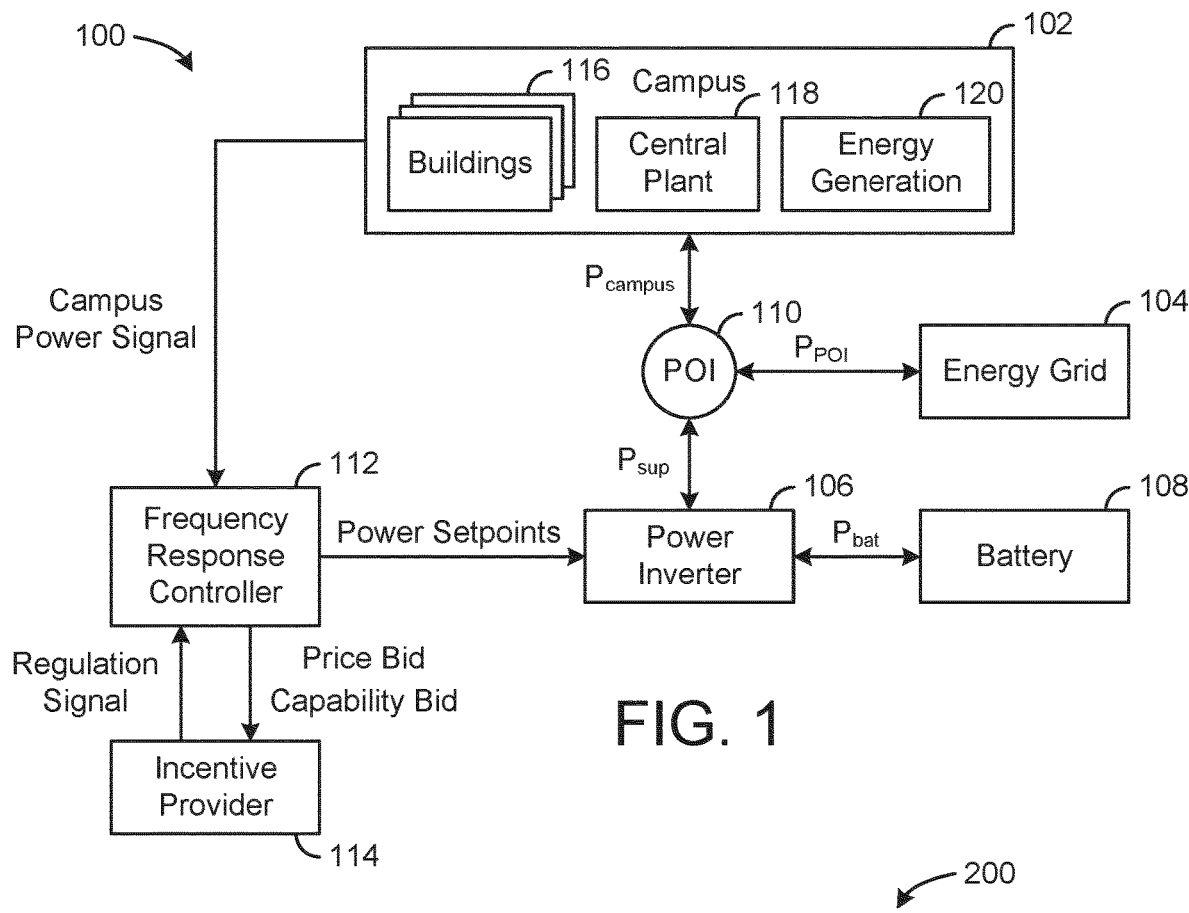
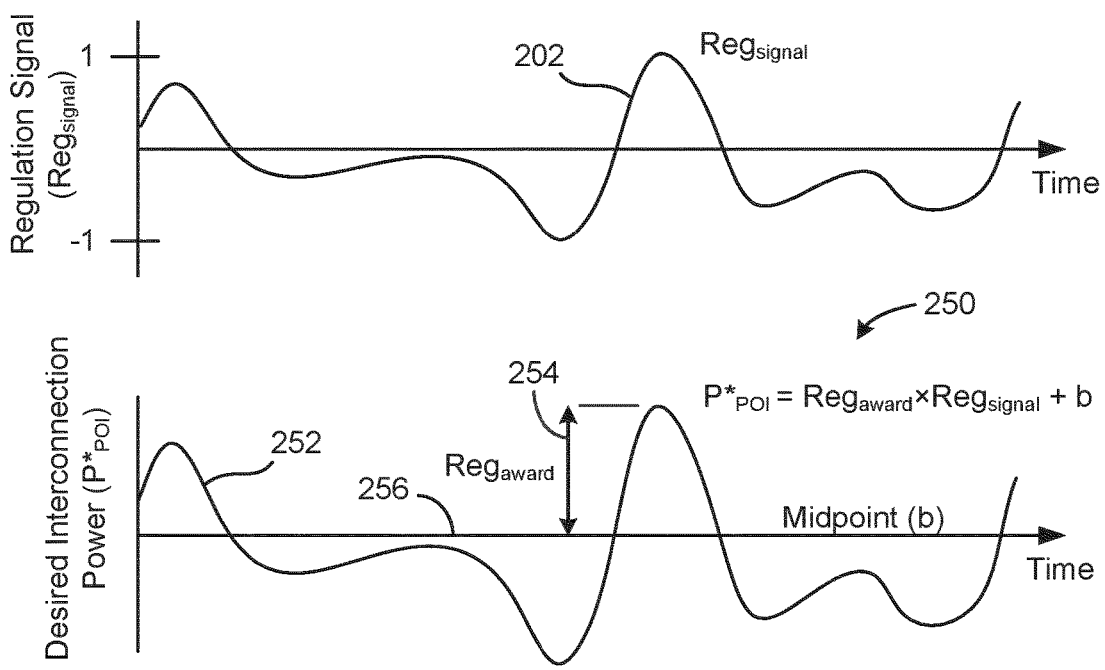

FREQUENCY RESPONSE CONTROL SYSTEM WITH CLIPPING PARAMETER DETERMINATION

BACKGROUND

The present disclosure relates generally to frequency response systems configured to add or remove electricity from an energy grid, and more particularly to a frequency response controller that determines optimal power setpoints for a battery power inverter in a frequency response system.

Stationary battery storage has several purposes when integrated with campus electrical distribution. For example, battery storage can be used to participate in a local frequency response program. Battery storage can be used to reduce the energy used during times when electricity is expensive and to reduce the electrical demand of a building to reduce the demand charge incurred.

SUMMARY

One implementation of the present disclosure is a frequency response control system including a battery, a power inverter, and a frequency response controller. The battery is configured to store and discharge electric power. The power inverter is configured to control an amount of the electric power stored or discharged from the battery at each of a plurality of time steps during a frequency response period. The frequency response controller includes a high level controller configured to determine values of clipping parameters and a low level controller configured to use the values of the clipping parameters to modify battery power setpoints. The power inverter is configured to use the modified battery power setpoints to control the amount of the electric power stored or discharged from the battery.

In some embodiments, the high level controller is configured to determine the values of the clipping parameters by generating an objective function that accounts for both frequency response revenue and a cost of battery degradation as a function of the battery power setpoints modified by the clipping parameters and optimizing the objective function to generate the values of the clipping parameters.

In some embodiments, the clipping parameters include at least one of a battery charging power parameter that defines a maximum allowable rate at which the electric power can be stored in the battery or a battery discharging power parameter that defines a maximum allowable rate at which the electric power can be discharged from the battery.

In some embodiments, using the values of the clipping parameters to modify the battery power setpoints includes comparing a battery power setpoint to the battery charging power parameter and the battery discharging power parameter, setting the battery power setpoint equal to the battery charging power parameter in response to a determination that the battery power setpoint would cause the battery to charge at a rate that violates the battery charging power parameter, and setting the battery power setpoint equal to the battery discharging power parameter in response to a determination that the battery power setpoint would cause the battery to discharge at a rate that violates the battery discharging power parameter.

In some embodiments, the clipping parameters include at least one of a change in charging power parameter that defines a maximum change in the amount of electric power stored in the battery between consecutive time steps or a change in discharging power parameter that defines a maximum change in the amount of electric power discharged from the battery between consecutive time steps.

In some embodiments, using the values of the clipping parameters to modify the battery power setpoints includes calculating a difference between a first battery power setpoint for a first time step and a second battery power setpoint for a second time step consecutive with the first time step, comparing the difference to the change in charging power parameter, and setting the second battery power setpoint equal to the first battery power setpoint plus or minus the change in charging power parameter in response to a determination that the difference exceeds the change in charging power parameter.

In some embodiments, using the values of the clipping parameters to modify the battery power setpoints includes calculating a difference between a first battery power setpoint for a first time step and a second battery power setpoint for a second time step consecutive with the first time step, comparing the difference to the change in discharging power parameter, and setting the second battery power setpoint equal to the first battery power setpoint plus or minus the change in discharging power parameter in response to a determination that the difference exceeds the change in discharging power parameter.

In some embodiments, the frequency response controller is configured to receive a frequency regulation signal from an incentive provider and transform the frequency regulation signal into a power signal comprising a time series of the battery power setpoints.

In some embodiments, the frequency response controller is configured to adjust the modified battery power setpoints to reduce a delay between a first time at which the frequency regulation signal or the power signal has a value of zero and a second time at which the modified battery power setpoints have a value of zero.

In some embodiments, adjusting the modified battery power setpoints includes predicting a number of time steps between a current time step and a future time step at which the frequency regulation signal or the power signal has a value of zero, setting a zero cross bound based on the predicted number of time steps and a maximum allowable change in the modified battery power setpoints between consecutive time steps, and causing the modified battery power setpoints to begin approaching zero in response to a determination that a modified battery power setpoint for the current time step is outside the zero cross bound.

Another implementation of the present disclosure is a method for controlling an amount of electric power stored or discharged from a battery in a frequency response control system. The method includes operating a high level controller to determine values of clipping parameters, providing the values of the clipping parameters from the high level controller to a low level controller, operating the low level controller to modify battery power setpoints using the clipping parameters, and using the modified battery power setpoints to control the amount of the electric power stored or discharged from the battery.

In some embodiments, operating the high level controller to determine the values of the clipping parameters includes generating an objective function that accounts for both frequency response revenue and a cost of battery degradation as a function of the battery power setpoints modified by the clipping parameters and optimizing the objective function to generate the values of the clipping parameters.

In some embodiments, the clipping parameters include at least one of a battery charging power parameter that defines a maximum allowable rate at which the electric power can be stored in the battery or a battery discharging power parameter that defines a maximum allowable rate at which the electric power can be discharged from the battery.

In some embodiments, using the values of the clipping parameters to modify the battery power setpoints includes comparing a battery power setpoint to the battery charging power parameter and the battery discharging power parameter, setting the battery power setpoint equal to the battery charging power parameter in response to a determination that the battery power setpoint would cause the battery to charge at a rate that violates the battery charging power parameter, and setting the battery power setpoint equal to the battery discharging power parameter in response to a determination that the battery power setpoint would cause the battery to discharge at a rate that violates the battery discharging power parameter.

In some embodiments, the clipping parameters include at least one of a change in charging power parameter that defines a maximum change in the amount of electric power stored in the battery between consecutive time steps or a change in discharging power parameter that defines a maximum change in the amount of electric power discharged from the battery between consecutive time steps.

In some embodiments, using the values of the clipping parameters to modify the battery power setpoints includes calculating a difference between a first battery power setpoint for a first time step and a second battery power setpoint for a second time step consecutive with the first time step, comparing the difference to the change in charging power parameter, and setting the second battery power setpoint equal to the first battery power setpoint plus or minus the change in charging power parameter in response to a determination that the difference exceeds the change in charging power parameter.

In some embodiments, using the values of the clipping parameters to modify the battery power setpoints includes calculating a difference between a first battery power setpoint for a first time step and a second battery power setpoint for a second time step consecutive with the first time step, comparing the difference to the change in discharging power parameter, and setting the second battery power setpoint equal to the first battery power setpoint plus or minus the change in discharging power parameter in response to a determination that the difference exceeds the change in discharging power parameter.

In some embodiments, the method includes receiving a frequency regulation signal from an incentive provider and transforming the frequency regulation signal into a power signal comprising a time series of the battery power setpoints.

In some embodiments, the method includes adjusting the modified battery power setpoints to reduce a delay between a first time at which the frequency regulation signal or the power signal has a value of zero and a second time at which the modified battery power setpoints have a value of zero.

In some embodiments, adjusting the modified battery power setpoints includes predicting a number of time steps between a current time step and a future time step at which the frequency regulation signal or the power signal has a value of zero, setting a zero cross bound based on the predicted number of time steps and a maximum allowable change in the modified battery power setpoints between consecutive time steps, and causing the modified battery power setpoints to begin approaching zero in response to a determination that a modified battery power setpoint for the current time step is outside the zero cross bound.

Another implementation of the present disclosure is a multi-building management system. The system includes building equipment that operate to affect a variable state or condition within one or more buildings, a battery configured to store and discharge electric power for use in powering at least one of the building equipment or the one or more buildings, a power inverter configured to control an amount of the electric power stored or discharged from the battery at each of a plurality of time steps during a frequency response period, and a frequency response controller. The frequency response controller includes a high level controller configured to determine values of clipping parameters and a low level controller configured to use the values of the clipping parameters to modify battery power setpoints. The power inverter is configured to use the modified battery power setpoints to control the amount of the electric power stored or discharged from the battery.

In some embodiments, the high level controller is configured to determine the values of the clipping parameters by generating an objective function that accounts for both frequency response revenue and a cost of battery degradation as a function of the battery power setpoints modified by the clipping parameters and optimizing the objective function to generate the values of the clipping parameters.

In some embodiments, the clipping parameters include at least one of a battery charging power parameter that defines a maximum allowable rate at which the electric power can be stored in the battery or a battery discharging power parameter that defines a maximum allowable rate at which the electric power can be discharged from the battery.

In some embodiments, using the values of the clipping parameters to modify the battery power setpoints includes comparing a battery power setpoint to the battery charging power parameter and the battery discharging power parameter, setting the battery power setpoint equal to the battery charging power parameter in response to a determination that the battery power setpoint would cause the battery to charge at a rate that violates the battery charging power parameter, and setting the battery power setpoint equal to the battery discharging power parameter in response to a determination that the battery power setpoint would cause the battery to discharge at a rate that violates the battery discharging power parameter.

In some embodiments, the clipping parameters include at least one of a change in charging power parameter that defines a maximum change in the amount of electric power stored in the battery between consecutive time steps or a change in discharging power parameter that defines a maximum change in the amount of electric power discharged from the battery between consecutive time steps.

In some embodiments, using the values of the clipping parameters to modify the battery power setpoints includes calculating a difference between a first battery power setpoint for a first time step and a second battery power setpoint for a second time step consecutive with the first time step, comparing the difference to the change in charging power parameter, and setting the second battery power setpoint equal to the first battery power setpoint plus or minus the change in charging power parameter in response to a determination that the difference exceeds the change in charging power parameter.

In some embodiments, using the values of the clipping parameters to modify the battery power setpoints includes calculating a difference between a first battery power setpoint for a first time step and a second battery power setpoint for a second time step consecutive with the first time step, comparing the difference to the change in discharging power parameter, and setting the second battery power setpoint equal to the first battery power setpoint plus or minus the change in discharging power parameter in response to a determination that the difference exceeds the change in discharging power parameter.

In some embodiments, the frequency response controller is configured to receive a frequency regulation signal from an incentive provider and transform the frequency regulation signal into a power signal comprising a time series of the battery power setpoints.

In some embodiments, the frequency response controller is configured to adjust the modified battery power setpoints to reduce a delay between a first time at which the frequency regulation signal or the power signal has a value of zero and a second time at which the modified battery power setpoints have a value of zero.

In some embodiments, adjusting the modified battery power setpoints includes predicting a number of time steps between a current time step and a future time step at which the frequency regulation signal or the power signal has a value of zero, setting a zero cross bound based on the predicted number of time steps and a maximum allowable change in the modified battery power setpoints between consecutive time steps, and causing the modified battery power setpoints to begin approaching zero in response to a determination that a modified battery power setpoint for the current time step is outside the zero cross bound.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 1 is a block diagram of a frequency response optimization system, according to an exemplary embodiment.

FIG. 2 is a graph of a regulation signal which may be provided to the system of FIG. 1 and a frequency response signal which may be generated by the system of FIG. 1, according to an exemplary embodiment.

DETAILED DESCRIPTION

Frequency Response Optimization

Figure 3:
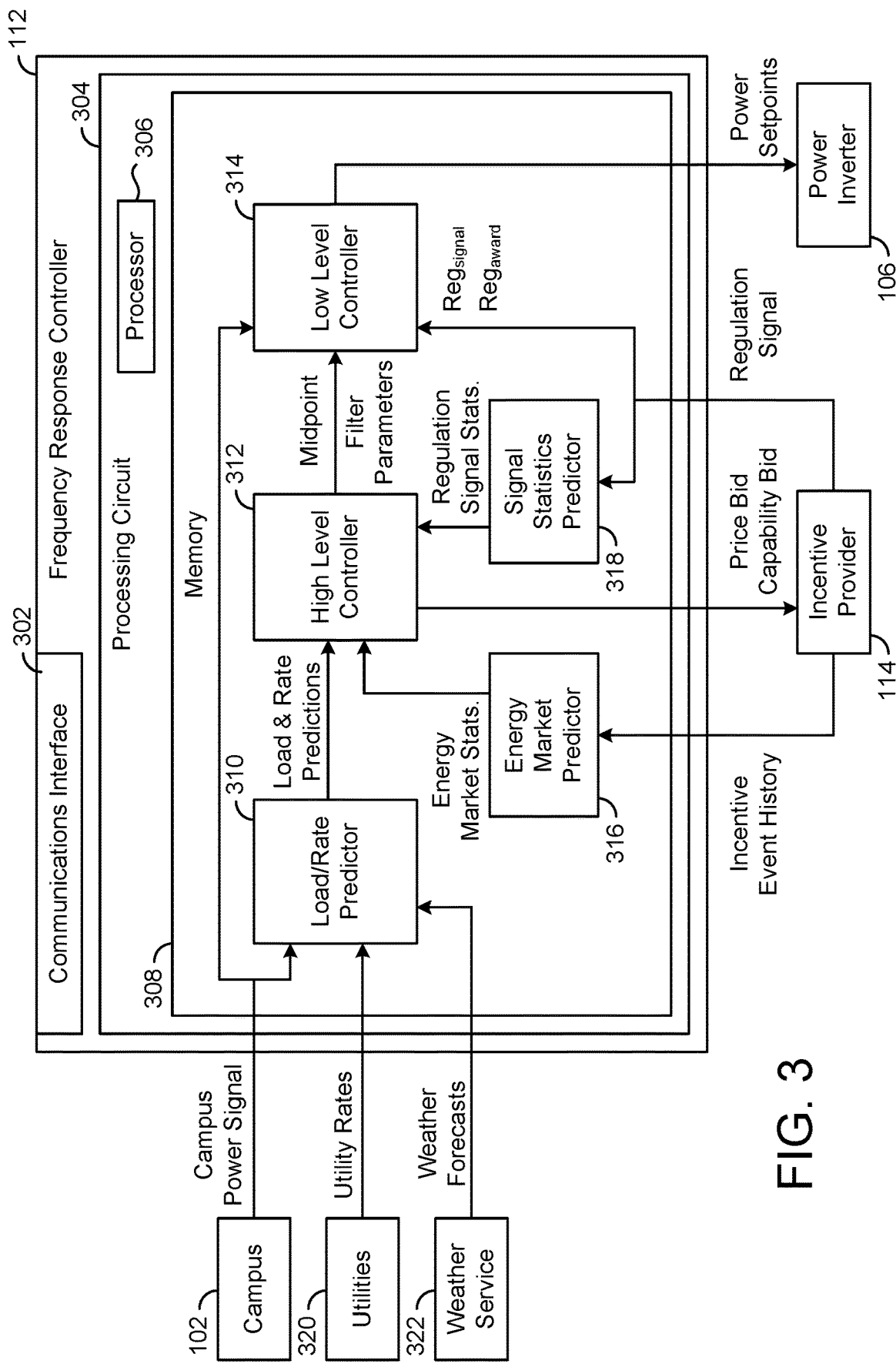
FIG. 3 is a block diagram illustrating the frequency response controller of FIG. 1 in greater detail, according to an exemplary embodiment.

Referring to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment. In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593, titled "Building Management System for Forecasting Time Series Values of Building Variables" and filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609, titled "High Level Central Plant Optimization" and filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some instances, power inverter 106 receives a DC power output from battery 108 and converts the DC power output to an AC power output that can be fed into energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{bat}$ is the battery power and $P_{loss}$ is the power loss in the battery system (e.g., losses in power inverter 106 and/or battery 108). $P_{sup}$ may be positive is power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation, described in greater detail below.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between -1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from -1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}=0.5$) may indicate that system 100 is requested to add 5 MW of power at POI 110 relative to midpoint b (e.g., $P_{POI}*=10\ MW\times 0.5+b$), whereas a regulation signal value of -0.3 may indicate that system 100 is requested to remove 3 MW of power from POI 110 relative to midpoint b (e.g., $P_{POI}*=10\ MW\times 0.3+b$).

Graph 250 illustrates the desired interconnection power $P_{POI}*$ 252 as a function of time. $P_{POI}*$ 252 may be calculated by frequency response controller 112 based on $Reg_{signal}$ 202, $Reg_{award}$ 254, and a midpoint b 256. For example, controller 112 may calculate $P_{POI}*$ 252 using the following equation:

$$P_{POI}* = Reg_{award} \times Reg_{signal} + b$$

where $P_{POI}*$ represents the desired power at POI 110 (e.g., $P_{POI}* = P_{sup} + P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., S/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary processes for calculating and/or optimizing midpoint b under both the constant SOC scenario and the variable SOC scenario are described in greater detail with reference to FIGS. 3-4A.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}*=Reg_{award} \times Reg_{signal}+b$$

where $P_{POI}*=P_{sup}+P_{campus}$. Positive values of $P_{POI}*$ indicate energy flow from POI 110 to energy grid 104. Positive values of $P_{sup}$ and $P_{campus}$ indicate energy flow to POI 110 from power inverter 106 and campus 102, respectively. In other embodiments, controller 112 generates the power setpoints using the equation:

$$P_{POI}*=Reg_{award} \times Res_{FR}+b$$

where $Res_{FR}$ is an optimal frequency response generated by optimizing a value function (described in greater detail below). Controller 112 may subtract P campus from $P_{POI}*$ to generate the power setpoint for power inverter 106 (i.e., $P_{sup}=P_{POI}*-P_{campus}$). The power setpoint for power inverter 106 indicates the amount of power that power inverter 106 is to add to POI 110 (if the power setpoint is positive) or remove from POI 110 (if the power setpoint is negative).

Frequency Response Controller

Referring now to FIG. 3, a block diagram illustrating frequency response controller 112 in greater detail is shown, according to an exemplary embodiment. Frequency response controller 112 may be configured to perform an optimization process to generate values for the bid price, the capability bid, and the midpoint b. In some embodiments, frequency response controller 112 generates values for the bids and the midpoint b periodically using a predictive optimization scheme (e.g., once every half hour, once per frequency response period, etc.). Controller 112 may also calculate and update power setpoints for power inverter 106 periodically during each frequency response period (e.g., once every two seconds).

In some embodiments, the interval at which controller 112 generates power setpoints for power inverter 106 is significantly shorter than the interval at which controller 112 generates the bids and the midpoint b. For example, controller 112 may generate values for the bids and the midpoint b every half hour, whereas controller 112 may generate a power setpoint for power inverter 106 every two seconds. The difference in these time scales allows controller 112 to use a cascaded optimization process to generate optimal bids, midpoints b, and power setpoints.

In the cascaded optimization process, a high level controller 312 determines optimal values for the bid price, the capability bid, and the midpoint b by performing a high level optimization. High level controller 312 may select midpoint b to maintain a constant state-of-charge in battery 108 (i.e., the same state-of-charge at the beginning and end of each frequency response period) or to vary the state-of-charge in order to optimize the overall value of operating system 100 (e.g., frequency response revenue minus energy costs and battery degradation costs). High level controller 312 may also determine filter parameters for a signal filter (e.g., a low pass filter) used by a low level controller 314.

Low level controller 314 uses the midpoint b and the filter parameters from high level controller 312 to perform a low level optimization in order to generate the power setpoints for power inverter 106. Advantageously, low level controller 314 may determine how closely to track the desired power $P_{POI}*$ at the point of interconnection 110. For example, the low level optimization performed by low level controller 314 may consider not only frequency response revenue but also the costs of the power setpoints in terms of energy costs and battery degradation. In some instances, low level controller 314 may determine that it is deleterious to battery 108 to follow the regulation exactly and may sacrifice a portion of the frequency response revenue in order to preserve the life of battery 108. The cascaded optimization process is described in greater detail below.

Still referring to FIG. 3, frequency response controller 112 is shown to include a communications interface 302 and a processing circuit 304. Communications interface 302 may include wired or wireless interfaces (e.g., jacks, antennas, transmitters, receivers, transceivers, wire terminals, etc.) for conducting data communications with various systems, devices, or networks. For example, communications interface 302 may include an Ethernet card and port for sending and receiving data via an Ethernet-based communications network and/or a WiFi transceiver for communicating via a wireless communications network. Communications interface 302 may be configured to communicate via local area networks or wide area networks (e.g., the Internet, a building WAN, etc.) and may use a variety of communications protocols (e.g., BACnet, IP, LON, etc.).

Communications interface 302 may be a network interface configured to facilitate electronic data communications between frequency response controller 112 and various external systems or devices (e.g., campus 102, energy grid 104, power inverter 106, incentive provider 114, utilities 320, weather service 322, etc.). For example, frequency response controller 112 may receive inputs from incentive provider 114 indicating an incentive event history (e.g., past clearing prices, mileage ratios, participation requirements, etc.) and a regulation signal. Controller 112 may receive a campus power signal from campus 102, utility rates from utilities 320, and weather forecasts from weather service 322 via communications interface 302. Controller 112 may provide a price bid and a capability bid to incentive provider 114 and may provide power setpoints to power inverter 106 via communications interface 302.

Still referring to FIG. 3, processing circuit 304 is shown to include a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 may be configured to execute computer code or instructions stored in memory 308 or received from other computer readable media (e.g., CDROM, network storage, a remote server, etc.).

Memory 308 may include one or more devices (e.g., memory units, memory devices, storage devices, etc.) for storing data and/or computer code for completing and/or facilitating the various processes described in the present disclosure. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306) one or more processes described herein.

Still referring to FIG. 3, frequency response controller 112 is shown to include a load/rate predictor 310. Load/rate predictor 310 may be configured to predict the electric load of campus 102 (i.e., $\hat{P}_{campus}$) for each time step k (e.g., k=1 . . . n) within an optimization window. Load/rate predictor 310 is shown receiving weather forecasts from a weather service 322. In some embodiments, load/rate predictor 310 predicts $\hat{P}_{campus}$ as a function of the weather forecasts. In some embodiments, load/rate predictor 310 uses feedback from campus 102 to predict $\hat{P}_{campus}$. Feedback from campus 102 may include various types of sensory inputs (e.g., temperature, flow, humidity, enthalpy, etc.) or other data relating to buildings 116, central plant 118, and/or energy generation 120 (e.g., inputs from a HVAC system, a lighting control system, a security system, a water system, a PV energy system, etc.). Load/rate predictor 310 may predict one or more different types of loads for campus 102. For example, load/rate predictor 310 may predict a hot water load, a cold water load, and/or an electric load for each time step k within the optimization window.

In some embodiments, load/rate predictor 310 receives a measured electric load and/or previous measured load data from campus 102. For example, load/rate predictor 310 is shown receiving a campus power signal from campus 102. The campus power signal may indicate the measured electric load of campus 102. Load/rate predictor 310 may predict one or more statistics of the campus power signal including, for example, a mean campus power $\mu_{campus}$ and a standard deviation of the campus power or $\sigma_{campus}$. Load/rate predictor 310 may predict $\hat{P}_{campus}$ as a function of a given weather forecast ($\hat{\phi}_w$), a day type (clay), the time of day (t), and previous measured load data ($Y_{k-1}$). Such a relationship is expressed in the following equation:

$$\hat{P}_{campus} = f(\hat{\phi}_w, \text{day}, t | Y_{k-1})$$

In some embodiments, load/rate predictor 310 uses a deterministic plus stochastic model trained from historical load data to predict $\hat{P}_{campus}$. Load/rate predictor 310 may use any of a variety of prediction methods to predict $\hat{P}_{campus}$ (e.g., linear regression for the deterministic portion and an AR model for the stochastic portion). In some embodiments, load/rate predictor 310 makes load/rate predictions using the techniques described in U.S. patent application Ser. No. 14/717,593, titled "Building Management System for Forecasting Time Series Values of Building Variables" and filed May 20, 2015.

Load/rate predictor 310 is shown receiving utility rates from utilities 320. Utility rates may indicate a cost or price per unit of a resource (e.g., electricity, natural gas, water, etc.) provided by utilities 320 at each time step k in the optimization window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 320 or predicted utility rates estimated by load/rate predictor 310.

In some embodiments, the utility rates include demand charges for one or more resources provided by utilities 320. A demand charge may define a separate cost imposed by utilities 320 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, frequency response controller 112 may be configured to account for demand charges in the high level optimization process performed by high level controller 312. Utilities 320 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 310 may store the predicted campus power $\hat{P}_{campus}$ and the utility rates in memory 308 and/or provide the predicted campus power $\hat{P}_{campus}$ and the utility rates to high level controller 312.

Still referring to FIG. 3, frequency response controller 112 is shown to include an energy market predictor 316 and a signal statistics predictor 318. Energy market predictor 316 may be configured to predict energy market statistics relating to the frequency response program. For example, energy market predictor 316 may predict the values of one or more variables that can be used to estimate frequency response revenue. In some embodiments, the frequency response revenue is defined by the following equation:

$$\text{Rev} = PS(CP_{cap} + MR \cdot CP_{perf}) \text{Reg}_{award}$$

where Rev is the frequency response revenue, $CP_{cap}$ is the capability clearing price, MR is the mileage ratio, and $CP_{perf}$ is the performance clearing price. PS is a performance score based on how closely the frequency response provided by controller 112 tracks the regulation signal. Energy market predictor 316 may be configured to predict the capability clearing price $CP_{cap}$, the performance clearing price $CP_{perf}$, the mileage ratio MR, and/or other energy market statistics that can be used to estimate frequency response revenue. Energy market predictor 316 may store the energy market statistics in memory 308 and/or provide the energy market statistics to high level controller 312.

Signal statistics predictor 318 may be configured to predict one or more statistics of the regulation signal provided by incentive provider 114. For example, signal statistics predictor 318 may be configured to predict the mean $\mu_{FR}$, standard deviation $\sigma_{FR}$, and/or other statistics of the regulation signal. The regulation signal statistics may be based on previous values of the regulation signal (e.g., a historical mean, a historical standard deviation, etc.) or predicted values of the regulation signal (e.g., a predicted mean, a predicted standard deviation, etc.).

In some embodiments, signal statistics predictor 318 uses a deterministic plus stochastic model trained from historical regulation signal data to predict future values of the regulation signal. For example, signal statistics predictor 318 may use linear regression to predict a deterministic portion of the regulation signal and an AR model to predict a stochastic portion of the regulation signal. In some embodiments, signal statistics predictor 318 predicts the regulation signal using the techniques described in U.S. patent application Ser. No. 14/717,593, titled "Building Management System for Forecasting Time Series Values of Building Variables" and filed May 20, 2015. Signal statistics predictor 318 may use the predicted values of the regulation signal to calculate the regulation signal statistics. Signal statistics predictor 318 may store the regulation signal statistics in memory 308 and/or provide the regulation signal statistics to high level controller 312.

Still referring to FIG. 3, frequency response controller 112 is shown to include a high level controller 312. High level controller 312 may be configured to generate values for the midpoint b and the capability bid $Reg_{award}$. In some embodiments, high level controller 312 determines a midpoint b that will cause battery 108 to have the same state-of-charge (SOC) at the beginning and end of each frequency response period. In other embodiments, high level controller 312 performs an optimization process to generate midpoint b and $Reg_{award}$. For example, high level controller 312 may generate midpoint b using an optimization procedure that allows the SOC of battery 108 to vary and/or have different values at the beginning and end of the frequency response period. High level controller 312 may use the SOC of battery 108 as a constrained variable that depends on midpoint b in order to optimize a value function that takes into account frequency response revenue, energy costs, and the cost of battery degradation. Both of these embodiments are described in greater detail with reference to FIG. 4A.

High level controller 312 may determine midpoint b by equating the desired power $P_{POI}*$ at POI 110 with the actual power at POI 110 as shown in the following equation:

$$(Reg_{signal})(Reg_{award})+b=P_{bat}+P_{loss}+P_{campus}$$

where the left side of the equation $(Reg_{signal})(Reg_{award})+b$ is the desired power $P_{POI}*$ at POI 110 and the right side of the equation is the actual power at POI 110. Integrating over the frequency response period results in the following equation:

$$\int_{period} ((Reg_{signal})(Reg_{award}) + b)dt = \int_{period} (P_{bat} + P_{loss} + P_{campus})dt$$

For embodiments in which the SOC of battery 108 is maintained at the same value at the beginning and end of the frequency response period, the integral of the battery power $P_{bat}$ over the frequency response period is zero (i.e., $\int P_{bat}dt=0$). Accordingly, the previous equation can be rewritten as follows:

$$b = \int_{period} P_{loss}dt + \int_{period} P_{campus}dt - Reg_{award}\int_{period} Reg_{signal}dt$$

where the term $\int P_{bat}$ dt has been omitted because $\int P_{bat}$ dt=0. This is ideal behavior if the only goal is to maximize frequency response revenue. Keeping the SOC of battery 108 at a constant value (and near 50%) will allow system 100 to participate in the frequency market during all hours of the day.

High level controller 312 may use the estimated values of the campus power signal received from campus 102 to predict the value of $\int P_{campus}$ dt over the frequency response period. Similarly, high level controller 312 may use the estimated values of the regulation signal from incentive provider 114 to predict the value of $\int Reg_{signal}$ dt over the frequency response period. High level controller 312 may estimate the value of $\int P_{loss}$ dt using a Thevinin equivalent circuit model of battery 108 (described in greater detail with reference to FIG. 4A). This allows high level controller 312 to estimate the integral $\int P_{loss}$ dt as a function of other variables such as $Reg_{award}$, $Reg_{signal}$, $P_{campus}$, and midpoint b.

After substituting known and estimated values, the preceding equation can be rewritten as follows:

$$\frac{1}{4P_{max}}[E\{P_{campus}^2\} + Reg_{award}^2 E\{Reg_{signal}^2\} -$$
$$2Reg_{award}E\{Reg_{signal}\}E\{P_{campus}\}]\Delta t +$$
$$[Reg_{award}E\{Reg_{signal}\} - E\{P_{campus}\}]\Delta t +$$
$$\frac{b}{2P_{max}}[Reg_{award}E\{Reg_{signal}\} - E\{P_{campus}\}]\Delta t + b\Delta t + \frac{b^2}{4P_{max}}\Delta t = 0$$

where the notation E{ } indicates that the variable within the brackets { } is ergodic and can be approximated by the estimated mean of the variable. For example, the term $E\{Reg_{signal}\}$ can be approximated by the estimated mean of the regulation signal $\mu_{FR}$ and the term $E\{P_{campus}\}$ can be approximated by the estimated mean of the campus power signal $\mu_{campus}$. High level controller 312 may solve the equation for midpoint b to determine the midpoint b that maintains battery 108 at a constant state-of-charge.

For embodiments in which the SOC of battery 108 is treated as a variable, the SOC of battery 108 may be allowed to have different values at the beginning and end of the frequency response period. Accordingly, the integral of the battery power $P_{bat}$ over the frequency response period can be expressed as $-\Delta SOC \cdot C_{des}$ as shown in the following equation:

$$\int_{period} P_{bat}dt = -\Delta SOC \cdot C_{des}$$

where $\Delta SOC$ is the change in the SOC of battery 108 over the frequency response period and $C_{des}$ is the design capacity of battery 108. The SOC of battery 108 may be a normalized variable (i.e., $0 \leq SOC \leq 1$) such that the term $SOC \cdot C_{des}$ represents the amount of energy stored in battery 108 for a given state-of-charge. The SOC is shown as a negative value because drawing energy from battery 108 (i.e., a positive $P_{bat}$) decreases the SOC of battery 108. The equation for midpoint b becomes:

$$b = \int_{period} P_{loss}dt + \int_{period} P_{campus}dt + \int_{period} P_{bat}dt - Reg_{award}\int_{period} Reg_{signal}dt$$

After substituting known and estimated values, the preceding equation can be rewritten as follows:

$$\frac{1}{4P_{max}}[E\{P_{campus}^2\} + Reg_{award}^2 E\{Reg_{signal}^2\} -$$
$$2Reg_{award}E\{Reg_{signal}\}E\{P_{campus}\}]\Delta t +$$
$$[Reg_{award}E\{Reg_{signal}\} - E\{P_{campus}\}]\Delta t + \Delta SOC \cdot C_{des} +$$
$$\frac{b}{2P_{max}}[Reg_{award}E\{Reg_{signal}\} - E\{P_{campus}\}]\Delta t + b\Delta t + \frac{b^2}{4P_{max}}\Delta t = 0$$

High level controller 312 may solve the equation for midpoint b in terms of $\Delta SOC$.

High level controller 312 may perform an optimization to find optimal midpoints b for each frequency response period within an optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} \text{Rev}(\text{Reg}_{award,k}) + \sum_{k=1}^{h} c_k b_k + \min_{period}(P_{campus,k} + b_k) - \sum_{k=1}^{h} \lambda_{bat,k}$$

where $\text{Rev}(\text{Reg}_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. The electricity cost is expressed as a positive value because drawing power from energy grid 104 is represented as a negative power and therefore will result in negative value (i.e., a cost) in the objective function. The demand charge is expressed as a minimum for the same reason (i.e., the most negative power value represents maximum power draw from energy grid 104).

High level controller 312 may estimate the frequency response revenue $\text{Rev}(\text{Reg}_{award,k})$ as a function of the midpoints b. In some embodiments, high level controller 312 estimates frequency response revenue using the following equation:

$$\text{Rev}(\text{Reg}_{award}) = \text{Reg}_{award}(CP_{cap} + MR \cdot CP_{perf})$$

where $CP_{cap}$, MR, and $CP_{perf}$ are the energy market statistics received from energy market predictor 316 and $\text{Reg}_{award}$ is a function of the midpoint b. For example, high level controller 312 may place a bid that is as large as possible for a given midpoint, as shown in the following equation:

$$\text{Reg}_{award} = P_{limit} - |b|$$

where $P_{limit}$ is the power rating of power inverter 106. Advantageously, selecting $\text{Reg}_{award}$ as a function of midpoint b allows high level controller 312 to predict the frequency response revenue that will result from a given midpoint b.

High level controller 312 may estimate the cost of battery degradation $\lambda_{bat}$ as a function of the midpoints b. For example, high level controller 312 may use a battery life model to predict a loss in battery capacity that will result from a set of midpoints b, power outputs, and/or other variables that can be manipulated by controller 112. In some embodiments, the battery life model expresses the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left(\text{e.g., } PR = avg\left(\frac{P}{P_{des}}\right)\right),$$

and ER is the average effort ratio $$\left(\text{e.g., } ER = avg\left(\frac{\Delta P}{P_{des}}\right)\right)$$

of battery 108. Each of these terms is described in greater detail with reference to FIG. 4A. Advantageously, several of the terms in the battery life model depend on the midpoints b and power setpoints selected by controller 112. This allows high level controller 312 to predict a loss in battery capacity that will result from a given set of control outputs. High level controller 312 may monetize the loss in battery capacity and include the monetized cost of battery degradation $\lambda_{bat}$ in the objective function J.

In some embodiments, high level controller 312 generates a set of filter parameters for low level controller 314. The filter parameters may be used by low level controller 314 as part of a low-pass filter that removes high frequency components from the regulation signal. In some embodiments, high level controller 312 generates a set of filter parameters that transform the regulation signal into an optimal frequency response signal $\text{Res}_{FR}$. For example, high level controller 312 may perform a second optimization process to determine an optimal frequency response $\text{Res}_{FR}$ based on the optimized values for $\text{Reg}_{award}$ and midpoint b.

In some embodiments, high level controller 312 determines the optimal frequency response $\text{Res}_{FR}$ by optimizing value function J with the frequency response revenue Rev ($\text{Reg}_{award}$) defined as follows:

$$\text{Rev}(\text{Reg}_{award}) = PS \cdot \text{Reg}_{award}(CP_{cap} + MR \cdot CP_{perf})$$

and with the frequency response $\text{Res}_{FR}$ substituted for the regulation signal in the battery life model. The performance score PS may be based on several factors that indicate how well the optimal frequency response $\text{Res}_{FR}$ tracks the regulation signal. Closely tracking the regulation signal may result in higher performance scores, thereby increasing the frequency response revenue. However, closely tracking the regulation signal may also increase the cost of battery degradation $\lambda_{bat}$. The optimized frequency response $\text{Res}_{FR}$ represents an optimal tradeoff between decreased frequency response revenue and increased battery life. High level controller 312 may use the optimized frequency response $\text{Res}_{FR}$ to generate a set of filter parameters for low level controller 314. These and other features of high level controller 312 are described in greater detail with reference to FIG. 4A.

Still referring to FIG. 3, frequency response controller 112 is shown to include a low level controller 314. Low level controller 314 is shown receiving the midpoints b and the filter parameters from high level controller 312. Low level controller 314 may also receive the campus power signal from campus 102 and the regulation signal from incentive provider 114. Low level controller 314 may use the regulation signal to predict future values of the regulation signal and may filter the predicted regulation signal using the filter parameters provided by high level controller 312.

Low level controller 314 may use the filtered regulation signal to determine optimal power setpoints for power inverter 106. For example, low level controller 314 may use the filtered regulation signal to calculate the desired interconnection power $P_{POI}*$ using the following equation:

$$P_{POI}* = \text{Reg}_{award} \cdot \text{Reg}_{filter} + b$$

where $\text{Reg}_{filter}$ is the filtered regulation signal. Low level controller 314 may subtract the campus power $P_{campus}$ from the desired interconnection power $P_{POI}*$ to calculate the optimal power setpoints $P_{SP}$ for power inverter 106, as shown in the following equation:

$$P_{SP} = P_{POI}* - P_{campus}$$

In some embodiments, low level controller 314 performs an optimization to determine how closely to track $P_{POI}*$. For example, low level controller 314 may determine an optimal frequency response Res$_{FR}$ by optimizing value function J with the frequency response revenue Rev(Reg$_{award}$) defined as follows:

$$\text{Rev}(\text{Reg}_{award}) = PS \cdot \text{Reg}_{award}(CP_{cap} + MR \cdot CP_{perf})$$

and with the frequency response Res$_{FR}$ substituted for the regulation signal in the battery life model. Low level controller 314 may use the optimal frequency response Res$_{FR}$ in place of the filtered frequency response Reg$_{filter}$ to calculate the desired interconnection power P$_{POI}$* and power setpoints P$_{SP}$ as previously described. These and other features of low level controller 314 are described in greater detail with reference to FIG. 5A.

High Level Controller

Figure 4A:
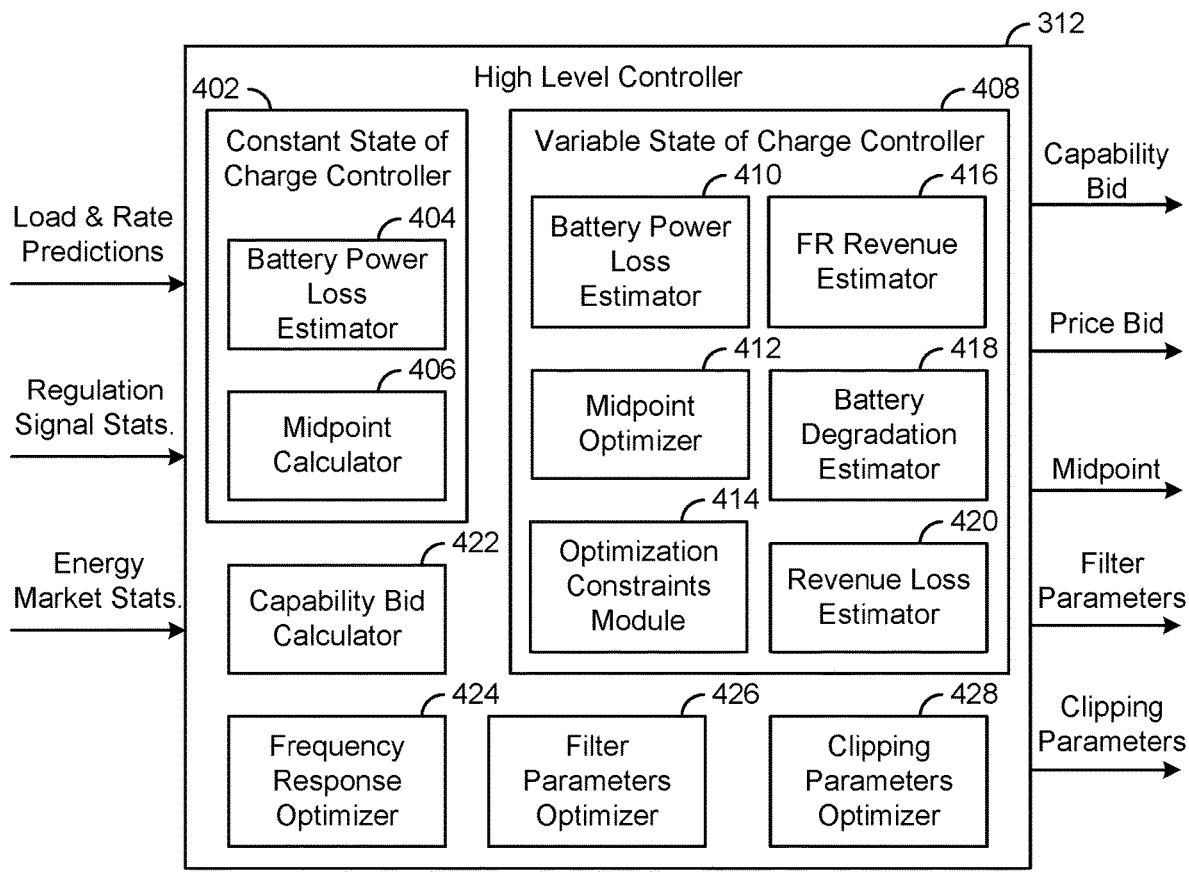
FIG. 4A is a block diagram illustrating the high level controller of FIG. 3 in greater detail, according to an exemplary embodiment.

Referring now to FIG. 4A, a block diagram illustrating high level controller 312 in greater detail is shown, according to an exemplary embodiment. High level controller 312 is shown to include a constant state-of-charge (SOC) controller 402 and a variable SOC controller 408. Constant SOC controller 402 may be configured to generate a midpoint b that results in battery 108 having the same SOC at the beginning and the end of each frequency response period. In other words, constant SOC controller 402 may determine a midpoint b that maintains battery 108 at a predetermined SOC at the beginning of each frequency response period. Variable SOC controller 408 may generate midpoint b using an optimization procedure that allows the SOC of battery 108 to have different values at the beginning and end of the frequency response period. In other words, variable SOC controller 408 may determine a midpoint b that results in a net change in the SOC of battery 108 over the duration of the frequency response period.

Constant State-of-Charge Controller

Constant SOC controller 402 may determine midpoint b by equating the desired power P$_{POI}$* at POI 110 with the actual power at POI 110 as shown in the following equation:

$$(\text{Reg}_{signal})(\text{Reg}_{award}) + b = P_{bat} + P_{loss} + P_{campus}$$

where the left side of the equation (Reg$_{signal}$)(Reg$_{award}$)+b is the desired power P$_{POI}$* at POI 110 and the right side of the equation is the actual power at POI 110. Integrating over the frequency response period results in the following equation:

$$\int_{period} \left( (\text{Reg}_{signal})(\text{Reg}_{award}) + b \right) dt = \int_{period} (P_{bat} + P_{loss} + P_{campus}) dt$$

Since the SOC of battery 108 is maintained at the same value at the beginning and end of the frequency response period, the integral of the battery power P$_{bat}$ over the frequency response period is zero (i.e., ∫P$_{bat}$dt=0). Accordingly, the previous equation can be rewritten as follows:

$$b = \int_{period} P_{loss} dt + \int_{period} P_{campus} dt - \text{Reg}_{award} \int_{period} \text{Reg}_{signal} dt$$

where the term ∫P$_{bat}$ dt has been omitted because ∫P$_{bat}$ dt=0. This is ideal behavior if the only goal is to maximize frequency response revenue. Keeping the SOC of battery 108 at a constant value (and near 50%) will allow system 100 to participate in the frequency market during all hours of the day.

Constant SOC controller 402 may use the estimated values of the campus power signal received from campus 102 to predict the value of ∫P$_{campus}$ dt over the frequency response period. Similarly, constant SOC controller 402 may use the estimated values of the regulation signal from incentive provider 114 to predict the value of ∫Reg$_{signal}$ dt over the frequency response period. Reg$_{award}$ can be expressed as a function of midpoint b as previously described (e.g., Reg$_{award}$=P$_{limit}$−|b|). Therefore, the only remaining term in the equation for midpoint b is the expected battery power loss ∫P$_{loss}$.

Constant SOC controller 402 is shown to include a battery power loss estimator 404. Battery power loss estimator 404 may estimate the value of ∫P$_{loss}$ dt using a Thevinin equivalent circuit model of battery 108. For example, battery power loss estimator 404 may model battery 108 as a voltage source in series with a resistor. The voltage source has an open circuit voltage of V$_{OC}$ and the resistor has a resistance of R$_{TH}$. An electric current I flows from the voltage source through the resistor.

To find the battery power loss in terms of the supplied power P$_{sup}$, battery power loss estimator 404 may identify the supplied power P$_{sup}$ as a function of the current I, the open circuit voltage V$_{OC}$, and the resistance R$_{TH}$ as shown in the following equation:

$$P_{sup} = V_{OC}I - I^2 R_{TH}$$

which can be rewritten as:

$$\frac{I^2}{I_{SC}} - I + \frac{P'}{4} = 0$$

with the following substitutions:

$$I_{SC} = \frac{V_{OC}}{R_{TH}}, \quad P' = \frac{P}{P_{max}}, \quad P_{max} = \frac{V_{OC}^2}{4R_{TH}}$$

where P is the supplied power and P$_{max}$ is the maximum possible power transfer.

Battery power loss estimator 404 may solve for the current I as follows:

$$I = \frac{I_{SC}}{2}\left(1 - \sqrt{1 - P'}\right)$$

which can be converted into an expression for power loss P$_{loss}$ in terms of the supplied power P and the maximum possible power transfer P$_{max}$ as shown in the following equation:

$$P_{loss} = P_{max}(1 - \sqrt{1-P'})^2$$

Battery power loss estimator 404 may simplify the previous equation by approximating the expression (1−√1−P') as a linear function about P'=0. This results in the following approximation for P$_{loss}$:

$$P_{loss} \approx P_{max}\left(\frac{P'}{2}\right)^2$$

which is a good approximation for powers up to one-fifth of the maximum power.

Battery power loss estimator 404 may calculate the expected value of ∫P$_{loss}$ dt over the frequency response period as follows:

$$\int_{period} P_{loss}dt = \int_{period} -P_{max}\left(\frac{Reg_{award}Reg_{signal} + b - P_{campus}}{2P_{max}}\right)^2 dt =$$

$$\frac{1}{4P_{max}}\left[2Reg_{award}\int_{period} P_{campus}Reg_{signal}dt - \int_{period} P_{campus}^2 dt - Reg_{award}^2\int_{period} Reg_{signal}^2 dt\right] +$$

$$\frac{b}{2P_{max}}\left[\int_{period} P_{campus}^2 dt - Reg_{award}\int_{period} Reg_{signal}dt\right] -$$

$$\frac{b^2}{4P_{max}}\Delta t = \frac{1}{4P_{max}}\left[E\{P_{campus}^2\} + Reg_{award}^2 E\{Reg_{signal}^2\} - 2Reg_{award}E\{Reg_{signal}\}E\{P_{campus}\}\right]\Delta t -$$

$$\frac{b}{2P_{max}}\left[Reg_{award}E\{Reg_{signal}\} - E\{P_{campus}\}\right]\Delta t - \frac{b^2}{4P_{max}}\Delta t$$

where the notation E{ } indicates that the variable within the brackets { } is ergodic and can be approximated by the estimated mean of the variable. This formulation allows battery power loss estimator 404 to estimate $\int P_{loss}$ dt as a function of other variables such as $Reg_{award}$, $Reg_{signal}$, $P_{campus}$, midpoint b, and $P_{max}$.

Constant SOC controller 402 is shown to include a midpoint calculator 406. Midpoint calculator 406 may be configured to calculate midpoint b by substituting the previous expression for $\int P_{loss}$ dt into the equation for midpoint b. After substituting known and estimated values, the equation for midpoint b can be rewritten as follows:

$$\frac{1}{4P_{max}}\left[E\{P_{campus}^2\} + Reg_{award}^2 E\{Reg_{signal}^2\} - 2Reg_{award}E\{Reg_{signal}\}E\{P_{campus}\}\right]\Delta t +$$

$$\left[Reg_{award}E\{Reg_{signal}\} - E\{P_{campus}\}\right]\Delta t +$$

$$\frac{b}{2P_{max}}\left[Reg_{award}E\{Reg_{signal}\} - E\{P_{campus}\}\right]\Delta t + b\Delta t + \frac{b^2}{4P_{max}}\Delta t = 0$$

Midpoint calculator 406 may solve the equation for midpoint b to determine the midpoint b that maintains battery 108 at a constant state-of-charge.

Variable State-of-Charge Controller

Variable SOC controller 408 may determine optimal midpoints b by allowing the SOC of battery 108 to have different values at the beginning and end of a frequency response period. For embodiments in which the SOC of battery 108 is allowed to vary, the integral of the battery power $P_{bat}$ over the frequency response period can be expressed as $-\Delta SOC \cdot C_{des}$ as shown in the following equation:

$$\int_{period} P_{bat}dt = -\Delta SOC \cdot C_{des}$$

where $\Delta SOC$ is the change in the SOC of battery 108 over the frequency response period and $C_{des}$ is the design capacity of battery 108. The SOC of battery 108 may be a normalized variable (i.e., 0≤SOC≤1) such that the term $SOC \cdot C_{des}$ represents the amount of energy stored in battery 108 for a given state-of-charge. The SOC is shown as a negative value because drawing energy from battery 108 (i.e., a positive $P_{bat}$) decreases the SOC of battery 108. The equation for midpoint b becomes:

$$b = \int_{period} P_{loss}dt + \int_{period} P_{campus}dt + \int_{period} P_{bat}dt - Reg_{award}\int_{period} Reg_{signal}dt$$

Variable SOC controller 408 is shown to include a battery power loss estimator 410 and a midpoint optimizer 412. Battery power loss estimator 410 may be the same or similar to battery power loss estimator 404. Midpoint optimizer 412 may be configured to establish a relationship between the midpoint b and the SOC of battery 108. For example, after substituting known and estimated values, the equation for midpoint b can be written as follows:

$$\frac{1}{4P_{max}}\left[E\{P_{campus}^2\} + Reg_{award}^2 E\{Reg_{signal}^2\} - 2Reg_{award}E\{Reg_{signal}\}E\{P_{campus}\}\right]\Delta t +$$

$$\left[Reg_{award}E\{Reg_{signal}\} + E\{P_{campus}\}\right]\Delta t + \Delta SOC \cdot C_{des} +$$

$$\frac{b}{2P_{max}}\left[Reg_{award}E\{Reg_{signal}\} - E\{P_{campus}\}\right]\Delta t + b\Delta t + \frac{b^2}{4P_{max}}\Delta t = 0$$

Advantageously, the previous equation defines a relationship between midpoint b and the change in SOC of battery 108. Midpoint optimizer 412 may use this equation to determine the impact that different values of midpoint b have on the SOC in order to determine optimal midpoints b. This equation can also be used by midpoint optimizer 412 during optimization to translate constraints on the SOC in terms of midpoint b. For example, the SOC of battery 108 may be constrained between zero and 1 (e.g., 0≤SOC≤1) since battery 108 cannot be charged in excess of its maximum capacity or depleted below zero. Midpoint optimizer 412 may use the relationship between $\Delta SOC$ and midpoint b to constrain the optimization of midpoint b to midpoint values that satisfy the capacity constraint.

Midpoint optimizer 412 may perform an optimization to find optimal midpoints b for each frequency response period within the optimization window (e.g., each hour for the next day) given the electrical costs over the optimization window. Optimal midpoints b may be the midpoints that maximize an objective function that includes both frequency response revenue and costs of electricity and battery degradation. For example, an objective function J can be written as:

$$J = \sum_{k=1}^{h} Rev(Reg_{awards,k}) + \sum_{k=1}^{h} c_k b_k + \min_{period}(P_{campus,k} + b_k) - \sum_{k=1}^{h} \lambda_{bat,k}$$

where $Rev(Reg_{award,k})$ is the frequency response revenue at time step k, $c_k b_k$ is the cost of electricity purchased at time step k, the min( ) term is the demand charge based on the maximum rate of electricity consumption during the applicable demand charge period, and $\lambda_{bat,k}$ is the monetized cost battery degradation at time step k. Midpoint optimizer 412 may use input from frequency response revenue estimator 416 (e.g., a revenue model) to determine a relationship between midpoint b and $Rev(Reg_{award,k})$. Similarly, midpoint optimizer 412 may use input from battery degradation estimator 418 and/or revenue loss estimator 420 to determine a relationship between midpoint b and the monetized cost of battery degradation $\lambda_{bat,k}$.

Still referring to FIG. 4A, variable SOC controller 408 is shown to include an optimization constraints module 414. Optimization constraints module 414 may provide one or more constraints on the optimization performed by midpoint optimizer 412. The optimization constraints may be specified in terms of midpoint b or other variables that are related to midpoint b. For example, optimization constraints module 414 may implement an optimization constraint specifying that the expected SOC of battery 108 at the end of each frequency response period is between zero and one, as shown in the following equation:

$$0 \le SOC_0 + \sum_{i=1}^{j} \Delta SOC_i \le 1 \; \forall \; j = 1 \ldots h$$

where $SOC_0$ is the SOC of battery 108 at the beginning of the optimization window, $\Delta SOC_i$ is the change in SOC during frequency response period i, and h is the total number of frequency response periods within the optimization window.

In some embodiments, optimization constraints module 414 implements an optimization constraint on midpoint b so that the power at POI 110 does not exceed the power rating of power inverter 106. Such a constraint is shown in the following equation:

$$-P_{limit} \le b_k + P_{campus,max}^{(p)} \le P_{limit}$$

where $P_{limit}$ is the power rating of power inverter 106 and $P_{campus,max}^{(p)}$ is the maximum value of $P_{campus}$ at confidence level p. This constraint could also be implemented by identifying the probability that the sum of $b_k$ and $P_{campus,max}$ exceeds the power inverter power rating (e.g., using a probability density function for $P_{campus,max}$) and limiting that probability to less than or equal to 1−p.

In some embodiments, optimization constraints module 414 implements an optimization constraint to ensure (with a given probability) that the actual SOC of battery 108 remains between zero and one at each time step during the applicable frequency response period. This constraint is different from the first optimization constraint which placed bounds on the expected SOC of battery 108 at the end of each optimization period. The expected SOC of battery 108 can be determined deterministically, whereas the actual SOC of battery 108 is dependent on the campus power $P_{campus}$ and the actual value of the regulation signal $Reg_{signal}$ at each time step during the optimization period. In other words, for any value of $Reg_{award} > 0$, there is a chance that battery 108 becomes fully depleted or fully charged while maintaining the desired power $P_{POI}^*$ at POI 110.

Optimization constraints module 414 may implement the constraint on the actual SOC of battery 108 by approximating the battery power $P_{bat}$ (a random process) as a wide-sense stationary, correlated normally distributed process. Thus, the SOC of battery 108 can be considered as a random walk. Determining if the SOC would violate the constraint is an example of a gambler's ruin problem. For example, consider a random walk described by the following equation:

$$y_{k+1} = y_k + x_k, P(x_k=1) = p, P(x_k=1) = 1-p$$

The probability P that $y_k$ (starting at state z) will reach zero in less than n moves is given by the following equation:

$$P = 2a^{-1}(2p)^{\frac{n-z}{2}}[2(1-p)]^{\frac{n+z}{2}} \sum_{v=1}^{\frac{a}{2}} \cos^{n-1}\left(\frac{\pi v}{a}\right) \sin\left(\frac{\pi v}{a}\right) \sin\left(\frac{\pi z v}{a}\right)$$

In some embodiments, each frequency response period includes approximately n=1800 time steps (e.g., one time step every two seconds for an hour). Therefore, the central limit theorem applies and it is possible to convert the autocorrelated random process for $P_{bat}$ and the limits on the SOC of battery 108 into an uncorrelated random process of 1 or −1 with a limit of zero.

In some embodiments, optimization constraints module 414 converts the battery power $P_{bat}$ into an uncorrelated normal process driven by the regulation signal $Reg_{signal}$. For example, consider the original battery power described by the following equation:

$$x_{k+1} = \alpha x_k + e_k, x_k \sim N(\mu, \sigma), e_k \sim N(\mu_e, \sigma_e)$$

where the signal x represents the battery power $P_{bat}$, $\alpha$ is an autocorrelation parameter, and e is a driving signal. In some embodiments, e represents the regulation signal $Reg_{signal}$. If the power of the signal x is known, then the power of signal e is also known, as shown in the following equations:

$$\mu(1-\alpha) = \mu_e$$

$$E\{x_k^2\}(1-\alpha)^2 - 2\alpha\mu\mu_e = E\{e_k^2\}$$

$$E\{x_k^2\}(1-\alpha^2) - 2\mu^2\alpha(1-\alpha) = E\{e_k^2\},$$

Additionally, the impulse response of the difference equation for $x_{k+1}$ is:

$$h_k = \alpha^k \; k \ge 0$$

Using convolution, $x_k$ can be expressed as follows:

$$x_k = \sum_{i=1}^{k} \alpha^{k-i} e_{i-1}$$

$$x_3 = \alpha^2 e_0 + \alpha^1 e_1 + e_2$$

$$x_q = \alpha^{q-1} e_0 + \alpha^{q-2} e_1 + \ldots + \alpha e_{q-2} + e_{q-1}$$

A random walk driven by signal $x_k$ can be defined as follows:

$$y_k = \sum_{j=1}^{k} x_j = \sum_{j=1}^{k} \sum_{i=1}^{j} \alpha^{j-1} e_{i-1}$$

which for large values of j can be approximated using the infinite sum of a geometric series in terms of the uncorrelated signal e rather than x:

$$y_k = \sum_{j=1}^{k} x_j \approx \sum_{j=1}^{k} \frac{1}{1-\alpha} e_j = \sum_{j=1}^{k} x_j' \; k \gg 1$$

Thus, the autocorrelated driving signal $x_k$ of the random walk can be converted into an uncorrelated driving signal $x_k'$ with mean and power given by:

$$E\{x'_k\} = \mu, \ E\{(x'_k - \mu)^2\} = \frac{1+\alpha}{1-\alpha}\sigma^2, \ E\{x'^2_k\} = \frac{1+\alpha}{1-\alpha}\sigma^2 + \mu^2,$$

$$\sigma^2_{x'} = \frac{1+\alpha}{1-\alpha}\sigma^2$$

where $x_k'$ represents the regulation signal $\text{Reg}_{signal}$. Advantageously, this allows optimization constraints module 414 to define the probability of ruin in terms of the regulation signal $\text{Reg}_{signal}$.

In some embodiments, optimization constraints module 414 determines a probability p that the random walk driven by the sequence of −1 and 1 will take the value of 1. In order to ensure that the random walk driven by the sequence of −1 and 1 will behave the same as the random walk driven by $x_k'$, optimization constraints module 414 may select p such that the ratio of the mean to the standard deviation is the same for both driving functions, as shown in the following equations:

$$\frac{\text{mean}}{\text{stdev}} = \frac{\mu}{\sqrt{\frac{1+\alpha}{1-\alpha}}\sigma} = \tilde{\mu} = \frac{2p-1}{\sqrt{4p(1-p)}}$$

$$p = \frac{1}{2} \pm \frac{1}{2}\sqrt{1 - \left(\frac{1}{\tilde{\mu}^2 + 1}\right)}$$

where $\tilde{\mu}$ is the ratio of the mean to the standard deviation of the driving signal (e.g., $\text{Reg}_{signal}$) and $\mu$ is the change in state-of-charge over the frequency response period divided by the number of time steps within the frequency response period $$\left(\text{i.e., } \mu = \frac{\Delta SOC}{n}\right).$$

For embodiments in which each frequency response period has a duration of one hour (i.e., 3600 seconds) and the interval between time steps is two seconds, the number of time steps per frequency response period is 1800 (i.e., n=1800). In the equation for p, the plus is used when $\tilde{\mu}$ is greater than zero, whereas the minus is used when $\tilde{\mu}$ is less than zero. Optimization constraints module 414 may also ensure that both driving functions have the same number of standard deviations away from zero (or ruin) to ensure that both random walks have the same behavior, as shown in the following equation:

$$z = \frac{SOC \cdot C_{des}\sqrt{4p(1-p)}}{\sqrt{\frac{1+\alpha}{1-\alpha}}\sigma}$$

Advantageously, the equations for p and z allow optimization constraints module 414 to define the probability of ruin P (i.e., the probability of battery 108 fully depleting or reaching a fully charged state) within N time steps (n=1 ... N) as a function of variables that are known to high level controller 312 and/or manipulated by high level controller 312. For example, the equation for p defines p as a function of the mean and standard deviation of the regulation signal $\text{Reg}_{signal}$, which may be estimated by signal statistics predictor 318. The equation for z defines z as a function of the SOC of battery 108 and the parameters of the regulation signal $\text{Reg}_{signal}$.

Optimization constraints module 414 may use one or more of the previous equations to place constraints on $\Delta SOC \cdot C_{des}$ and $\text{Reg}_{award}$ given the current SOC of battery 108. For example, optimization constraints module 414 may use the mean and standard deviation of the regulation signal $\text{Reg}_{signal}$ to calculate p. Optimization constraints module 414 may then use p in combination with the SOC of battery 108 to calculate z. Optimization constraints module 414 may use p and z as inputs to the equation for the probability of ruin P. This allows optimization constraints module 414 to define the probability or ruin P as a function of the SOC of battery 108 and the estimated statistics of the regulation signal $\text{Reg}_{signal}$. Optimization constraints module 414 may impose constraints on the SOC of battery 108 to ensure that the probability of ruin P within N time steps does not exceed a threshold value. These constraints may be expressed as limitations on the variables $\Delta SOC \cdot C_{des}$ and/or $\text{Reg}_{award}$, which are related to midpoint b as previously described.

In some embodiments, optimization constraints module 414 uses the equation for the probability of ruin P to define boundaries on the combination of variables p and z. The boundaries represent thresholds when the probability of ruin P in less than N steps is greater than a critical value $P_{cr}$ (e.g., $P_{cr}=0.001$). For example, optimization constraints module 414 may generate boundaries that correspond to a threshold probability of battery 108 fully depleting or reaching a fully charged state during a frequency response period (e.g., in N=1800 steps).

In some embodiments, optimization constraints module 414 constrains the probability of ruin P to less than the threshold value, which imposes limits on potential combinations of the variables p and z. Since the variables p and z are related to the SOC of battery 108 and the statistics of the regulation signal, the constraints may impose limitations on $\Delta SOC \cdot C_{des}$ and $\text{Reg}_{award}$ given the current SOC of battery 108. These constraints may also impose limitations on midpoint b since the variables $\Delta SOC \cdot C_{des}$ and $\text{Reg}_{award}$ are related to midpoint b. For example, optimization constraints module 414 may set constraints on the maximum bid $\text{Reg}_{award}$ given a desired change in the SOC for battery 108. In other embodiments, optimization constraints module 414 penalizes the objective function J given the bid $\text{Reg}_{award}$ and the change in SOC.

Still referring to FIG. 4A, variable SOC controller 408 is shown to include a frequency response (FR) revenue estimator 416. FR revenue estimator 416 may be configured to estimate the frequency response revenue that will result from a given midpoint b (e.g., a midpoint provided by midpoint optimizer 412). The estimated frequency response revenue may be used as the term $\text{Rev}(\text{Reg}_{award,k})$ in the objective function J. Midpoint optimizer 412 may use the estimated frequency response revenue along with other terms in the objective function J to determine an optimal midpoint b.

In some embodiments, FR revenue estimator 416 uses a revenue model to predict frequency response revenue. An exemplary revenue model which may be used by FR revenue estimator 416 is shown in the following equation:

$$\text{Rev}(\text{Reg}_{award}) = \text{Reg}_{award}(CP_{cap} + MR \cdot CP_{perf})$$

where $CP_{cap}$, $MR$, and $CP_{perf}$ are the energy market statistics received from energy market predictor 316 and $\text{Rea}_{award}$ is a function of the midpoint b. For example, capability bid calculator 422 may calculate $\text{Reg}_{award}$ using the following equation:

$$\text{Reg}_{award} = P_{limit} - |b|$$

where $P_{limit}$ is the power rating of power inverter 106.

As shown above, the equation for frequency response revenue used by FR revenue estimator 416 does not include a performance score (or assumes a performance score of 1.0). This results in FR revenue estimator 416 estimating a maximum possible frequency response revenue that can be achieved for a given midpoint b (i.e., if the actual frequency response of controller 112 were to follow the regulation signal exactly). However, it is contemplated that the actual frequency response may be adjusted by low level controller 314 in order to preserve the life of battery 108. When the actual frequency response differs from the regulation signal, the equation for frequency response revenue can be adjusted to include a performance score. The resulting value function J may then be optimized by low level controller 314 to determine an optimal frequency response output which considers both frequency response revenue and the costs of battery degradation, as described with reference to FIG. 5A.

Still referring to FIG. 4A, variable SOC controller 408 is shown to include a battery degradation estimator 418. Battery degradation estimator 418 may estimate the cost of battery degradation that will result from a given midpoint b (e.g., a midpoint provided by midpoint optimizer 412). The estimated battery degradation may be used as the term $\lambda_{bat}$ in the objective function J. Midpoint optimizer 412 may use the estimated battery degradation along with other terms in the objective function J to determine an optimal midpoint b.

In some embodiments, battery degradation estimator 418 uses a battery life model to predict a loss in battery capacity that will result from a set of midpoints b, power outputs, and/or other variables that can be manipulated by controller 112. The battery life model may define the loss in battery capacity $C_{loss,add}$ as a sum of multiple piecewise linear functions, as shown in the following equation:

$$C_{loss,add}=f_1(T_{cell})+f_2(SOC)+f_3(DOD)+f_4(PR)+f_5(ER)-C_{loss,nom}$$

where $T_{cell}$ is the cell temperature, SOC is the state-of-charge, DOD is the depth of discharge, PR is the average power ratio $$\left(\text{e.g., } PR = avg\left(\frac{P_{avg}}{P_{des}}\right)\right),$$

and ER is the average effort ratio $$\left(\text{e.g., } ER = avg\left(\frac{\Delta P_{bat}}{P_{des}}\right)\right)$$

of battery 108. $C_{loss,nom}$ is the nominal loss in battery capacity that is expected to occur over time. Therefore, $C_{loss,add}$ represents the additional loss in battery capacity degradation in excess of the nominal value $C_{loss,nom}$.

Battery degradation estimator 418 may define the terms in the battery life model as functions of one or more variables that have known values (e.g., estimated or measured values) and/or variables that can be manipulated by high level controller 312. For example, battery degradation estimator 418 may define the terms in the battery life model as functions of the regulation signal statistics (e.g., the mean and standard deviation of $\text{Reg}_{signal}$), the campus power signal statistics (e.g., the mean and standard deviation of $P_{campus}$), $\text{Reg}_{award}$, midpoint b, the SOC of battery 108, and/or other variables that have known or controlled values.

In some embodiments, battery degradation estimator 418 measures the cell temperature $T_{cell}$ using a temperature sensor configured to measure the temperature of battery 108. In other embodiments, battery degradation estimator 418 estimates or predicts the cell temperature $T_{cell}$ based on a history of measured temperature values. For example, battery degradation estimator 418 may use a predictive model to estimate the cell temperature $T_{cell}$ as a function of the battery power $P_{bat}$, the ambient temperature, and/or other variables that can be measured, estimated, or controlled by high level controller 312.

Battery degradation estimator 418 may define the variable SOC in the battery life model as the SOC of battery 108 at the end of the frequency response period. The SOC of battery 108 may be measured or estimated based on the control decisions made by controller 112. For example, battery degradation estimator 418 may use a predictive model to estimate or predict the SOC of battery 108 at the end of the frequency response period as a function of the battery power $P_{bat}$, the midpoint b, and/or other variables that can be measured, estimated, or controlled by high level controller 312.

Battery degradation estimator 418 may define the average power ratio PR as the ratio of the average power output of battery 108 (i.e., $P_{avg}$) to the design power $P_{des}$ $$\left(\text{e.g., } PR = \frac{P_{avg}}{P_{des}}\right).$$

The average power output of battery 108 can be defined using the following equation:

$$P_{avg}=E\{|\text{Reg}_{award}\text{Reg}_{signal}+b-P_{loss}-P_{campus}|\}$$

where the expression $(\text{Reg}_{award}\text{Reg}_{signal}+b-P_{loss}-P_{campus})$ represents the battery power $P_{bat}$. The expected value of $P_{avg}$ is given by:

$$P_{avg} = \sigma_{bat}\sqrt{\frac{2}{\pi}}\exp\left(\frac{-\mu_{bat}^2}{2\sigma_{bat}^2}\right) + \text{erf}\left(\frac{-\mu_{bat}^2}{\sqrt{2\sigma_{bat}^2}}\right)$$

where $\mu_{bat}$ and $\sigma_{bat}^2$ are the mean and variance of the battery power $P_{bat}$. The variables $\mu_{bat}$ and $\sigma_{bat}^2$ may be defined as follows:

$$\mu_{bat}=\text{Reg}_{award}E\{\text{Reg}_{signal}\}+b-E\{P_{loss}\}-E\{P_{campus}\}$$

$$\sigma_{bat}^2=\text{Reg}_{award}^2\sigma_{FR}^2+\sigma_{campus}^2$$

where $\sigma_{FR}^2$ is the variance of $\text{Re}_{signal}$ and the contribution of the battery power loss to the variance $\sigma_{bat}^2$ is neglected.

Battery degradation estimator 418 may define the average effort ratio ER as the ratio of the average change in battery power $\Delta P_{avg}$ to the design power $P_{des}$ $$\left(\text{i.e., } ER = \frac{\Delta P_{avg}}{P_{des}}\right).$$

The average change in battery power can be defined using the following equation:

$$\Delta P_{avg} = E\{P_{bat,k} - P_{bat,k-1}\}$$

$$\Delta P_{avg} = E\{|Reg_{award}(Reg_{signal,k} - Reg_{signal,k-1}) -$$

$$(P_{loss,k} - P_{loss,k-1}) - (P_{campus,k} - P_{campus,k-1})|\}$$

To make this calculation more tractable, the contribution due to the battery power loss can be neglected. Additionally, the campus power $P_{campus}$ and the regulation signal $Reg_{signal}$ can be assumed to be uncorrelated, but autocorrelated with first order autocorrelation parameters of $\alpha_{campus}$ and $\alpha$, respectively. The argument inside the absolute value in the equation for $\Delta P_{avg}$ has a mean of zero and a variance given by:

$$\sigma_{diff}^2 = E\{[Reg_{award}(Reg_{signal,k} - Reg_{signal,k-1}) - (P_{campus,k} - P_{campus,k-1})]^2\}$$

$$= E\{Reg_{award}^2(Reg_{signal,k} - Reg_{signal,k-1})^2 - (P_{campus,k} - P_{campus,k-1})^2\}$$

$$= 2Reg_{award}^2(1-\alpha)\sigma_{FR}^2 + 2(1-\alpha_{campus})\sigma_{campus}^2$$

Battery degradation estimator 418 may define the depth of discharge DOD as the maximum state-of-charge minus the minimum state-of-charge of battery 108 over the frequency response period, as shown in the following equation:

$$DOD = SOC_{max} - SOC_{min}$$

The SOC of battery 108 can be viewed as a constant slope with a zero mean random walk added to it, as previously described. An uncorrelated normal random walk with a driving signal that has zero mean has an expected range given by:

$$E\{max - min\} = 2\sigma\sqrt{\frac{2N}{\pi}}$$

where E{max−min} represent the depth of discharge DOD and can be adjusted for the autocorrelation of the driving signal as follows:

$$E\{max - min\} = 2\sigma_{bat}\sqrt{\frac{1+\alpha_{bat}}{1-\alpha_{bat}}}\sqrt{\frac{2N}{\pi}}$$

$$\sigma_{bat}^2 = Reg_{award}^2\sigma_{FR}^2 + \sigma_{campus}^2$$

$$\alpha_{bat} = \frac{Reg_{award}^2\alpha\sigma_{FR}^2 + \alpha_{campus}\sigma_{campus}^2}{Reg_{award}^2\sigma_{FR}^2 + \sigma_{campus}^2}$$

If the SOC of battery 108 is expected to change (i.e., is not zero mean), the following equation may be used to define the depth of discharge:

$$E\{max - min\} = \begin{cases} R_0 + c \cdot \Delta SOC \cdot \exp\left(-\alpha\frac{R_0 - \Delta SOC}{\sigma_{bat}}\right) & \Delta SOC < R_0 \\ \Delta SOC + c \cdot R_0 \cdot \exp\left(-\alpha\frac{\Delta SOC - R_0}{\sigma_{bat}}\right) & \Delta SOC > R_0 \end{cases}$$

where $R_0$ is the expected range with zero expected change in the state-of-charge. Battery degradation estimator 418 may use the previous equations to establish a relationship between the capacity loss $C_{loss,add}$ and the control outputs provided by controller 112.

Still referring to FIG. 4A, variable SOC controller 408 is shown to include a revenue loss estimator 420. Revenue loss estimator 420 may be configured to estimate an amount of potential revenue that will be lost as a result of the battery capacity loss $C_{loss,add}$. In some embodiments, revenue loss estimator 420 converts battery capacity loss $C_{loss,add}$ into lost revenue using the following equation:

$$R_{loss} = (CP_{cap} + MR \cdot CP_{perf})C_{loss,add}P_{des}$$

where $R_{loss}$ is the lost revenue over the duration of the frequency response period.

Revenue loss estimator 420 may determine a present value of the revenue loss $R_{loss}$ using the following equation:

$$\lambda_{bat} = \left[\frac{1-\left(1+\frac{i}{n}\right)^{-n}}{\frac{i}{n}}\right]R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 420 may provide the present value of the revenue loss $\lambda_{bat}$ to midpoint optimizer 412 for use in the objective function J.

Midpoint optimizer 412 may use the inputs from optimization constraints module 414, FR revenue estimator 416, battery degradation estimator 418, and revenue loss estimator 420 to define the terms in objective function J. Midpoint optimizer 412 may determine values for midpoint b that optimize objective function J. In various embodiments, midpoint optimizer 412 may use sequential quadratic programming, dynamic programming, or any other optimization technique.

Still referring to FIG. 4A, high level controller 312 is shown to include a capability bid calculator 422. Capability bid calculator 422 may be configured to generate a capability bid $Reg_{award}$ based on the midpoint b generated by constant SOC controller 402 and/or variable SOC controller 408. In some embodiments, capability bid calculator 422 generates a capability bid that is as large as possible for a given midpoint, as shown in the following equation:

$$Reg_{award} = P_{limit} - |b|$$

where $P_{limit}$ is the power rating of power inverter 106. Capability bid calculator 422 may provide the capability bid to incentive provider 114 and to frequency response optimizer 424 for use in generating an optimal frequency response.

Filter Parameters Optimization

Still referring to FIG. 4A, high level controller 312 is shown to include a frequency response optimizer 424 and a filter parameters optimizer 426. Filter parameters optimizer 426 may be configured to generate a set of filter parameters for low level controller 314. The filter parameters may be used by low level controller 314 as part of a low-pass filter that removes high frequency components from the regulation signal $Reg_{signal}$. In some embodiments, filter parameters optimizer 426 generates a set of filter parameters that transform the regulation signal $Reg_{signal}$ into an optimal frequency response signal $Res_{FR}$. Frequency response optimizer 424 may perform a second optimization process to determine the optimal frequency response Res$_{FR}$ based on the values for Reg$_{award}$ and midpoint b. In the second optimization, the values for Reg$_{award}$ and midpoint b may be fixed at the values previously determined during the first optimization.

In some embodiments, frequency response optimizer 424 determines the optimal frequency response Res$_{FR}$ by optimizing value function J shown in the following equation:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where the frequency response revenue Rev(Reg$_{award}$) is defined as follows:

$$Rev(Reg_{award}) = PS \cdot Reg_{award}(CP_{cap} + MR \cdot CP_{perf})$$

and the frequency response Res$_{FR}$ is substituted for the regulation signal Reg$_{signal}$ in the battery life model used to calculate $\lambda_{bat,k}$. The performance score PS may be based on several factors that indicate how well the optimal frequency response Res$_{FR}$ tracks the regulation signal Reg$_{signal}$.

The frequency response Res$_{FR}$ may affect both Rev(Reg$_{award}$) and the monetized cost of battery degradation $\lambda_{bat}$. Closely tracking the regulation signal may result in higher performance scores, thereby increasing the frequency response revenue. However, closely tracking the regulation signal may also increase the cost of battery degradation $\lambda_{bat}$. The optimized frequency response Res$_{FR}$ represents an optimal tradeoff between decreased frequency response revenue and increased battery life (i.e., the frequency response that maximizes value J).

In some embodiments, the performance score PS is a composite weighting of an accuracy score, a delay score, and a precision score. Frequency response optimizer 424 may calculate the performance score PS using the performance score model shown in the following equation:

$$PS = \frac{1}{3}PS_{acc} + \frac{1}{3}PS_{delay} + \frac{1}{3}PS_{prec}$$

where PS$_{acc}$ is the accuracy score, PS$_{delay}$ is the delay score, and PS$_{prec}$ is the precision score. In some embodiments, each term in the precision score is assigned an equal weighting (e.g., ⅓). In other embodiments, some terms may be weighted higher than others.

The accuracy score PS$_{acc}$ may be the maximum correlation between the regulation signal Reg$_{signal}$ and the optimal frequency response Res$_{FR}$. Frequency response optimizer 424 may calculate the accuracy score PS$_{acc}$ using the following equation:

$$PS_{acc} = \max_{\delta} r_{Reg,Res(\delta)}$$

where $\delta$ is a time delay between zero and $\delta_{max}$ (e.g., between zero and five minutes).

The delay score PS$_{delay}$ may be based on the time delay $\delta$ between the regulation signal Reg$_{signal}$ and the optimal frequency response Res$_{FR}$. Frequency response optimizer 424 may calculate the delay score PS$_{delay}$ using the following equation:

$$PS_{delay} = \left| \frac{\delta[s] - \delta_{max}}{\delta_{max}} \right|$$

where $\delta[s]$ is the time delay of the frequency response Res$_{FR}$ relative to the regulation signal Reg$_{signal}$ and $\delta_{max}$ is the maximum allowable delay (e.g., 5 minutes or 300 seconds).

The precision score PS$_{prec}$ may be based on a difference between the frequency response Res$_{FR}$ and the regulation signal Reg$_{signal}$. Frequency response optimizer 424 may calculate the precision score PS$_{prec}$ using the following equation:

$$PS_{prec} = 1 - \frac{\sum |Res_{FR} - Reg_{signal}|}{\sum |Reg_{signal}|}$$

Frequency response optimizer 424 may use the estimated performance score and the estimated battery degradation to define the terms in objective function J. Frequency response optimizer 424 may determine values for frequency response Res$_{FR}$ that optimize objective function J. In various embodiments, frequency response optimizer 424 may use sequential quadratic programming, dynamic programming, or any other optimization technique.

Filter parameters optimizer 426 may use the optimized frequency response Res$_{FR}$ to generate a set of filter parameters for low level controller 314. In some embodiments, the filter parameters are used by low level controller 314 to translate an incoming regulation signal into a frequency response signal. Low level controller 314 is described in greater detail with reference to FIG. 5A.

Clipping Parameter Optimization

Figure 4B:
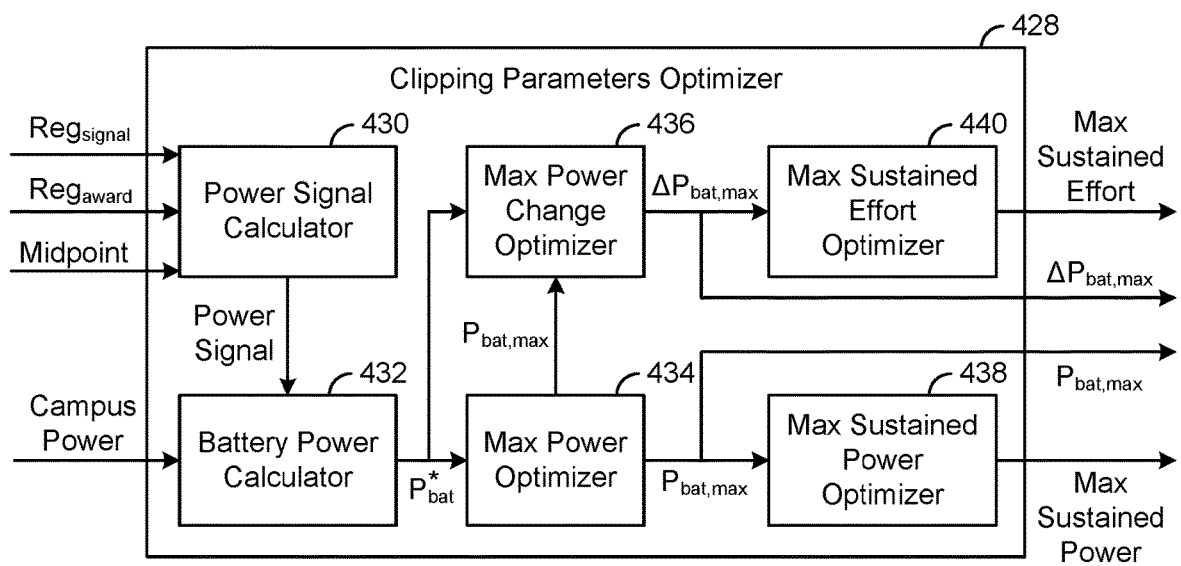
FIG. 4B is a block diagram illustrating the clipping parameter optimizer of FIG. 4A in greater detail, according to an exemplary embodiment.

Referring now to FIGS. 4A-4B, high level controller 312 is shown to include a clipping parameters optimizer 428. Clipping parameters optimizer 428 can be configured to generate a set of clipping parameters that are used by low level controller 314 to modify the battery power setpoints provided to power inverter 106. The battery power setpoints affect the frequency response of system 100 and consequently influence how closely the frequency response tracks the regulation signal Reg$_{signal}$. Closely tracking the regulation signal Reg$_{signal}$ may result in higher performance scores, thereby increasing the frequency response revenue Rev(Reg$_{award}$). However, closely tracking the regulation signal may also increase the cost of battery degradation $\lambda_{bat}$.

Before discussing clipping parameters optimizer 428 in greater detail, it should be noted that the variable P$_{bat}$ is used throughout this disclosure to designate the battery power, the battery power setpoints, and/or the battery power signal. The terms "battery power setpoints" and "battery power signal" are used interchangeably to designate the setpoints/control signals provided as an output from frequency response controller 112 to power inverter 106 and used by power inverter 106 to control the amount of power stored or discharged from battery 108 at each time step (i.e., the battery power). The battery power signal may be a continuous signal or a time series of discrete battery power setpoints (e.g., a battery power setpoint for each time step). The variable P$_{bat}$ is used to represent each of these items in various contexts.

Additionally, the term "clipping parameter" is used herein to designate any parameter that can be used to modify battery power setpoints or impose constraints on the battery power setpoints. For example, some clipping parameters limit the battery power setpoints within a predefined range, whereas other clipping parameters limit the rate at which the battery power setpoints can change over time, and other clipping parameters may limit the average value of the battery power setpoints over a given horizon. It should be understood that the clipping parameters may include any of a variety of parameters in addition to parameters that "clip" the battery power setpoints.

Clipping parameters optimizer 428 can be configured to generate a set of clipping parameters that, when applied to the battery power setpoints, result in modified battery power setpoints that represent an optimal tradeoff between decreased frequency response revenue and increased battery life (i.e., the frequency response that maximizes the objective function J). The clipping parameters generated by clipping parameters optimizer 428 may include, for example, a maximum battery charging power parameter $P_{bat,max,charge}$, a maximum battery discharging power parameter $P_{bat,max,discharge}$, a maximum change in charging power parameter $\Delta P_{bat,max,charge}$, a maximum change in discharging power parameter $\Delta P_{bat,max,discharge}$, a maximum sustained charging power parameter $P_{bat,max,charge\_sustained}$, a maximum sustained discharging power parameter $P_{bat,max,discharge\_sustained}$, and a maximum sustained effort parameter $P_{bat,max,effort}$. These parameters can be used by low level controller 314 to modify the battery power setpoints provided to power inverter 106.

For example, low level controller 314 can clip the battery power setpoints such that the battery charging power is no greater than $P_{bat,max,charge}$ and the battery discharging power is no greater than $P_{bat,max,discharge}$ at any given time step. Similarly, low level controller 314 can clip the battery power setpoints such that the change in battery charging power between consecutive time steps is no greater than $\Delta P_{bat,max,charge}$ and the change in battery discharging power between consecutive time steps is no greater than $\Delta P_{bat,max,discharge}$. Low level controller 314 can clip the battery power setpoints such that the average battery charging power over a given time period is no greater than $P_{bat,max,charge\_sustained}$ and the average battery discharging power over a given time period is no greater than $P_{bat,max,discharge\_sustained}$. Similarly, low level controller 314 can clip the battery power setpoints such that the average change in battery charging power or discharging power between consecutive time steps over a given time period is no greater than $P_{bat,max,effort}$. The clipping operations performed by low level controller 314 are described in greater detail with reference to FIGS. 5B-10.

Referring particularly to FIG. 4B, clipping parameters optimizer 428 is shown to include a power signal calculator 430 and a battery power calculator 432. Power signal calculator 430 can be configured to calculate a power signal $Power_{signal}$ by multiplying the regulation signal $Reg_{signal}$ by the value of $Reg_{award}$ and adding the midpoint b, as shown in the following equation:

$$Power_{signal} = (Reg_{signal})(Reg_{award}) + b$$

In some embodiments, $Power_{signal}$ is the same as the desired power $P_{POI}^*$ exchanged between POI 110 and energy grid 104, which is the sum of the campus power $P_{campus}$ and the desired battery power $P_{bat}^*$. Battery power calculator 432 can be configured to determine the desired battery power $P_{bat}^*$ by subtracting $P_{campus}$ from $Power_{signal}$ as shown in the following equation:

$$P_{bat}^* = Power_{signal} - P_{campus}$$

where $P_{bat}^*$ represents the unbounded (i.e., unmodified) battery power before any clipping parameters are applied.

Clipping parameters optimizer 428 is shown to include a maximum power optimizer 434. Maximum power optimizer 434 can be configured to determine optimal values for the maximum battery charging power parameter $P_{bat,max,charge}$ and the maximum battery discharging power parameter $P_{bat,max,discharge}$. In some embodiments, maximum power optimizer 434 determines the optimal values of $P_{bat,max,charge}$ and $P_{bat,max,discharge}$ by optimizing the objective function:

$$J = \sum_{k=1}^{h} [Reg_{award,k}(CP_{cap} + MR \cdot CP_{perf})] \left[\frac{1}{3}PS_{acc} + \frac{1}{3}PS_{delay} + \frac{1}{3}PS_{prec}\right] - \lambda_{bat,k}$$

subject to constraints that clip the battery power $P_{bat,k}$ using the maximum battery charging power parameter $P_{bat,max,charge}$ and the maximum battery discharging power parameter $P_{bat,max,discharge}$.

For example, the battery power $P_{bat,k}$ can be constrained as follows:

$$P_{bat,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,k}$ is clipped to $P_{bat,max,discharge}$ (i.e., set equal to $P_{bat,max,discharge}$) if the unbounded value of $P_{bat,k}^*$ exceeds $P_{bat,max,discharge}$ and is clipped to $-P_{bat,max,charge}$ (i.e., set equal to $-P_{bat,max,charge}$) if the unbounded value of $P_{bat,k}^*$ is less than $-P_{bat,max,charge}$. However, if the unbounded value of $P_{bat,k}^*$ is between $-P_{bat,max,charge}$ and $P_{bat,max,discharge}$, the value of $P_{bat,k}$ is equal to the unbounded value of $P_{bat,k}^*$.

As discussed above, the value of $P_{bat}$ affects the frequency response $Res_{FR}$ of system 100 and consequently affects how closely the frequency response $Res_{FR}$ tracks the regulation signal $Reg_{signal}$. For example, the frequency response $Res_{FR}$ can be defined as a function of the battery power $P_{bat}$ as shown in the following equation:

$$Res_{FR} = \frac{P_{bat} + P_{campus} - b}{Reg_{award}}$$

which can be implemented as a constraint on the optimization performed by maximum power optimizer 434. Maximum power optimizer 434 can use the frequency response $Res_{FR}$ to calculate the components of the performance score (i.e., $PS_{acc}$, $PS_{delay}$, and $PS_{prec}$) as described with reference to filter parameters optimizer 426. Maximum power optimizer 434 can substitute $Res_{FR}$ for $Res_{signal}$ to calculate the monetized cost of battery degradation $\lambda_{bat,k}$ as described with reference to battery degradation estimator 418. With these constraints in place, maximum power optimizer 434 can optimize the objective function J using sequential quadratic programming, dynamic programming, or any other optimization technique.

In the optimization performed by maximum power optimizer 434, the maximum battery charging power parameter $P_{bat,max,charge}$ and the maximum battery discharging power parameter $P_{bat,max,discharge}$ are the variables to be optimized. Larger values $P_{bat,max,charge}$ and $P_{bat,max,discharge}$ result in less clipping of the unbounded battery power $P_{bat,k}^*$ and therefore allow $Res_{FR}$ to closely track the regulation signal $Reg_{signal}$. Closely tracking the regulation signal $Reg_{signal}$ may result in higher performance scores, thereby increasing the frequency response revenue. However, closely tracking the regulation signal may also increase the cost of battery degradation $\lambda_{bat}$.

Conversely, smaller values of $P_{bat,max,charge}$ and $P_{bat,max,discharge}$ result in more clipping of the unbounded battery power $P_{bat,k}^*$ and therefore cause $Res_{FR}$ to track the regulation signal $Reg_{signal}$ less closely. Tracking the regulation signal $Reg_{signal}$ less closely may result in lower performance scores, thereby decreasing the frequency response revenue. However, tracking the regulation signal less closely may also decrease the cost of battery degradation $\lambda_{bat}$. The optimization performed by maximum power optimizer 434 results in values of $P_{bat,max,charge}$ and $P_{bat,max,discharge}$ that represent an optimal tradeoff between frequency response revenue and battery degradation costs (i.e., the frequency response that maximizes the objective function J).

In some embodiments, the optimization performed by maximum power optimizer 434 optimizes both $P_{bat,max,charge}$ and $P_{bat,max,discharge}$ simultaneously. In other words, the optimization may be a multi-variable optimization. However, it is contemplated that the optimization can be a single-variable optimization in other embodiments. For example, $P_{bat,max,charge}$ and $P_{bat,max,discharge}$ can be set equal to each other (i.e., $P_{bat,max,charge} = P_{bat,max,discharge} = P_{bat,max}$) and treated as a single variable in the optimization. Alternatively, either $P_{bat,max,charge}$ or $P_{bat,max,discharge}$ can be omitted from the optimization such that the optimization is performed using only a single optimization variable. The optimal values of $P_{bat,max,charge}$, $P_{bat,max,discharge}$, and/or $P_{bat,max}$ can be output as clipping parameters to low level controller 314.

Still referring to FIG. 4B, clipping parameters optimizer 428 is shown to include a maximum power change optimizer 436. Maximum power change optimizer 436 can be configured to determine optimal values for the maximum change in charging power parameter $\Delta P_{bat,max,charge}$ and the maximum change in discharging power parameter $\Delta P_{bat,max,discharge}$. In some embodiments, maximum power change optimizer 436 determines the optimal values of $\Delta P_{bat,max,charge}$ and $\Delta P_{bat,max,discharge}$ by optimizing the objective function:

$$J = \sum_{k=1}^{h} [Reg_{award,k}(CP_{cap} + MR \cdot CP_{perf})] \left[ \frac{1}{3} PS_{acc} + \frac{1}{3} PS_{delay} + \frac{1}{3} PS_{prec} \right] - \lambda_{bat,k}$$

subject to constraints that clip the battery power $P_{bat,k}$ using the maximum battery charging power parameter $P_{bat,max,charge}$, the maximum battery discharging power parameter $P_{bat,max,discharge}$, the maximum change in charging power parameter $\Delta P_{bat,max,charge}$, and the maximum change in discharging power parameter $\Delta P_{bat,max,discharge}$.

For example, maximum power change optimizer 436 is shown receiving the unbounded power signal $P_{bat}^*$ from battery power calculator 432 and the optimal values of the maximum power parameters $P_{bat,max,charge}$ and $P_{bat,max,discharge}$ from maximum power optimizer 434. Maximum power change optimizer 436 can apply the optimal clipping parameters $P_{bat,max,charge}$ and $P_{bat,max,discharge}$ generated by maximum power optimizer 434 to the unbounded power signal $P_{bat}^*$ to generate a clipped power signal $P_{bat,clip}$ as shown in the following equation:

$$P_{bat,clip,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,clip,k}$ is clipped to $P_{bat,max,discharge}$ (i.e., set equal to $P_{bat,max,discharge}$) if the unbounded value of $P_{bat,k}^*$ exceeds $P_{bat,max,discharge}$ and is clipped to $-P_{bat,max,charge}$ (i.e., set equal to $P_{bat,max,charge}$) if the unbounded value of $P_{bat,k}^*$ is less than $-P_{bat,max,charge}$. However, if the unbounded value of $P_{bat,k}^*$ is between $-P_{bat,max,charge}$ and $P_{bat,max,discharge}$, the value of $P_{bat,clip,k}$ is equal to the unbounded value of $P_{bat,k}^*$.

Maximum power change optimizer 436 can then impose power change constraints on the clipped power signal $P_{bat,clip}$ as shown in the following equations:

if $P_{bat,clip,k} < 0$(battery is charging)

$$P_{bat,k} = \begin{cases} P_{bat,clip,k} & \text{if } |P_{bat,clip,k} - P_{bat,k-1}| \leq \Delta P_{bat,max,charge} \\ P_{bat,k-1} - \Delta P_{bat,max,charge} & \text{if } P_{bat,k-1} - P_{bat,clip,k} > \Delta P_{bat,max,charge} \\ P_{bat,k-1} + \Delta P_{bat,max,charge} & \text{if } P_{bat,clip,k} - P_{bat,k-1} > P_{bat,max,charge} \end{cases}$$

elseif $P_{bat,clip,k} > 0$(battery is discharging)

$$P_{bat,k} = \begin{cases} P_{bat,clip,k} & \text{if } |P_{bat,clip,k} - P_{bat,k-1}| \leq \Delta P_{bat,max,discharge} \\ P_{bat,k-1} - \Delta P_{bat,max,discharge} & \text{if } P_{bat,k-1} - P_{bat,clip,k} > \Delta P_{bat,max,discharge} \\ P_{bat,k-1} + \Delta P_{bat,max,discharge} & \text{if } P_{bat,clip,k} - P_{bat,k-1} > P_{bat,max,discharge} \end{cases}$$

where the first set of equations constrain the value of $P_{bat,k}$ when $P_{bat,clip,k} < 0$ (i.e., battery 108 is charging) and the second set of equations constrain the value of $P_{bat,k}$ when $P_{bat,clip,k} > 0$ (i.e., battery 108 is discharging).

The first set of constraints specify that the value of $P_{bat}$ cannot increase or decrease by more than $\Delta P_{bat,max,charge}$ between time step k−1 and time step k when battery 108 is charging (i.e., when $P_{bat,clip,k} < 0$). Accordingly, if the clipped battery power $P_{bat,clip,k}$ at time step k is less than the battery power setpoint $P_{bat,k-1}$ at time step k−1 by an amount that exceeds $\Delta P_{bat,max,charge}$ (i.e., $P_{bat,k-1} + P_{bat,clip,k} > \Delta P_{bat,max,charge}$), the battery power setpoint $P_{bat,k}$ at time step k will be set to $P_{bat,k-1} - \Delta P_{bat,max,charge}$. Similarly, if the clipped battery power $P_{bat,clip,k}$ at time step k exceeds the battery power setpoint $P_{bat,k-1}$ at time step k−1 by an amount that exceeds $\Delta P_{bat,max,charge}$ (i.e., $P_{bat,clip,k} - P_{bat,k-1} > \Delta P_{bat,max,charge}$), the battery power setpoint $P_{bat,k}$ at time step k will be set to $P_{bat,k-1} + \Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,charge}$ (i.e., $|P_{bat,clip,k} - P_{bat,k-1}| \leq \Delta P_{bat,max,charge}$), the battery power setpoint $P_{bat,k}$ at time step k will be equal to the clipped battery power $P_{bat,clip,k}$ at time step k.

The second set of constraints specify that the value of $P_{bat}$ cannot increase or decrease by more than $\Delta P_{bat,max,discharge}$ between time step k−1 and time step k when battery 108 is discharging (i.e., when $P_{bat,clip,k} > 0$). Accordingly, if the clipped battery power $P_{bat,clip,k}$ at time step k is less than the battery power setpoint $P_{bat,k-1}$ at time step k−1 by an amount that exceeds $\Delta P_{bat,max,discharge}$ (i.e., $P_{bat,k-1} \, P_{bat,clip,k} > \Delta P_{bat,max,discharge}$), the battery power setpoint $P_{bat,k}$ at time step k will be set to $P_{bat,k-1} \, \Delta P_{bat,max,discharge}$. Similarly, if the clipped battery power $P_{bat,clip,k}$ at time step k exceeds the battery power setpoint P time step k−1 by an amount that exceeds $\Delta P_{bat,max,discharge}$ (i.e., $P_{bat,clip,k}-P_{bat,k-1} > \Delta P_{bat,max,discharge}$), the battery power setpoint $P_{bat,k}$ at time step k will be set to $P_{bat,k-1}+\Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,discharge}$ (i.e., $|P_{bat,clip,k}-P_{bat,k-1}| \leq \Delta P_{bat,max,discharge}$), the battery power setpoint $P_{bat,k}$ at time step k will be equal to the clipped battery power $P_{bat,clip,k}$ at time step k.

As discussed above, the value of $P_{bat}$ affects the frequency response $Res_{FR}$ of system 100 and consequently affects how closely the frequency response $Res_{FR}$ tracks the regulation signal $Reg_{signal}$. For example, the frequency response $Res_{FR}$ can be defined as a function of the battery power $P_{bat}$ as shown in the following equation:

$$Res_{FR} = \frac{P_{bat} + P_{campus} - b}{Reg_{award}}$$

which can be implemented as a constraint on the optimization performed by maximum power change optimizer 436. Maximum power change optimizer 436 can use the frequency response $Res_{FR}$ to calculate the components of the performance score (i.e., $PS_{acc}$, $PS_{delay}$, and $PS_{prec}$) as described with reference to filter parameters optimizer 426. Maximum power change optimizer 436 can substitute $Res_{FR}$ for $Res_{signal}$ to calculate the monetized cost of battery degradation $\lambda_{bat,k}$ as described with reference to battery degradation estimator 418. With these constraints in place, maximum power change optimizer 436 can optimize the objective function J using sequential quadratic programming, dynamic programming, or any other optimization technique.

In the optimization performed by maximum power change optimizer 436, the maximum change in charging power parameter $\Delta P_{bat,max,charge}$ and the maximum change in discharging power parameter $\Delta P_{bat,max,discharge}$ are the variables to be optimized. Larger values $\Delta P_{bat,max,charge}$ and $\Delta P_{bat,max,discharge}$ result in less clipping of the battery power $P_{bat,clip}$ and therefore allow $Res_{FR}$ to closely track the regulation signal $Reg_{signal}$. Closely tracking the regulation signal $Reg_{signal}$ may result in higher performance scores, thereby increasing the frequency response revenue. However, closely tracking the regulation signal may also increase the cost of battery degradation $\lambda_{bat}$.

Conversely, smaller values of $\Delta P_{bat,max,charge}$ and $\Delta P_{bat,max,discharge}$ result in more clipping of the battery power $P_{bat,clip}$ and therefore cause $Res_{FR}$ to track the regulation signal $Reg_{signal}$ less closely. Tracking the regulation signal $Reg_{signal}$ less closely may result in lower performance scores, thereby decreasing the frequency response revenue. However, tracking the regulation signal less closely may also decrease the cost of battery degradation $\lambda_{bat}$. The optimization performed by maximum power change optimizer 436 results in values of $\Delta P_{bat,max,charge}$ and $\Delta P_{bat,max,discharge}$ that represent an optimal tradeoff between frequency response revenue and battery degradation costs (i.e., the frequency response that maximizes the objective function J).

In some embodiments, the optimization performed by maximum power change optimizer 436 optimizes both $\Delta P_{bat,max,charge}$ and $\Delta P_{bat,max,discharge}$ simultaneously. In other words, the optimization may be a multi-variable optimization. However, it is contemplated that the optimization can be a single-variable optimization in other embodiments. For example, $\Delta P_{bat,max,charge}$ and $\Delta P_{bat,max,discharge}$ can be set equal to each other (i.e., $\Delta P_{bat,max,charge} = \Delta P_{bat,max,discharge} = \Delta P_{bat,max}$) and treated as a single variable in the optimization. Alternatively, either $\Delta P_{bat,max,charge}$ or $\Delta P_{bat,max,discharge}$ can be omitted from the optimization such that the optimization is performed using only a single optimization variable. The optimal values of $\Delta P_{bat,max,charge}$, $\Delta P_{bat,max,discharge}$, and/or $\Delta P_{bat,max}$ can be output as clipping parameters to low level controller 314.

Still referring to FIG. 4B, clipping parameters optimizer 428 is shown to include a maximum sustained power optimizer 438 and a maximum sustained effort optimizer 440. Maximum sustained power optimizer 438 can be configured to generate values for the maximum sustained charging power parameter $P_{bat,max,charge\_sustained}$ and the maximum sustained discharging power parameter $P_{bat,max,discharge\_sustained}$. The parameters $P_{bat,max,charge\_sustained}$ and $P_{bat,max,discharge\_sustained}$ impose limits on the average value of $P_{bat}$ over a predetermined time period (e.g., five minutes, fifteen minutes, etc.), which helps limit battery degradation caused by extended periods of high battery power usage. This average value of $P_{bat}$ is referred to herein as the sustained battery power $P_{bat,sustained}$. Low level controller 314 can be configured to modify the battery power signal $P_{bat}$ such that the sustained battery power $P_{bat,sustained}$ is maintained between $P_{bat,max,discharge\_sustained}$ and $-P_{bat,max,charge\_sustained}$.

In some embodiments, maximum sustained power optimizer 438 sets the values of $P_{bat,max,charge\_sustained}$ and $P_{bat,max,discharge\_sustained}$ to a predetermined fraction or ratio of the values of $P_{bat,max,charge}$ and $P_{bat,max,discharge}$, respectively. For example, maximum sustained power optimizer 438 can be configured to calculate values of $P_{bat,max,charge\_sustained}$ and $P_{bat,max,discharge\_sustained}$ using the following equations:

$$P_{bat,max,charge\_sustained} = S_{charge} * P_{bat,max,charge}$$

$$P_{bat,max,discharge\_sustained} = S_{discharge} * P_{bat,max,discharge}$$

where $S_{charge}$ and $S_{discharge}$ have predetermined values between zero and one (e.g., 0.5, 0.6, 0.7, 0.75, 0.8, 0.85, etc.). In some embodiments, the values of $S_{charge}$ and $S_{discharge}$ are approximately 0.75. The values of $P_{bat,max,charge\_sustained}$ and $P_{bat,max,discharge\_sustained}$ can be output as clipping parameters to low level controller 314.

Maximum sustained effort optimizer 440 can be configured to generate a value for the maximum sustained effort parameter $P_{bat,max,effort}$. The parameter $P_{bat,max,effort}$ imposes limits on the average value of $\Delta P_{bat}$ over a predetermined time period (e.g., five minutes, fifteen minutes, etc.), which helps limit battery degradation caused by extended periods of large changes in battery power $\Delta P_{bat}$. This average value of $\Delta P_{bat}$ is referred to herein as the sustained battery effort $\Delta P_{bat,sustained}$. Low level controller 314 can be configured to modify the battery power signal $P_{bat}$ such that the sustained battery effort $\Delta P_{bat,sustained}$ is less than $P_{bat,max,effort}$.

In some embodiments, maximum sustained effort optimizer 440 sets the value of $P_{bat,max,effort}$ to a predetermined fraction or ratio of the value of $\Delta P_{bat,max,charge}$ and/or $\Delta P_{bat,max,discharge}$. For example, maximum sustained effort optimizer 440 can be configured to calculate the value of $P_{bat,max,effort}$ using either of the following equations:

$$P_{bat,max,effort} = S_{effort} * \Delta P_{bat,max,charge}$$

$$P_{bat,max,effort} = S_{effort} * \Delta P_{bat,max,discharge}$$

where $S_{effort}$ has a predetermined value between zero and one (e.g., 0.5, 0.6, 0.7, 0.75, 0.8, 0.85, etc.). In some embodiments, the value of $S_{effort}$ is approximately 0.75. The value of $P_{bat,max,effort}$ can be output as a clipping parameter to low level controller 314.

Low Level Controller

Figure 5A:
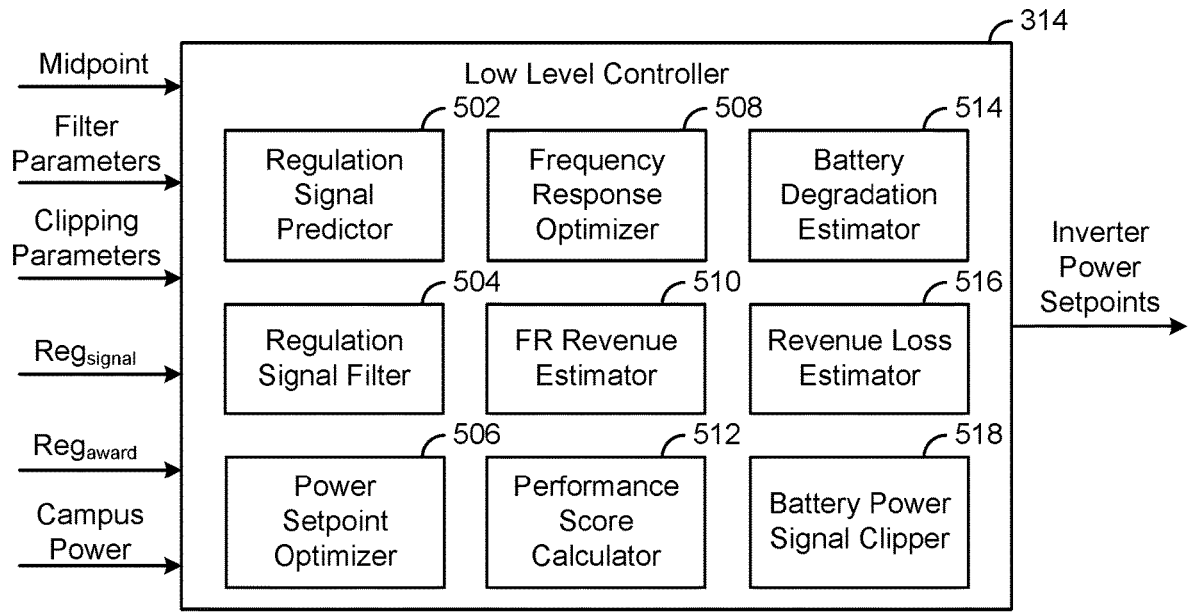
FIG. 5A is a block diagram illustrating the low level controller of FIG. 3 in greater detail, according to an exemplary embodiment.

Referring now to FIG. 5A, a block diagram illustrating low level controller 314 in greater detail is shown, according to an exemplary embodiment. Low level controller 314 may receive the midpoints b and the filter parameters from high level controller 312. Low level controller 314 may also receive the campus power signal from campus 102 and the regulation signal $Reg_{signal}$ and the regulation award $Reg_{award}$ from incentive provider 114.

Predicting and Filtering the Regulation Signal

Low level controller 314 is shown to include a regulation signal predictor 502. Regulation signal predictor 502 may use a history of past and current values for the regulation signal $Reg_{signal}$ to predict future values of the regulation signal. In some embodiments, regulation signal predictor 502 uses a deterministic plus stochastic model trained from historical regulation signal data to predict future values of the regulation signal $Reg_{signal}$. For example, regulation signal predictor 502 may use linear regression to predict a deterministic portion of the regulation signal $Reg_{signal}$ and an AR model to predict a stochastic portion of the regulation signal $Reg_{signal}$. In some embodiments, regulation signal predictor 502 predicts the regulation signal $Reg_{signal}$ using the techniques described in U.S. patent application Ser. No. 14/717,593, titled "Building Management System for Forecasting Time Series Values of Building Variables" and filed May 20, 2015.

Low level controller 314 is shown to include a regulation signal filter 504. Regulation signal filter 504 may filter the incoming regulation signal $Reg_{signal}$ and/or the predicted regulation signal using the filter parameters provided by high level controller 312. In some embodiments, regulation signal filter 504 is a low pass filter configured to remove high frequency components from the regulation signal $Reg_{signal}$. Regulation signal filter 504 may provide the filtered regulation signal to power setpoint optimizer 506.

Determining Optimal Power Setpoints

Power setpoint optimizer 506 may be configured to determine optimal power setpoints for power inverter 106 based on the filtered regulation signal. In some embodiments, power setpoint optimizer 506 uses the filtered regulation signal as the optimal frequency response. For example, low level controller 314 may use the filtered regulation signal to calculate the desired interconnection power $P_{POI}^*$ using the following equation:

$$P_{POI}^* = Reg_{award} \cdot Reg_{filter} + b$$

where $Reg_{filter}$ is the filtered regulation signal. Power setpoint optimizer 506 may subtract the campus power $P_{campus}$ from the desired interconnection power $P_{POI}^*$ to calculate the optimal power setpoints $P_{SP}$ for power inverter 106, as shown in the following equation:

$$P_{SP} = P_{POI}^* - P_{campus}$$

In other embodiments, low level controller 314 performs an optimization to determine how closely to track $P_{POI}^*$. For example, low level controller 314 is shown to include a frequency response optimizer 508. Frequency response optimizer 508 may determine an optimal frequency response $Res_{FR}$ by optimizing value function J shown in the following equation:

$$J = \sum_{k=1}^{h} Rev(Reg_{award,k}) + \sum_{k=1}^{h} c_k b_k + \min_{period}(P_{campus,k} + b_k) - \sum_{k=1}^{h} \lambda_{bat,k}$$

where the frequency response $Res_{FR}$ affects both Rev($Reg_{award}$) and the monetized cost of battery degradation $\lambda_{bat}$. The optimized frequency response $Res_{FR}$ represents an optimal tradeoff between decreased frequency response revenue and increased battery life (i.e., the frequency response that maximizes value J). The values of Rev($Reg_{award}$) and $\lambda_{bat,k}$ may be calculated by FR revenue estimator 510, performance score calculator 512, battery degradation estimator 514, and revenue loss estimator 516.

Estimating Frequency Response Revenue

Still referring to FIG. 5A, low level controller 314 is shown to include a FR revenue estimator 510. FR revenue estimator 510 may estimate a frequency response revenue that will result from the frequency response $Res_{FR}$. In some embodiments, FR revenue estimator 510 estimates the frequency response revenue using the following equation:

$$Rev(Reg_{award}) = PS \cdot Reg_{award}(CP_{cap} + MR \cdot CP_{perf})$$

where $Reg_{award}$, $CP_{cap}$, MR, and $CP_{perf}$ are provided as known inputs and PS is the performance score.

Low level controller 314 is shown to include a performance score calculator 512. Performance score calculator 512 may calculate the performance score PS used in the revenue function. The performance score PS may be based on several factors that indicate how well the optimal frequency response $Res_{FR}$ tracks the regulation signal $Reg_{signal}$. In some embodiments, the performance score PS is a composite weighting of an accuracy score, a delay score, and a precision score. Performance score calculator 512 may calculate the performance score PS using the performance score model shown in the following equation:

$$PS = \frac{1}{3}PS_{acc} + \frac{1}{3}PS_{delay} + \frac{1}{3}PS_{prec}$$

where $PS_{acc}$ is the accuracy score, $PS_{delay}$ is the delay score, and $PS_{prec}$ is the precision score. In some embodiments, each term in the precision score is assigned an equal weighting (e.g., ⅓). In other embodiments, some terms may be weighted higher than others. Each of the terms in the performance score model may be calculated as previously described with reference to FIG. 4A.

Estimating Battery Degradation

Still referring to FIG. 5A, low level controller 314 is shown to include a battery degradation estimator 514. Battery degradation estimator 514 may be the same or similar to battery degradation estimator 418, with the exception that battery degradation estimator 514 predicts the battery degradation that will result from the frequency response $Res_{FR}$ rather than the original regulation signal $Reg_{signal}$. The estimated battery degradation may be used as the term $\lambda_{batt}$ in the objective function J. Frequency response optimizer 508 may use the estimated battery degradation along with other terms in the objective function J to determine an optimal frequency response $Res_{FR}$.

In some embodiments, battery degradation estimator 514 uses a battery life model to predict a loss in battery capacity that will result from the frequency response $Res_{FR}$. The battery life model may define the loss in battery capacity $C_{loss,add}$ as a sum of multiple piecewise linear functions, as shown in the following equation:

$$C_{loss,add} = f_1(T_{cell}) + f_2(SOC) + f_3(DOD) + f_4(PR) + f_5(ER) - C_{loss,nom}$$

where $T_{cell}$ is the cell temperature, SOC is the state-of-charge, DOD is the depth of discharge, PR is the average power ratio $$\left(\text{e.g., } PR = \text{avg}\left(\frac{P_{avg}}{P_{des}}\right)\right),$$

and ER is the average effort ratio $$\left(\text{e.g., } ER = \text{avg}\left(\frac{\Delta P_{bat}}{P_{des}}\right)\right)$$

of battery 108. $C_{loss,nom}$ is the nominal loss in battery capacity that is expected to occur over time. Therefore, $C_{loss,add}$ represents the additional loss in battery capacity degradation in excess of the nominal value $C_{loss,nom}$. The terms in the battery life model may be calculated as described with reference to FIG. 4A, with the exception that the frequency response $Res_{FR}$ is used in place of the regulation signal $Reg_{signal}$.

Still referring to FIG. 5A, low level controller 314 is shown to include a revenue loss estimator 516. Revenue loss estimator 516 may be the same or similar to revenue loss estimator 420, as described with reference to FIG. 4A. For example, revenue loss estimator 516 may be configured to estimate an amount of potential revenue that will be lost as a result of the battery capacity loss $C_{loss,add}$ In some embodiments, revenue loss estimator 516 converts battery capacity loss $C_{loss,add}$ into lost revenue using the following equation:

$$R_{loss} = (CP_{cap} + MR \cdot CP_{perf}) C_{loss,add} P_{des}$$

where $R_{loss}$ is the lost revenue over the duration of the frequency response period.

Revenue loss estimator 420 may determine a present value of the revenue loss $R_{loss}$ using the following equation:

$$\lambda_{bat} = \left[\frac{1 - \left(1 + \frac{i}{n}\right)^{-n}}{\frac{i}{n}}\right] R_{loss}$$

where n is the total number of frequency response periods (e.g., hours) during which the revenue loss occurs and $\lambda_{bat}$ is the present value of the revenue loss during the ith frequency response period. In some embodiments, the revenue loss occurs over ten years (e.g., n=87,600 hours). Revenue loss estimator 420 may provide the present value of the revenue loss $\lambda_{bat}$ to frequency response optimizer 508 for use in the objective function J.

Frequency response optimizer 508 may use the estimated performance score and the estimated battery degradation to define the terms in objective function J. Frequency response optimizer 508 may determine values for frequency response $Res_{FR}$ that optimize objective function J. In various embodiments, frequency response optimizer 508 may use sequential quadratic programming, dynamic programming, or any other optimization technique.

Battery Power Signal Clipper

Figure 5B:
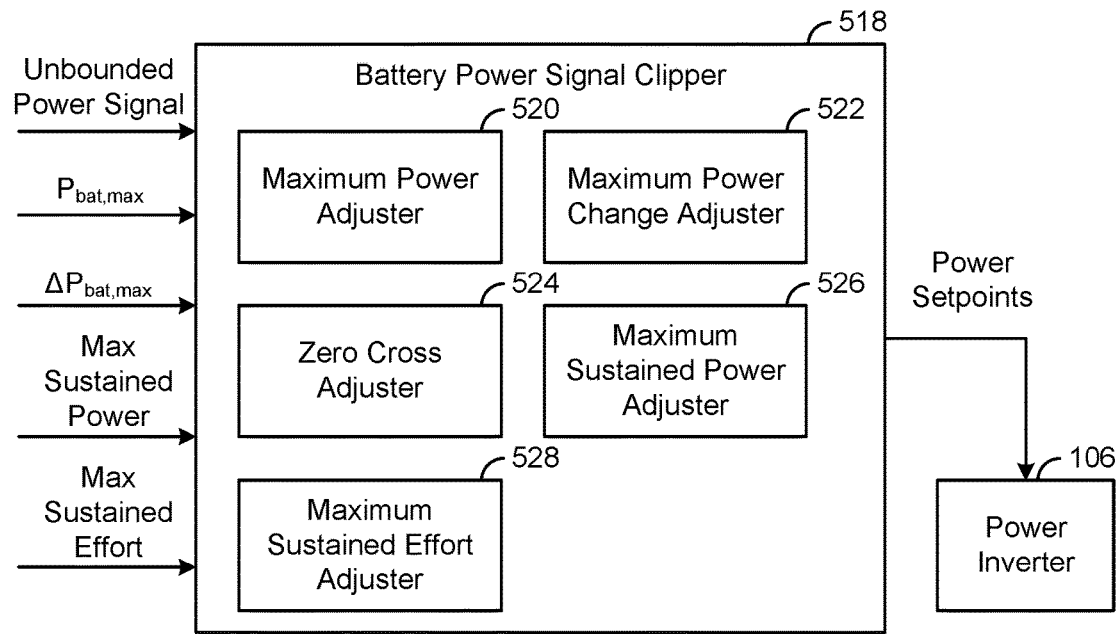
FIG. 5B is a block diagram illustrating the battery power signal clipper of FIG. 5A in greater detail, according to an exemplary embodiment.

Referring now to FIGS. 5A-5B, low level controller 314 is shown to include a battery power signal clipper 518. Battery power signal clipper 518 can be configured to generate power setpoints $P_{bat}$ for power inverter 106 by applying a set of clipping parameters to the unbounded battery power signal $P_{bat}^*$. The clipping parameters may be generated by clipping parameters optimizer 428, as previously described, and provided as an input to battery power signal clipper 518. The clipping parameters may include, for example, a maximum battery charging power parameter $P_{bat,max,charge}$, a maximum battery discharging power parameter P bat,max,discharge, a maximum change in charging power parameter $\Delta P_{bat,max,charge}$, a maximum change in discharging power parameter $\Delta P_{bat,max,discharge}$, a maximum sustained charging power parameter $P_{bat,max,charge\_sustained}$, a maximum sustained discharging power parameter $P_{bat,max,discharge\_sustained}$, and a maximum sustained effort parameter $P_{bat,max,effort}$. These parameters can be used by battery power signal clipper 518 to modify the battery power setpoints provided to power inverter 106.

In some embodiments, the unbounded battery power signal $P_{bat}^*$ is provided as an input to battery power signal clipper 518. In other embodiments, battery power signal clipper 518 generates the unbounded battery power signal $P_{bat}^*$ based on the values of $Reg_{signal}$, $Reg_{award}$, midpoint b, and the campus power signal $P_{campus}$. For example, battery power signal clipper 518 can calculate a power signal $Power_{signal}$ by multiplying the regulation signal $Reg_{signal}$ by the value of $Reg_{award}$ and adding the midpoint b, as shown in the following equation:

$$Power_{signal} = (Reg_{signal})(Reg_{award}) + b$$

In some embodiments, $Power_{signal}$ is the same as the desired power $P_{POI}^*$ exchanged between POI 110 and energy grid 104, which is the sum of the campus power $P_{campus}$ and the desired battery power $P_{bat}^*$. Battery power signal clipper 518 can be configured to determine the desired battery power $P_{bat}^*$ by subtracting $P_{campus}$ from $Power_{signal}$ as shown in the following equation:

$$P_{bat}^* = Power_{signal} - P_{campus}$$

where $P_{bat}^*$ represents the unbounded (i.e., unmodified) battery power before any clipping parameters are applied.

Referring particularly to FIG. 5B, battery power signal clipper 518 is shown to include a maximum power adjuster 520. Maximum power adjuster 520 can be configured to clip the unbounded battery power $P_{bat}^*$ using the optimal maximum battery charging power parameter $P_{bat,max,charge}$ and the optimal maximum battery discharging power parameter $P_{bat,max,discharge}$ generated by maximum power optimizer 434. The clipped battery power $P_{bat}$ can be provided as an output to power inverter 106 and/or provided as an input to other components of battery power signal clipper 518.

Maximum power adjuster 520 can clip the unbounded battery power $P_{bat}^*$ such that the clipped battery power $P_{bat}$ is maintained between $-P_{bat,max,charge}$ and $P_{bat,max,discharge}$. For example, maximum power adjuster 520 can calculate the clipped battery power $P_{bat}$ using the following equation:

$$P_{bat,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,k}$ is clipped to $P_{bat,max,discharge}$ (i.e., set equal to $P_{bat,max,discharge}$) if the unbounded value of $P_{bat,k}*$ exceeds $P_{bat,max,discharge}$ and is clipped to $-P_{bat,max,charge}$ (i.e., set equal to $-P_{bat,max,charge}$) if the unbounded value of $P_{bat,k}*$ is less than $-P_{bat,max,charge}$. However, if the unbounded value of $P_{bat,k}*$ is between $-P_{bat,max,charge}$ and $P_{bat,max,discharge}$, the value of $P_{bat,k}$ is equal to the unbounded value of $P_{bat,k}*$.

Figure 6:
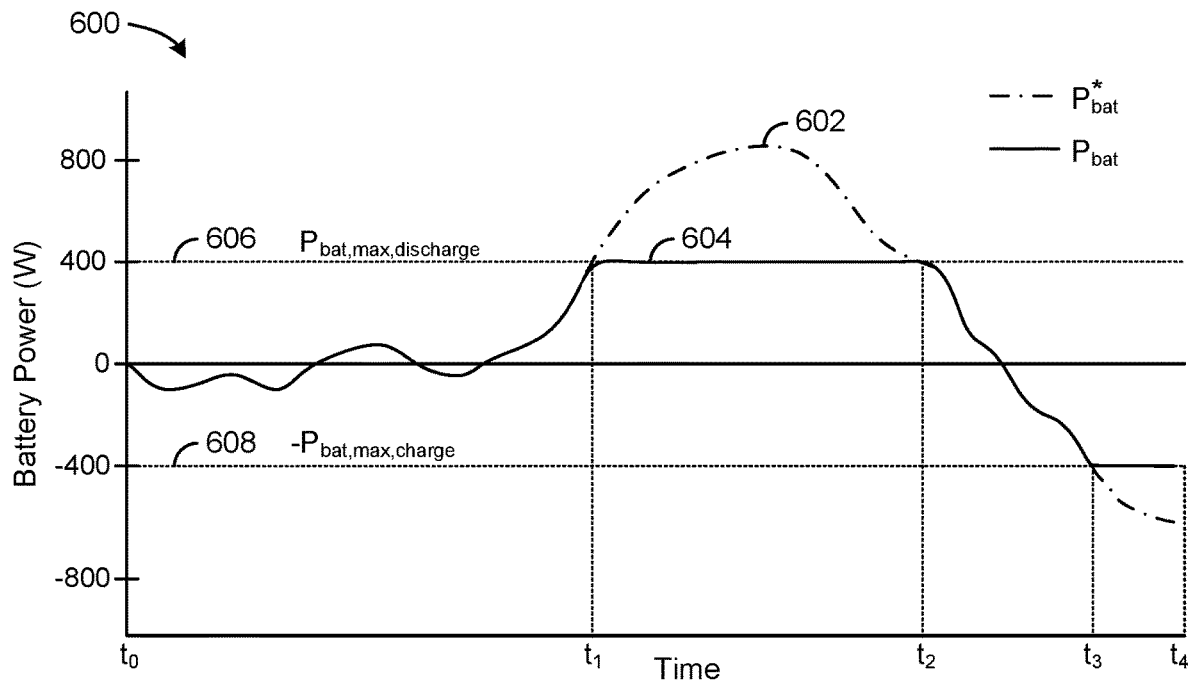
FIG. 6 is a graph illustrating the adjustments to the power signal performed by the maximum power adjuster of FIG. 5B, according to an exemplary embodiment.

Referring now to FIG. 6, a graph 600 illustrating the clipping operations performed by maximum power adjuster 520 is shown, according to an exemplary embodiment. In graph 600, line 602 represents the unbounded battery power $P_{bat}*$, whereas line 604 represents the clipped battery power $P_{bat}$. Positive values of the battery power indicate that battery 108 is discharging, whereas negative values of the battery power indicate that battery 108 is charging. Line 606 indicates the maximum battery discharging power $P_{bat,max,discharge}$ (i.e., the maximum rate at which battery 108 can be discharged) and line 608 indicates the maximum battery charging power $-P_{bat,max,charge}$ (i.e., the maximum rate at which battery 108 can be charged).

Between times $t_0$ and $t_1$, the unbounded battery power $P_{bat}*$ is between $-P_{bat,max,charge}$ and $P_{bat,max,discharge}$. Accordingly, maximum power adjuster 520 may not clip the unbounded battery power $P_{bat}*$ between times $t_0$ and $t_1$. Thus, the clipped battery power $P_{bat}$ may be equal to the unbounded battery power $P_{bat}*$ between times $t_0$ and $t_1$. However, at time $t_1$, the unbounded battery power $P_{bat}*$ begins exceeding $P_{bat,max,discharge}$ and remains above $P_{bat,max,discharge}$ until time $t_2$. Accordingly, maximum power adjuster 520 may clip the unbounded battery power $P_{bat}*$ to $P_{bat,max,discharge}$ between times $t_1$ and $t_2$. In other words, the clipped battery power $P_{bat}$ may be equal to $P_{bat,max,discharge}$ between times $t_1$ and $t_2$.

At time $t_2$, the unbounded battery power $P_{bat}*$ drops below $P_{bat,max,discharge}$ and remains between $-P_{bat,max,charge}$ and $P_{bat,max,discharge}$ until time $t_3$. Accordingly, maximum power adjuster 520 may not clip the unbounded battery power $P_{bat}$ between times $t_2$ and $t_3$. Thus, the clipped battery power $P_{bat}$ may be equal to the unbounded battery power $P_{bat}*$ between times $t_2$ and $t_3$. However, at time $t_3$, the unbounded battery power $P_{bat}*$ drops below $-P_{bat,max,charge}$ and remains below $P_{bat,max,discharge}$ until time $t_4$. Accordingly, maximum power adjuster 520 may clip the unbounded battery power $P_{bat}*$ to $-P_{bat,max,charge}$ between times $t_3$ and $t_4$. In other words, the clipped battery power $P_{bat}$ may be equal to $-P_{bat,max,discharge}$ between times $t_3$ and $t_4$.

Referring again to FIG. 5B, battery power signal clipper 518 is shown to include a maximum power change adjuster 522. Maximum power change adjuster 522 can be configured to clip the unbounded power signal $P_{bat}*$ using the optimal maximum battery charging power parameter $P_{bat,max,charge}$ and the optimal maximum battery discharging power parameter $P_{bat,max,discharge}$ generated by maximum power optimizer 434, as well as the optimal maximum change in charging power parameter $\Delta P_{bat,max,charge}$ and the optimal maximum change in discharging power parameter $\Delta P_{bat,max,discharge}$ generated by maximum power change optimizer 436.

Maximum power change adjuster 522 can apply the optimal clipping parameters $P_{bat,max,charge}$ and $P_{bat,max,discharge}$ generated by maximum power optimizer 434 to the unbounded power signal $P_{bat}*$ to generate a clipped power signal $P_{bat,clip}$ as shown in the following equation:

$$P_{bat,clip,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,clip,k}$ is clipped to $P_{bat,max,discharge}$ (i.e., set equal to $P_{bat,max,discharge}$) if the unbounded value of $P_{bat,k}*$ exceeds $P_{bat,max,discharge}$ and is clipped to $-P_{bat,max,charge}$ (i.e., set equal to $-P_{bat,max,charge}$) if the unbounded value of $P_{bat,k}*$ is less than $-P_{bat,max,charge}$. However, if the unbounded value of $P_{bat,k}*$ is between $-P_{bat,max,charge}$ and $P_{bat,max,discharge}$, the value of $P_{bat,clip,k}$ is equal to the unbounded value of $P_{bat,k}*$.

Maximum power change adjuster 522 can then apply the maximum change in charging power parameter $\Delta P_{bat,max,charge}$ and the maximum change in discharging power parameter $P_{bat,max,discharge}$ generated by maximum power change optimizer 436 to the clipped power signal $P_{bat,clip}$ as shown in the following equations:

if $P_{bat,clip,k} < 0$ (battery is charging)

$$P_{bat,k} = \begin{cases} P_{bat,clip,k} & \text{if } |P_{bat,clip,k} - P_{bat,k-1}| \leq \Delta P_{bat,max,charge} \\ P_{bat,k-1} - \Delta P_{bat,max,charge} & \text{if } P_{bat,k-1} - P_{bat,clip,k} > \Delta P_{bat,max,charge} \\ P_{bat,k-1} + \Delta P_{bat,max,charge} & \text{if } P_{bat,clip,k} - P_{bat,k-1} > \Delta P_{bat,max,charge} \end{cases}$$

elseif $P_{bat,clip,k} > 0$ (battery is discharging)

$P_{bat,k} =$ $$\begin{cases} P_{bat,clip,k} & \text{if } |P_{bat,clip,k} - P_{bat,k-1}| \leq \Delta P_{bat,max,discharge} \\ P_{bat,k-1} - \Delta P_{bat,max,discharge} & \text{if } P_{bat,k-1} - P_{bat,clip,k} > \Delta P_{bat,max,discharge} \\ P_{bat,k-1} + \Delta P_{bat,max,discharge} & \text{if } P_{bat,clip,k} - P_{bat,k-1} > \Delta P_{bat,max,discharge} \end{cases}$$

where the first set of equations define the value of $P_{bat,k}$ when $P_{bat,clip,k}<0$ (i.e., battery 108 is charging) and the second set of equations define the value of $P_{bat,k}$ when $P_{bat,clip,k}>0$ (i.e. battery 108 is discharging).

The first set of equations specify that the value of $P_{bat}$ cannot increase or decrease by more than $\Delta P_{bat,max,charge}$ between time step k−1 and time step k when battery 108 is charging (i.e., when $P_{bat,clip,k}<0$). Accordingly, if the clipped battery power $P_{bat,clip,k}$ at time step k is less than the battery power setpoint $P_{bat,k-1}$ at time step k−1 by an amount that exceeds $\Delta P_{bat,max,charge}$ (i.e., $P_{bat,k-1}+P_{bat,clip,k}>\Delta P_{bat,max,charge}$), maximum power change adjuster 522 may set the battery power setpoint $P_{bat,k}$ at time step k to $P_{bat,k-1}-\Delta P_{bat,max,charge}$. Similarly, if the clipped battery power $P_{bat,clip,k}$ at time step k exceeds the battery power setpoint $P_{bat,k-1}$ at time step k−1 by an amount that exceeds $\Delta P_{bat,max,charge}$ (i.e., $P_{bat,clip,k}-P_{bat,k-1}>\Delta P_{bat,max,charge}$), maximum power change adjuster 522 may set the battery power setpoint $P_{bat,k}$ at time step k to $P_{bat,k-1}+\Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,charge}$ (i.e., $|P_{bat,clip,k}-P_{bat,k-1}|\leq\Delta P_{bat,max,charge}$), maximum power change adjuster 522 may set the battery power setpoint $P_{bat,k}$ at time step k equal to the clipped battery power $P_{bat,clip,k}$ at time step k.

The second set of equations specify that the value of $P_{bat}$ cannot increase or decrease by more than $\Delta P_{bat,max,discharge}$ between time step k−1 and time step k when battery 108 is discharging (i.e., when $P_{bat,clip,k}>0$). Accordingly, if the clipped battery power $P_{bat,clip,k}$ at time step k is less than the battery power setpoint $P_{bat,k-1}$ at time step k−1 by an amount that exceeds $\Delta P_{bat,max,discharge}$ (i.e., $P_{bat,k-1}-P_{bat,clip,k}>\Delta P_{bat,max,discharge}$), maximum power change adjuster 522 may set the battery power setpoint $P_{bat,k}$ at time step k to $P_{bat,k-1}-\Delta P_{bat,max,discharge}$. Similarly, if the clipped battery power $P_{bat,clip,k}$ at time step k exceeds the battery power setpoint $P_{bat,k-1}$ at time step k−1 by an amount that exceeds $\Delta P_{bat,max,discharge}$ (i.e., $P_{bat,clip,k}-P_{bat,k-1}>\Delta P_{bat,max,discharge}$), maximum power change adjuster 522 may set the battery power setpoint $P_{bat,k}$ at time step k to $P_{bat,k-1}+\Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,discharge}$ (i.e., $|P_{bat,clip,k}-P_{bat,k-1}|\leq\Delta P_{bat,max,discharge}$), maximum power change adjuster 522 may set the battery power setpoint $P_{bat,k}$ at time step k equal to the clipped battery power $P_{bat,clip,k}$ at time step k.

Figure 7:
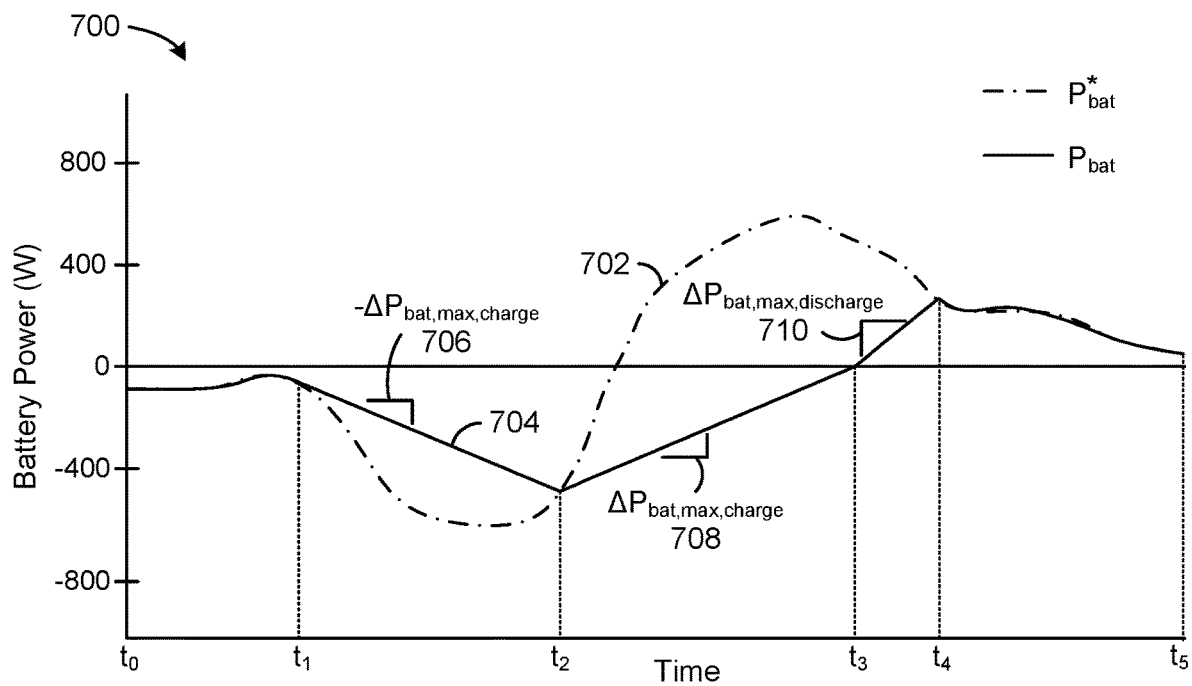
FIG. 7 is a graph illustrating the adjustments to the power signal performed by the maximum power change adjuster of FIG. 5B, according to an exemplary embodiment.

Referring now to FIG. 7, a graph 700 illustrating the clipping operations performed by maximum power change adjuster 522 is shown, according to an exemplary embodiment. In graph 700, line 702 represents the unbounded battery power $P_{bat}$, whereas line 704 represents the clipped battery power $P_{bat}$ (i.e., the battery power setpoint). Positive values of the battery power indicate that battery 108 is discharging, whereas negative values of the battery power indicate that battery 108 is charging. In this example, it is assumed that the maximum battery charging power parameter $P_{bat,max,charge}$ and maximum battery discharging power parameter $P_{bat,max,discharge}$ are sufficiently large such that the clipping operations performed by maximum power adjuster 520 do not change the unbounded battery power $P_{bat}*$ (i.e., $P_{bat}*=P_{bat,clip}$).

Between time $t_0$ and time $t_1$, the unbounded battery power $P_{bat}*$ is less than zero, which indicates that battery 108 is charging. The unbounded battery power $P_{bat}*$ is relatively stable and does not change by more than $\Delta P_{bat,max,charge}$ between any two consecutive time steps k−1 and k. Accordingly, maximum power change adjuster 522 does not alter the unbounded battery power $P_{bat}*$ between time $t_0$ and time $t_1$. In other words, the battery power setpoint $P_{bat}$ provided to power inverter 106 will be equal to the unbounded battery power $P_{bat}*$ between time $t_0$ and time $t_1$.

At time $t_1$, the unbounded battery power $P_{bat}*$ begins decreasing at a rate that exceeds $\Delta P_{bat,max,charge}$ (i.e., $P_{bat,k-1}-P_{bat,k}*>\Delta P_{bat,max,charge}$). However, maximum power change adjuster 522 may prevent the battery power setpoint $P_{bat}$ from changing by more than $\Delta P_{bat,max,charge}$ between any two consecutive time steps k−1 and k. It is noted that the maximum change in charging power parameter $\Delta P_{bat,max,charge}$ is applicable between times $t_1$ and $t_2$ because battery 108 is charging (i.e., $P_{bat}$ is negative). Therefore, maximum power change adjuster 522 sets the battery power setpoint $P_{bat,k}$ at time step k to $P_{bat,k-1}-\Delta P_{bat,max,charge}$. This adjustment is repeated for each time step k until the difference between $P_{bat,k-1}$ and $P_{bat,k}*$ is no longer greater than $\Delta P_{bat,max,charge}$, which occurs at time $t_2$. The slope 706 of the battery power setpoint $P_{bat}$ between times $t_1$ and $t_2$ is equal to $-\Delta P_{bat,max,charge}$ over the duration of each time step k.

At time $t_2$, the unbounded battery power $P_{bat}*$ begins increasing (relative to the previous value of the battery power setpoint $P_{bat}$) at a rate that exceeds $\Delta P_{bat,max,charge}$ (i.e., $P_{bat,k}*-P_{bat,k-1}>\Delta P_{bat,max,charge}$). However, maximum power change adjuster 522 may prevent the battery power setpoint $P_{bat}$ from changing by more than $\Delta P_{bat,max,charge}$ between any two consecutive time steps k−1 and k. It is noted that the maximum change in charging power parameter $\Delta P_{bat,max,charge}$ is still applicable between times $t_2$ and $t_3$ because battery 108 is still charging (i.e., $P_{bat}$ is negative). Therefore, maximum power change adjuster 522 sets the battery power setpoint $P_{bat,k}$ at time step k to $P_{bat,k-1}+P_{bat,max,charge}$. This adjustment is repeated for each time step k between times $t_2$ and $t_3$. The slope 708 of the battery power setpoint $P_{bat}$ between times $t_2$ and $t_3$ is equal to $\Delta P_{bat,max,charge}$ over the duration of each time step k.

At time $t_3$, the battery power setpoint $P_{bat}$ becomes positive, which indicates that battery 108 is now discharging. The difference between the unbounded battery power $P_{bat,k}*$ and the battery power setpoint $P_{bat,k-1}$ is still greater than the maximum allowable change. However, because the value of $P_{bat}$ is now positive, the maximum allowable change is now defined by the maximum change in discharging power $\Delta P_{bat,max,discharge}$ parameter rather than the maximum change in charging power $\Delta P_{bat,max,charge}$ parameter. Maximum power change adjuster 522 may prevent the battery power setpoint $P_{bat}$ from changing by more than $\Delta P_{bat,max,discharge}$ between any two consecutive time steps k−1 and k. Therefore, maximum power change adjuster 522 sets the battery power setpoint $P_{bat,k}$ at time step k to $P_{bat,k-1}+\Delta P_{bat,max,discharge}$. This adjustment is repeated for each time step k until the difference between $P_{bat,k}*$ and $P_{bat,k-1}$ is no longer greater than $\Delta P_{bat,max,discharge}$, which occurs at time $t_4$. The slope 710 of the battery power setpoint $P_{bat}$ between times $t_3$ and $t_4$ is equal to $\Delta P_{bat,max,discharge}$ over the duration of each time step k.

Between time $t_4$ and time $t_5$, the unbounded battery power $P_{bat}*$ is greater than zero, which indicates that battery 108 is discharging. The unbounded battery power $P_{bat}*$ is relatively stable and does not change by more than $\Delta P_{bat,max,discharge}$ between any two consecutive time steps k−1 and k. Accordingly, maximum power change adjuster 522 does not alter the unbounded battery power $P_{bat}*$ between time $t_4$ and time $t_5$. In other words, the battery power setpoint $P_{bat}$ provided to power inverter 106 will be equal to the unbounded battery power $P_{bat}*$ between time $t_4$ and time $t_5$.

Referring again to FIG. 5B, battery power signal clipper 518 is shown to include a zero cross adjuster 524. Zero cross adjuster 524 can be configured to modify the battery power signal $P_{bat}$ (i.e., the time series of battery power setpoints) generated by maximum power change adjuster 522 to ensure that the battery power signal $P_{bat}$ crosses zero at approximately the same time as the unbounded battery power $P_{bat}*$ and/or the regulation signal $Reg_{signal}$. In some embodiments, the maximum power change limitations imposed by maximum power change adjuster 522 cause the battery power signal $P_{bat}$ to significantly lag the unbounded battery power $P_{bat}*$ and/or the regulation signal $Reg_{signal}$. For example, graph 700 shows the unbounded battery power $P_{bat}*$ crossing zero shortly after time $t_2$, whereas the battery power signal $P_{bat}$ does not cross zero until significantly later at time $t_3$. The adjustments performed by zero cross adjuster 524 may decrease the lag time between $P_{bat}$ and $P_{bat}*$ and/or $Reg_{signal}$ to ensure that both cross zero at approximately the same time (or closer to the same time).

In some embodiments, zero cross adjuster 524 predicts the time at which the unbounded battery power $P_{bat}*$ and/or the regulation signal $Reg_{signal}$ will cross zero based on the current value and slope of $P_{bat}*$ and/or $Reg_{signal}$. The slope can be expressed as the change in value of the signal $P_{bat}*$ and/or $Reg_{signal}$ between consecutive time steps k−1 and k. For example, zero cross adjuster 524 may calculate the slope of $P_{bat}*$ using the following equation:

$$slope_{power}=P_{bat,k}*-P_{bat,k-1}*$$

where $P_{bat,k}*$ is the value of the unbounded battery power at time step k and $P_{bat,k-1}*$ is the value of the unbounded battery power at the previous time step k−1. Similarly, zero cross adjuster 524 may calculate the slope of $Reg_{signal}$ using the following equation:

$$slope_{Reg}=Reg_{signal,k}-Reg_{signal,k-1}$$

where $Reg_{signal,k}$ is the value of the regulation signal at time step k and $g_{signal,k-1}$ is the value of the unbounded battery power at the previous time step k−1.

Zero cross adjuster 524 can use the calculated slope $slope_{Power}$ or $slope_{Reg}$ to predict the number of time steps until the corresponding signal $P_{bat}*$ or $Reg_{signal}$ reaches zero. For example, zero cross adjuster 524 can predict the number of time steps until the unbounded power signal $P_{bat}*$ reaches zero using the following equation:

$$StepsToZero_{Power} = \left|\frac{P^*_{bat,k}}{slope_{Power}}\right|$$

Similarly, zero cross adjuster 524 can predict the number of time steps until the regulation signal $Reg_{signal}$ reaches zero using the following equation:

$$StepsToZero_{Reg} = \left|\frac{Reg_{signal,k}}{slope_{Reg}}\right|$$

Zero cross adjuster 524 can use the predicted number of time steps $StepsToZero_{Power}$ and/or $StepsToZero_{Reg}$ to generate upper and lower zero cross bounds for the battery power signal $P_{bat}$. For example, zero cross adjuster 524 can calculate an upper bound for the battery power signal $P_{bat}$ by multiplying the predicted number of time steps $StepsToZero_{Power}$ or $StepsToZero_{Reg}$ by the maximum rate that the battery discharging power can change between each time step $\Delta P_{bat,max,discharge}$, as shown in the following equation:

$$ZeroCross_{UpperBound} = StepsToZero * \Delta P_{bat,max,discharge}$$

where StepsToZero is either $StepsToZero_{pow}$ or $StepsToZero_{Reg}$. The value of $ZeroCross_{UpperBound}$ indicates the maximum value that the battery power signal $P_{bat}$ can have for the battery power signal $P_{bat}$ to be able to reach zero at the same time as the unbounded battery power $P_{bat}*$ and/or the regulation signal $Reg_{signal}$, given the limitation on the rate at which the battery power signal can decrease $\Delta P_{bat,max,discharge}$ when discharging.

Similarly, zero cross adjuster 524 can calculate a lower bound for the battery power signal $P_{bat}$ by multiplying the predicted number of time steps $StepsToZero_{Power}$ or $StepsToZero_{Reg}$ by the maximum rate that the battery charging power can change between each time step $\Delta P_{bat,max,charge}$, as shown in the following equation:

$$ZeroCross_{LowerBound} = StepsToZero * \Delta P_{bat,max,charge}$$

where StepsToZero is either $StepsToZero_{Power}$ or $StepsToZero_{Reg}$. The value of $ZeroCross_{LowerBound}$ indicates the minimum value that the battery power signal $P_{bat}$ can have for the battery power signal $P_{bat}$ to be able to reach zero at the same time as the unbounded battery power $P_{bat}*$ and/or the regulation signal $Reg_{signal}$, given the limitation on the rate at which the battery power signal can increase $\Delta P_{bat,max,charge}$ when charging.

Zero cross adjuster 524 can use the upper zero cross bound $ZeroCross_{UpperBound}$ and the lower zero cross bound Zero $Cross_{LowerBound}$ to determine when to start adjusting the battery power signal $P_{bat}$ toward zero. For example, if the battery power signal $P_{bat}$ is currently greater than or equal to the upper zero cross bound $ZeroCross_{UpperBound}$ (i.e., $P_{bat} \geq ZeroCross_{UpperBound}$) and the slope of the unbounded power $P_{bat}*$ and/or the regulation signal $Reg_{signal}$ is negative (i.e., $P_{bat}*$ or $Reg_{signal}$ is moving toward zero), zero cross adjuster 524 can begin decreasing the battery power signal $P_{bat}$ at the maximum allowable rate $\Delta P_{bat,max,discharge}$ per time step. Similarly, if the battery power signal $P_{bat}$ is currently less than or equal to the lower zero cross bound $ZeroCross_{LowerBound}$ (i.e., $P_{bat} \leq ZeroCross_{LowerBound}$) and the slope of the unbounded power $P_{bat}*$ and/or the regulation signal $Reg_{signal}$ is positive (i.e., $P_{bat}*$ or $Reg_{signal}$ is moving toward zero), zero cross adjuster 524 can begin increasing the battery power signal $P_{bat}$ at the maximum allowable rate $\Delta P_{bat,max,charge}$ per time step.

Figure 8:
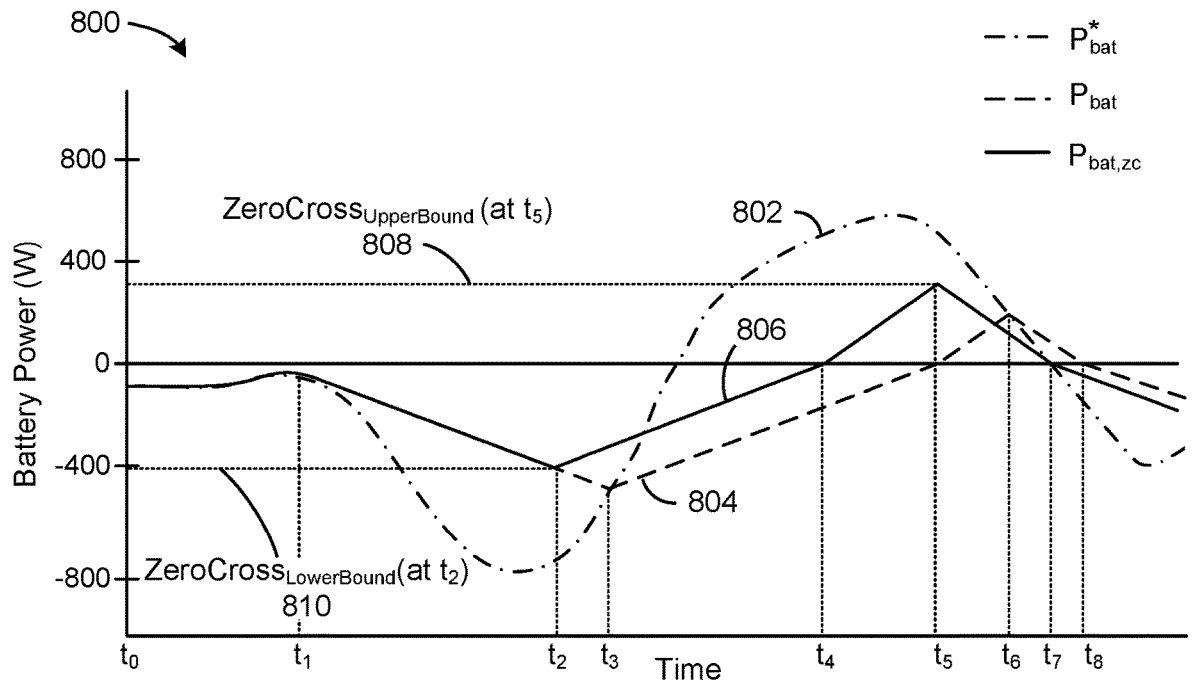
FIG. 8 is a graph illustrating the adjustments to the power signal performed by the zero cross adjuster of FIG. 5B, according to an exemplary embodiment.

Referring now to FIG. 8, a graph 800 illustrating the adjustments to the battery power signal $P_{bat}$ performed by zero cross adjuster 524 is shown, according to an exemplary embodiment. In graph 800, line 802 represents the unbounded battery power $P_{bat}*$, line 804 represents the battery power signal $P_{bat}$ without any zero cross adjustment (i.e., the output of maximum power change adjuster 522), and line 806 represents the battery power signal $P_{bat,zc}$ with zero cross adjustments (i.e., the output of zero cross adjuster 524). Positive values of the battery power indicate that battery 108 is discharging, whereas negative values of the battery power indicate that battery 108 is charging. In this example, it is assumed that the maximum battery charging power parameter $P_{bat,max,charge}$ and maximum battery discharging power parameter $P_{bat,max,discharge}$ are sufficiently large such that the clipping operations performed by maximum power adjuster 520 do not change the unbounded battery power $P_{bat}*$ (i.e., $P_{bat}* = P_{bat,clip}$).

In graph 800, line 808 represents the zero cross upper bound $ZeroCross_{UpperBound}$ at time $t_5$, whereas line 810 represents the zero cross lower bound $ZeroCross_{LowerBound}$ at time $t_2$. As discussed above, the values of $ZeroCross_{UpperBound}$ and $ZeroCross_{LowerBound}$ depend on the predicted number of time steps until the unbounded power signal $P_{bat,k}*$ and/or the regulation signal $Reg_{signal,k}$ reaches zero, based on their current values and slopes. Accordingly, the values $ZeroCross_{UpperBound}$ and $ZeroCross_{LowerBound}$ may change over time as the values and slopes of the unbounded power signal $P_{bat,k}*$ and/or the regulation signal $Reg_{signal,k}$ change. It should be understood that lines 808 and 810 represent the values of $ZeroCross_{UpperBound}$ and $ZeroCross_{LowerBound}$ at specific times (i.e., times $t_5$ and $t_2$ respectively) and are not necessarily fixed at those values over the entire time period shown in graph 800.

Between time $t_0$ and time $t_1$, the unbounded battery power $P_{bat}*$ is less than zero, which indicates that battery 108 is charging. The unbounded battery power $P_{bat}*$ is relatively stable and does not change by more than $\Delta P_{bat,max,charge}$ between any two consecutive time steps k−1 and k. Accordingly, maximum power change adjuster 522 does not alter the unbounded battery power $P_{bat}*$ between time $t_0$ and time $t_1$. The unbounded battery power $P_{bat}*$ is also between the upper zero cross bound $ZeroCross_{UpperBound,k}$ and the zero cross lower bound $ZeroCross_{LowerBound,k}$ at each time step k between time $t_0$ and time $t_1$. Accordingly, zero cross adjuster 524 does not alter the unbounded battery power $P_{bat}*$ between time $t_0$ and time $t_1$. Thus, the unbounded battery power $P_{bat}*$, the battery power signal $P_{bat}$ without any zero cross adjustment, and the battery power signal $P_{bat,zc}$ with zero cross adjustment are substantially equal between time $t_0$ and time $t_1$.

At time $t_1$, the unbounded battery power $P_{bat}*$ begins decreasing at a rate that exceeds $\Delta P_{bat,max,charge}$ (i.e., $P_{bat,k-1} - P_{bat,k}* > \Delta P_{bat,max,charge}$). However, maximum power change adjuster 522 may prevent the battery power signal $P_{bat}$ from changing by more than $\Delta P_{bat,max,charge}$ between any two consecutive time steps k−1 and k. Therefore, maximum power change adjuster 522 sets the battery power signal $P_{bat,k}$ at time step k to $P_{bat,k-1} - \Delta P_{bat,max,charge}$. This adjustment is repeated for each time step k until the difference between $P_{bat,k-1}$ and $P_{bat,k}^*$ is no longer greater than $\Delta P_{bat,max,charge}$, which occurs at time $t_3$. The slope of line 804 between times $t_1$ and $t_3$ is equal to $-\Delta P_{bat,max,charge}$ over the duration of each time step k.

At time $t_2$, the value of the battery power signal $P_{bat}$ drops below the lower zero cross bound $ZeroCross_{LowerBound}$ Zero cross adjuster 524 initiates zero cross adjustment at time $t_2$, which drives the value of $P_{bat,zc}$ toward zero. Accordingly, the adjusted battery power signal $P_{bat,zc}$ (line 806) begins moving toward zero at time $t_2$ at the maximum allowable rate. Thus, the adjusted battery power signal $P_{bat,zc}$ has a slope that corresponds to the maximum change in charge power $\Delta P_{bat,max,charge}$ between time $t_2$ and $t_3$. However, the battery power signal $P_{bat}$ without zero cross adjustment (line 804) continues decreasing between time $t_2$ and time $t_3$ in an attempt to match the unbounded battery power $P_{bat}^*$. Thus, $P_{bat}$ continues to decrease until the value of $P_{bat}$ reaches the value of the unbounded battery power $P_{bat}^*$ at time $t_3$.

Advantageously, the adjustment performed by zero cross adjuster 524 decreases the lag time between the time at which unbounded battery power $P_{bat}^*$ crosses zero and the time at which the battery power signal crosses zero. For example, the unbounded battery power $P_{bat}^*$ crosses zero between time $t_3$ and time $t_4$. The adjusted battery power signal $P_{bat,zc}$ crosses zero at time $t_4$, whereas the battery power signal $P_{bat}$ without zero cross adjustment does not cross zero until significantly later at time $t_5$.

At time $t_5$, the value of the adjusted battery power signal $P_{bat,zc}$ exceeds the upper zero cross bound $ZeroCross_{UpperBound}$ Zero cross adjuster 524 initiates zero cross adjustment at time $t_5$, which drives the value of $P_{bat,zc}$ toward zero. Accordingly, the adjusted battery power signal $P_{bat,zc}$ (line 806) begins moving toward zero at time $t_5$ at the maximum allowable rate. Thus, the adjusted battery power signal $P_{bat,zc}$ has a slope that corresponds to the maximum change in discharge power $-\Delta P_{bat,max,discharge}$ between time $t_5$ and $t_7$. However, the battery power signal $P_{bat}$ without zero cross adjustment (line 804) continues increasing between time $t_5$ and time $t_6$ in an attempt to match the unbounded battery power $P_{bat}^*$. Thus, $P_{bat}$ continues to increase until the value of $P_{bat}$ reaches the value of the unbounded battery power $P_{bat}^*$ at time $t_6$.

Advantageously, the adjustment performed by zero cross adjuster 524 causes the adjusted battery power signal $P_{bat,zc}$ to cross zero at the same time as the unbounded battery power $P_{bat}^*$. For example, both the adjusted battery power signal $P_{bat,zc}$ and the unbounded battery power $P_{bat}^*$ cross zero at time $t_7$. However, the battery power signal $P_{bat}$ without zero cross adjustment does not cross zero until time $t_8$.

Referring again to FIG. 5B, battery power signal clipper 518 is shown to include a maximum sustained power adjuster 526. Maximum sustained power adjuster 526 can be configured to adjust the unbounded power signal $P_{bat}^*$ using the optimal maximum sustained charging power parameter $P_{bat,max,charge\_sustained}$ and maximum sustained discharging power parameter $P_{bat,max,discharge\_sustained}$ generated by maximum sustained power optimizer 438. As described above, the maximum sustained power parameters $P_{bat,max,charge\_sustained}$ and $P_{bat,max,discharge\_sustained}$ limit the moving average of the battery power signal $P_{bat}$ over a predetermined horizon (e.g., five minutes, fifteen minutes, etc.). In some embodiments, the values of $P_{bat,max,charge\_sustained}$ and $P_{bat,max,discharge\_sustained}$ are set to a fixed fraction or percentage of $P_{bat,max,charge}$ and $P_{bat,max,discharge}$, respectively (e.g., 75%) and may be received as an input to maximum sustained power adjuster 526.

Maximum sustained power adjuster 526 can calculate a moving average of the battery power signal $P_{bat}$ using a set of previous values of the battery power signal $P_{bat}$. For example, maximum sustained power adjuster 526 can calculate a moving average of the battery power signal $P_{bat}$ at each time step k using the following equation:

$$\overline{P}_{bat,k} = \frac{1}{h} \sum_{i=k-h}^{k} P_{bat,i}$$

where h is the duration of the horizon over which the moving average is calculated (i.e., the number of time steps within the horizon) and $\overline{P}_{bat,k}$ is the moving average of the battery power signal $P_{bat,k}$ over the last h time steps. Maximum sustained power adjuster 526 can actively adjust the battery power signal $P_{bat}$ to ensure that the moving average $\overline{P}_{bat,k}$ is maintained between $P_{bat,max,charge\_sustained}$ and $P_{bat,max,discharge\_sustained}$.

If battery 108 is currently charging (i.e., $P_{bat}$ is negative), maximum sustained power adjuster 526 can calculate the number of time steps required for the current value of the battery power signal $P_{bat,k}$ to reach the maximum sustained charge power $P_{bat,max,charge\_sustained}$ based on the maximum allowable change in the charge power $\Delta P_{bat,max,charge}$ between consecutive time steps k−1 and k. For example, maximum sustained power adjuster 526 can calculate the required number of time steps required for the current value of the battery power signal $P_{bat,k}$ to reach the maximum sustained charge power $P_{bat,max,charge}$ sustained using the following equation:

$$StepsToLimit_{charge} = \frac{|P_{bat,k} - P_{bat,max,charge\_sustained}|}{\Delta P_{bat,max,charge}}$$

Similarly, if battery 108 is currently discharging (i.e., $P_{bat}$ is positive), maximum sustained power adjuster 526 can calculate the number of time steps required for the current value of the battery power signal $P_{bat,k}$ to reach the maximum sustained discharge power $P_{bat,max,discharge\_sustained}$ based on the maximum allowable change in the discharge power $\Delta P_{bat,max,discharge}$ between consecutive time steps k−1 and k. For example, maximum sustained power adjuster 526 can calculate the required number of time steps required for the current value of the battery power signal $P_{bat,k}$ to reach the maximum sustained discharge power $P_{bat,max,discharge\_sustained}$ using the following equation:

$$StepsToLimit_{discharge} = \frac{|P_{bat,k} - P_{bat,max,discharge\_sustained}|}{\Delta P_{bat,max,discharge}}$$

Maximum sustained power adjuster 526 can calculate the average charging power added $\overline{P}_{added,charge}$ using the following equation:

$$\overline{P}_{added,charge} = P_{bat,max,charge,\_sustained} + \frac{|P_{bat,k} - P_{bat,max,charge\_sustained}|}{2}$$

Similarly, maximum sustained power adjuster 526 can calculate the average discharging power added $\overline{P}_{added,discharge}$ using the following equation:

$$\overline{P}_{added,discharge} = P_{bat,max,discharge\_sustained} + \frac{|P_{bat,k} - P_{bat,max,discharge\_sustained}|}{2}$$

Maximum sustained power adjuster 526 can calculate a charging power value $P_{calc,charge}$ using the following equation:

$$P_{calc,charge} = \left(1 - \frac{StepsToLimit_{charge}}{h}\right) * \overline{P}_{bat,k} + \frac{StepsToLimit_{charge}}{h} * \overline{P}_{added,charge}$$

where h is the number of time steps within the horizon over which the moving average $\overline{P}_{bat,k}$ is calculated. Similarly, maximum sustained power adjuster 526 can calculate a discharging power value $P_{calc,discharge}$ using the following equation:

$$P_{calc,discharge} = \left(1 - \frac{StepsToLimit_{discharge}}{h}\right) * \overline{P}_{bat,k} + \frac{StepsToLimit_{discharge}}{h} * \overline{P}_{added,discharge}$$

where h is the number of time steps within the horizon over which the moving average $\overline{P}_{bat,k}$ is calculated.

Maximum sustained power adjuster 526 can calculate a charging power margin $P_{margin,charge}$ and a discharging power margin $P_{margin,discharge}$ using the following equations:

$$P_{margin,charge} = P_{calc,charge} * S_{margin}$$

$$P_{margin,discharge} = P_{calc,discharge} * S_{margin}$$

where $S_{margin}$ is a constant value representing a sustained power margin.

Maximum sustained power adjuster 526 can calculate a sustained charging power bound $P_{sustained,ChargeBound}$ using the following equation:

$$P_{sustained,ChargeBound} = \begin{cases} P_{bat,k} - \Delta P_{bat,max,charge} & \text{if } P_{calc,charge} - P_{margin,charge} > P_{bat,max,charge\_sustained} \\ P_{bat,k} + \Delta P_{bat,max,charge} & \text{if } P_{calc,charge} + P_{margin,charge} < P_{bat,max,charge\_sustained} \\ \Delta P_{bat,max,charge\_sustained} & \text{if } \begin{cases} P_{calc,charge} - \\ P_{margin,charge} \geq P_{bat,max,charge\_sustained} \\ \text{AND} \\ P_{calc,charge} + \\ P_{margin,charge} \leq P_{bat,max,charge\_sustained} \end{cases} \end{cases}$$

Similarly, maximum sustained power adjuster 526 can calculate a sustained discharging power bound $P_{sustained,DischargeBound}$ using the following equation:

$$P_{sustained,DischargeBound} = \begin{cases} P_{bat,k} - \Delta P_{bat,max,discharge} & \text{if } P_{calc,discharge} - P_{margin,discharge} > P_{bat,max,discharge\_sustained} \\ P_{bat,k} + \Delta P_{bat,max,discharge} & \text{if } P_{calc,discharge} + P_{margin,discharge} < P_{bat,max,discharge\_sustained} \\ \Delta P_{bat,max,discharge\_sustained} & \text{if } \begin{cases} P_{calc,discharge} - \\ P_{margin,discharge} \geq P_{bat,max,discharge\_sustained} \\ \text{AND} \\ P_{calc,discharge} + \\ P_{margin,discharge} \leq P_{bat,max,discharge\_sustained} \end{cases} \end{cases}$$

If the battery power signal $P_{bat,k}$ at time step k is less than $-P_{sustained,ChargeBound}$, maximum sustained power adjuster 526 may adjust the battery power signal $P_{bat,k}$ toward the maximum sustained charging power $-P_{bat,max,charge\_sustained}$ at a rate of $\Delta P_{bat,max,charge}$. Similarly, if the battery power signal $P_{bat,k}$ at time step k is greater than $P_{sustained,DischargeBound}$, maximum sustained power adjuster 526 may adjust the battery power signal $P_{bat,k}$ toward the maximum sustained discharging power $P_{bat,max,discharge\_sustained}$ at a rate of $\Delta P_{bat,max,discharge}$. However, if the battery power signal $P_{bat,k}$ at time step k is between $-P_{sustained,ChargeBound}$ and $P_{sustained,DishargeBound}$, maximum sustained power adjuster 526 may not adjust the battery power signal $P_{bat,k}$.

Figure 9:
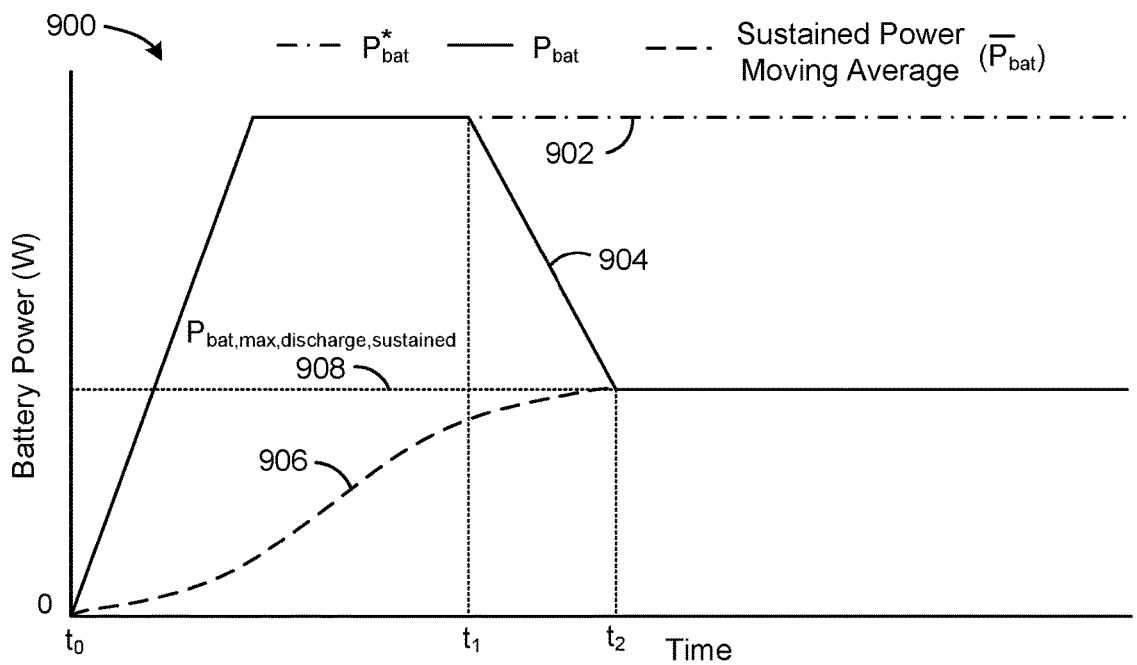
FIG. 9 is a graph illustrating the adjustments to the power signal performed by the maximum sustained power adjuster of FIG. 5B, according to an exemplary embodiment.

Referring now to FIG. 9, a graph 900 illustrating the adjustments to the battery power signal $P_{bat}$ performed by maximum sustained power adjuster 526 is shown, according to an exemplary embodiment. In graph 900, line 902 represents the unbounded battery power $P_{bat}^*$, whereas line 904 represents the battery power signal $P_{bat}$ after being adjusted by maximum sustained power adjuster 526. Line 906 represents the sustained power moving average of $P_{bat}$ at each time step k (i.e., $\overline{P}_{bat,k}$) based on the values of $P_{bat}$ within a moving time window that ends at time step k. Line 908 represents the maximum sustained discharging power $P_{bat,max,discharge\_sustained}$.

Between time $t_0$ and time $t_1$, the battery power signal $P_{bat}$ matches the unbounded battery power $P_{bat}^*$. Both the battery power signal $P_{bat}$ and the unbounded battery power $P_{bat}^*$ are above the maximum sustained discharging power $P_{bat,max,discharge\_sustained}$. The sustained power moving average $\overline{P}_{bat,k}$ is below the maximum sustained discharging power $P_{bat,max,discharge\_sustained}$ but continues to increase with each time step k. As the sustained power moving average $\overline{P}_{bat,k}$ approaches the maximum sustained discharging power $P_{bat,max,discharge\_sustained}$, the sustained power discharge bound $P_{sustained,DishargeBound}$ decreases until it reaches the value of $P_{bat}$ at time $t_1$.

At time $t_1$, maximum sustained power adjuster 526 determines that the value of $P_{bat}$ exceeds the sustained power discharge bound $P_{sustained,DishargeBound}$. Consequently, maximum sustained power adjuster 526 adjusts the battery power signal $P_{bat}$ toward the maximum sustained discharge power $P_{bat,max,discharge\_sustained}$ at a rate of $-\Delta P_{bat,max,discharge}$, which represents the slope of line 904 between time $t_1$ and time $t_2$. The battery power signal $P_{bat}$ and the sustained power discharge bound $P_{sustained,DishargeBound}$ both continue to decrease until they reach the maximum sustained discharge power $P_{bat,max,discharge\_sustained}$ at time $t_2$.

At time $t_2$, the sustained power moving average $\overline{P}_{bat,k}$ reaches the maximum sustained discharge power $P_{bat,max,discharge\_sustained}$. Accordingly, any value of $P_{bat}$ above maximum sustained discharge power $P_{bat,max,discharge\_sustained}$ would cause the sustained power moving average $\overline{P}_{bat,k}$ to exceed the maximum sustained discharge power $P_{bat,max,discharge\_sustained}$. Thus, maximum sustained power adjuster 526 sets the battery power signal $P_{bat}$ equal to the maximum sustained discharge power $P_{bat,max,discharge\_sustained}$.

Referring again to FIG. 5B, battery power signal clipper 518 is shown to include a maximum sustained effort adjuster 528. Maximum sustained effort adjuster 528 can be configured to adjust the unbounded power signal $P_{bat}^*$ using the optimal maximum sustained effort parameter $P_{bat,max,effort}$ generated by maximum sustained effort optimizer 440. As described above, the maximum sustained effort parameter $P_{bat,max,effort}$ limits the moving average of the change in the battery power signal $\Delta P_{bat}$ (i.e., the sustained effort) over a predetermined horizon (e.g., five minutes, fifteen minutes, etc.). In some embodiments, the horizon over which the sustained effort is calculated is longer than the horizon over which the sustained power is calculated. In some embodiments, the value of $P_{bat,max,effort}$ is set to a fixed fraction or percentage of $\Delta P_{bat,max,charge}$ or $\Delta P_{bat,max,discharge}$ (e.g., 75%) and may be received as an input to maximum sustained effort adjuster 528.

Maximum sustained effort adjuster 528 can calculate a moving average of the change in the battery power signal $P_{bat}$ between sets of consecutive time steps using a set of previous values of the battery power signal $P_{bat}$. For example, maximum sustained effort adjuster 528 can calculate a moving average of the change in the battery power signal $P_{bat}$ at each time step k using the following equation:

$$\overline{\Delta P}_{bat,k} = \frac{1}{h} \sum_{i=k-h}^{k} |P_{bat,i} - P_{bat,i-1}|$$

where h is the duration of the horizon over which the moving average is calculated (i.e., the number of time steps within the horizon) and $\overline{\Delta P}_{bat,k}$ is the moving average of the change in the battery power signal $P_{bat,k}$ over the last h time steps. Notably, both increases and decreases in the battery power signal $P_{bat}$ qualify as a positive "effort" due to the absolute value in the moving average calculation. Maximum sustained effort adjuster 528 can actively adjust the battery power signal $P_{bat}$ to ensure that the moving average $\overline{\Delta P}_{bat,k}$ is less than the maximum sustained effort parameter $P_{bat,max,effort}$.

Maximum sustained effort adjuster 528 can calculate the number of time steps required for the current value of the battery power signal $P_{bat,k}$ to reach the maximum sustained effort $P_{bat,max,effort}$ based on the maximum allowable change in the charging or discharging power (i.e., $\Delta P_{bat,max,charge}$ or $\Delta P_{bat,max,discharge}$) between consecutive time steps k−1 and k. For example, maximum sustained effort adjuster 528 can calculate the required number of time steps required for the current value of the battery power signal $P_{bat,k}$ to reach the maximum sustained effort $P_{bat,maxeffort}$ using the following equation:

$$StepsToLimit = \frac{|P_{bat,k} - P_{bat,max,effort}|}{\Delta P_{bat,max}}$$

where $\Delta P_{bat,max}$ is $P_{bat,max,charge}$ if battery 108 is charging or $\Delta P_{bat,max,discharge}$ if battery 108 is discharging.

Maximum sustained effort adjuster 528 can calculate the average effort added $\overline{E}_{added}$ using the following equation:

$$\overline{E}_{added} = P_{bat,max,effort} + \frac{P_{bat,k} - P_{bat,max,effort}}{2}$$

and can calculate an effort value $E_{calc}$ using the following equation:

$$E_{calc} = \left(1 - \frac{StepsToLimit}{h}\right) * \overline{\Delta P}_{bat,k} + \frac{StepsToLimit}{h} * \overline{E}_{added}$$

where h is the number of time steps within the horizon over which the moving average $\overline{\Delta P}_{bat,k}$ is calculated. Maximum sustained effort adjuster 528 can calculate an effort margin $E_{margin}$ using the following equation:

$$E_{margin} = E_{calc} * S_{margin}$$

where $S_{margin}$ is a constant value representing a sustained effort margin.

Maximum sustained effort adjuster 528 can calculate a sustained effort bound $E_{sustained,Bound}$ using the following equation:

$$E_{sustained,Bound} = \begin{cases} \Delta P_{bat,k} - \Delta P_{bat,max} & \text{if } E_{calc} - E_{margin} > P_{bat,max,effort} \\ \Delta P_{bat,k} + \Delta P_{bat,max} & \text{if } E_{calc} + E_{margin} < P_{bat,max,effort} \\ P_{bat,max,effort} & \text{if } \begin{cases} E_{calc} - E_{margin} \geq P_{bat,max,effort} \\ \text{AND} \\ E_{calc} + E_{margin} \leq P_{bat,max,effort} \end{cases} \end{cases}$$

If the battery power signal $P_{bat,k}$ at time step k is less than $-E_{sustained,Bound}$, maximum sustained effort adjuster 528 may adjust the battery power signal $P_{bat,k}$ toward the maximum sustained effort $-P_{bat,max,effort}$ at a rate of $\Delta P_{bat,max,charge}$. Similarly, if the battery power signal $P_{bat,k}$ at time step k is greater than $-E_{sustained,Bound}$, maximum sustained effort adjuster 528 may adjust the battery power signal $P_{bat,k}$ toward the maximum sustained effort $P_{bat,max,effort}$ at a rate of $-\Delta P_{bat,max,discharge}$. However, if the battery power signal $P_{bat,k}$ at time step k is between $-E_{sustained,Bound}$ and $E_{sustained,Bound}$, maximum sustained effort adjuster 528 may not adjust the battery power signal $P_{bat,k}$.

Figure 10:
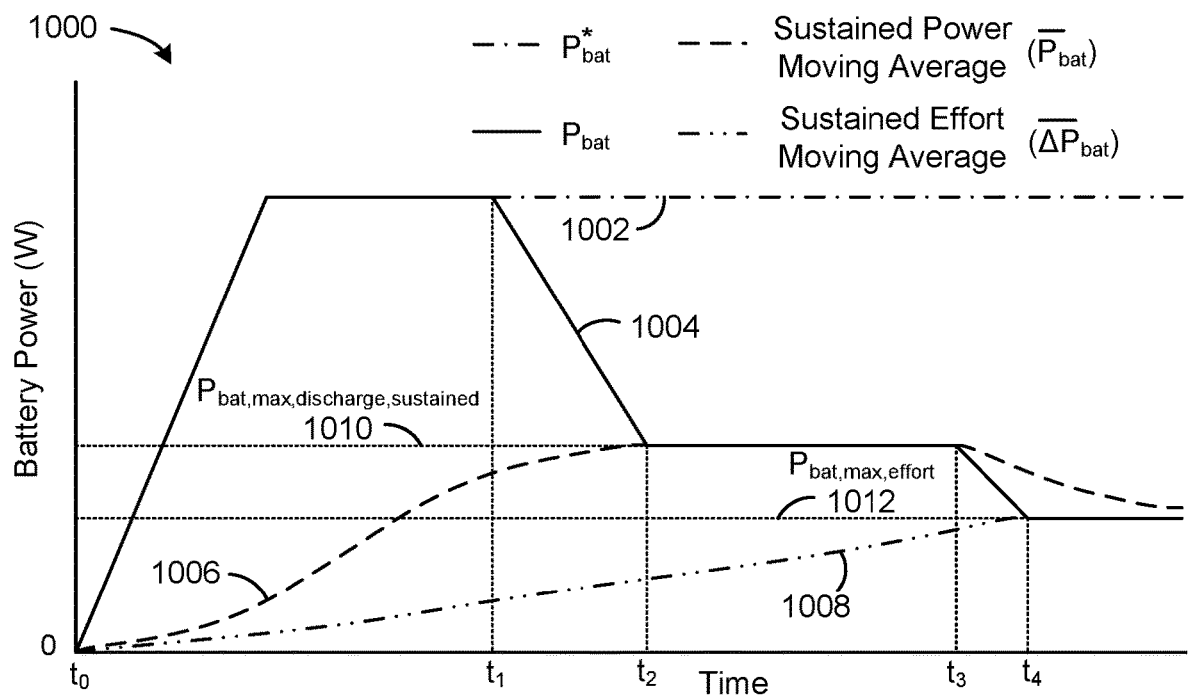
FIG. 10 is a graph illustrating the adjustments to the power signal performed by the maximum sustained effort adjuster of FIG. 5B, according to an exemplary embodiment.

Referring now to FIG. 10, a graph 1000 illustrating the adjustments to the battery power signal $P_{bat}$ performed by maximum sustained power adjuster 526 and maximum sustained effort adjuster 528 is shown, according to an exemplary embodiment. In graph 1000, line 1002 represents the unbounded battery power $P_{bat}^*$, whereas line 1004 represents the battery power signal $P_{bat}$ after being adjusted by maximum sustained power adjuster 526 and maximum sustained effort adjuster 528. Line 1006 represents the sustained power moving average of $P_{bat}$ at each time step k (i.e., $\overline{P}_{bat,k}$) based on the values of $P_{bat}$ within a moving time window that ends at time step k. Line 1008 represents the sustained effort moving average of $\Delta P_{bat}$ at each time step k (i.e., $\overline{\Delta P}_{bat,k}$) based on the values of $P_{bat}$ within a moving time window that ends at time step k. Line 1010 represents the maximum sustained discharging power $P_{bat,max,discharge\_sustained}$ and line 1012 represents the maximum sustained effort $P_{bat,max,effort}$.

Between time $t_0$ and time $t_1$, the battery power signal $P_{bat}$ matches the unbounded battery power $P_{bat}^*$. Both the battery power signal $P_{bat}$ and the unbounded battery power $P_{bat}^*$ are above the maximum sustained discharging power $P_{bat,max,discharge\_sustained}$. The sustained power moving average $\overline{P}_{bat,k}$ is below the maximum sustained discharging power $P_{bat,max,discharge\_sustained}$ but continues to increase with each time step k. As the sustained power moving average $\overline{P}_{bat,k}$ approaches the maximum sustained discharging power $P_{bat,max,discharge\_sustained}$, the sustained power discharge bound $P_{sustained,DishargeBound}$ decreases until it reaches the value of $P_{bat}$ at time $t_1$.

At time $t_1$, maximum sustained power adjuster 526 determines that the value of $P_{bat}$ exceeds the sustained power discharge bound $P_{sustained,DishargeBound}$. Consequently, maximum sustained power adjuster 526 adjusts the battery power signal $P_{bat}$ toward the maximum sustained discharge power $P_{bat,max,discharge}$ sustained at a rate of $\Delta P_{bat,max,discharge}$, which represents the slope of line 904 between time $t_1$ and time $t_2$. The battery power signal $P_{bat}$ and the sustained power discharge bound $P_{sustained,DishargeBound}$ both continue to decrease until they reach the maximum sustained discharge power $P_{bat,max,discharge}$ sustained at time $t_2$.

At time $t_2$, the sustained power moving average $\overline{P}_{bat,k}$ reaches the maximum sustained discharge power $P_{bat,max,discharge\_sustained}$. Accordingly, any value of $P_{bat}$ above maximum sustained discharge power $P_{bat,max,discharge\_sustained}$ would cause the sustained power moving average $\overline{P}_{bat,k}$ to exceed the maximum sustained discharge power $P_{bat,max,discharge\_sustained}$. Thus, maximum sustained power adjuster 526 sets the battery power signal $P_{bat}$ equal to the maximum sustained discharge power $P_{bat,max,discharge\_sustained}$.

At time $t_3$, maximum sustained effort adjuster 528 determines that the value of $P_{bat}$ exceeds the sustained effort bound $E_{sustained,Bound}$. Consequently, maximum sustained effort adjuster 528 adjusts the battery power signal $P_{bat}$ toward the maximum sustained effort $P_{bat,max,effort}$ at a rate of $-\Delta P_{bat,max,discharge}$ which represents the slope of line 1004 between time $t_3$ and time $t_4$. The battery power signal $P_{bat}$ and the sustained effort bound $E_{sustained,Bound}$ both continue to decrease until they reach the maximum sustained effort $P_{bat,max,effort}$ at time $t_4$.

At time $t_4$, the sustained effort moving average $\Delta P_{bat,k}$ reaches the maximum sustained effort $P_{bat,max,effort}$. Accordingly, any further changes in the value of $P_{bat}$ that exceed the maximum sustained effort $P_{bat,max,effort}$ would cause the sustained effort moving average $\overline{\Delta P}_{bat,k}$ to exceed the maximum sustained effort $P_{bat,max,effort}$. Thus, maximum sustained effort adjuster 528 sets the battery power signal $P_{bat}$ equal to the maximum sustained effort $P_{bat,max,effort}$.

Clipping Parameter Optimization Processes

Figure 11:
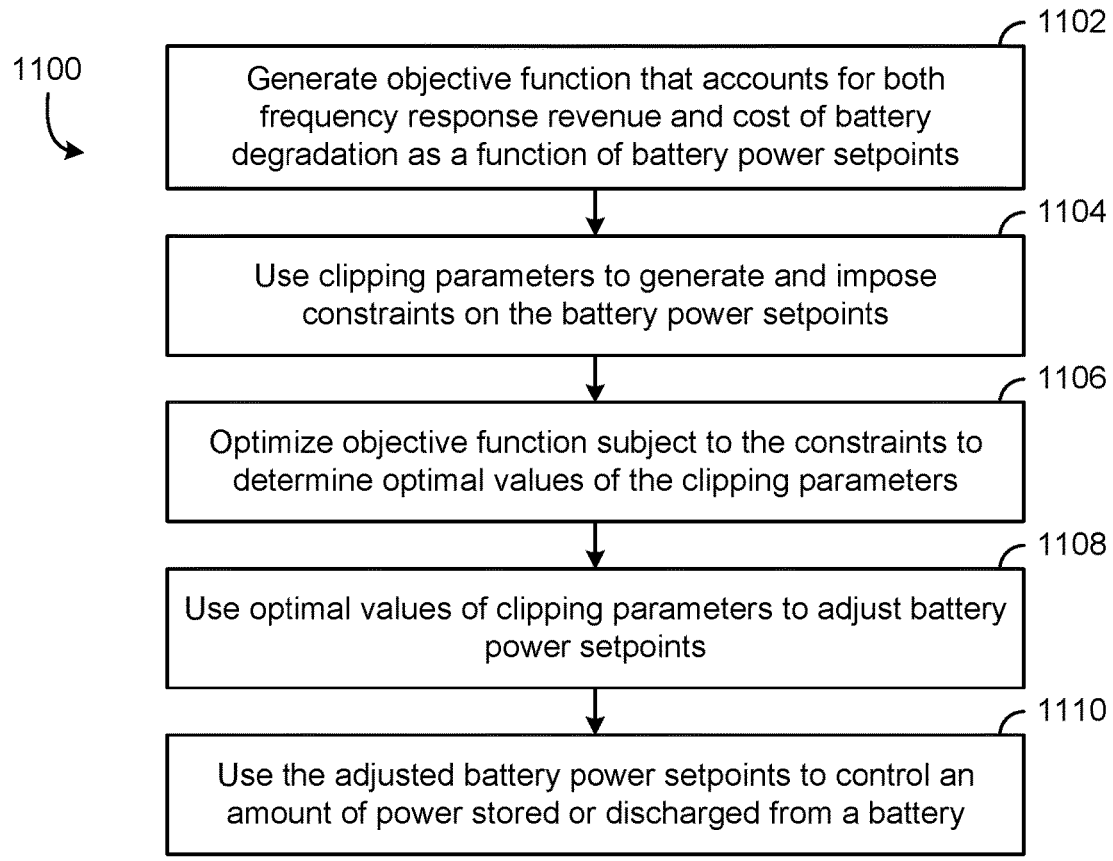
FIG. 11 is a flowchart of a process for controlling an amount of power stored or discharged from a battery in a frequency response control system, according to an exemplary embodiment.

Referring now to FIG. 11, a flowchart of a process 1100 for controlling an amount of power stored or discharged from a battery in a frequency response control system is shown, according to an exemplary embodiment. Process 1100 can be performed by one or more components of frequency response optimization system 100 including, for example, frequency response controller 112 and power inverter 106.

Process 1100 is shown to include generating an objective function that accounts for both frequency response revenue and a cost of battery degradation as a function of battery power setpoints (step 1102). One example of an objective function which can be generated in step 1102 is shown in the following equation:

$$J = \sum_{k=1}^{h}[Reg_{award,k}(CP_{cap} + MR \cdot CP_{perf})]\left[\frac{1}{3}PS_{acc} + \frac{1}{3}PS_{delay} + \frac{1}{3}PS_{prec}\right] - \lambda_{bat,k}$$

where the term $$[Reg_{award,k}(CP_{cap} + MR \cdot CP_{perf})]\left[\frac{1}{3}PS_{acc} + \frac{1}{3}PS_{delay} + \frac{1}{3}PS_{prec}\right]$$

represents the frequency response revenue and $\lambda_{bat,k}$ represents the monetized cost of battery degradation. Both of these terms are functions of the battery power setpoints $P_{bat}$.

As discussed above, the battery power setpoints $P_{bat}$ affect the frequency response $Res_{FR}$ of system 100 and consequently affect how closely the frequency response $Res_{FR}$ tracks the regulation signal $Reg_{signal}$. For example, the frequency response $Res_{FR}$ can be defined as a function of the battery power $P_{bat}$ as shown in the following equation:

$$Res_{FR} = \frac{P_{bat} + P_{campus} - b}{Reg_{award}}$$

The frequency response $Res_{FR}$ can be used to calculate the components of the performance score (i.e., $PS_{acc}$, $PS_{delay}$, and $PS_{prec}$) as described with reference to filter parameters optimizer 426. The frequency response $Res_{FR}$ can also be substituted for $Res_{signal}$ to calculate the monetized cost of battery degradation $\lambda_{bat,k}$ as described with reference to battery degradation estimator 418.

Process 1100 is shown to include using clipping parameters to generate and impose constraints on the battery power setpoints (step 1104). The clipping parameters used in step 1104 may include, for example, a maximum battery charging power parameter $P_{bat,max,charge}$, a maximum battery discharging power parameter $P_{bat,max,discharge}$, a maximum change in charging power parameter $\Delta P_{bat,max,charge}$, a maximum change in discharging power parameter $\Delta P_{bat,max,discharge}$, a maximum sustained charging power parameter $P_{bat,max,charge\_sustained}$, a maximum sustained discharging power parameter $P_{bat,max,discharge\_sustained}$, and/or a maximum sustained effort parameter $P_{bat,max,effort}$.

In some embodiments, the battery power $P_{bat,k}$ is constrained using the maximum battery charging power parameter $P_{bat,max,charge}$ and the maximum battery discharging power parameter $P_{bat,max,discharge}$. For example, the battery power $P_{bat,k}$ can be constrained as follows:

$$P_{bat,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,k}$ is clipped to $P_{bat,max,discharge}$ (i.e., set equal to $P_{bat,max,discharge}$) if the unbounded value of $P_{bat,k}^*$ exceeds $P_{bat,max,discharge}$ and is clipped to $-P_{bat,max,charge}$ (i.e., set equal to $-P_{bat,max,charge}$) if the unbounded value of $P_{bat,k}^*$ is less than $-P_{bat,max,charge}$. However, if the unbounded value of $P_{bat,k}^*$ is between $-P_{bat,max,charge}$ and $P_{bat,max,discharge}$, the value of $P_{bat,k}$ is equal to the unbounded value of $P_{bat,k}^*$.

In some embodiments, the battery power $P_{bat,k}$ is constrained using the maximum change in charging power parameter $\Delta P_{bat,max,charge}$ and the maximum change in discharging power parameter $\Delta P_{bat,max,discharge}$. For example, the battery power $P_{bat,k}$ can be constrained as follows:

if $P_{bat,clip,k} < 0$ (battery is charging)

$P_{bat,k} =$
$$\begin{cases} P_{bat,clip,k} & \text{if } |P_{bat,clip,k} - P_{bat,k-1}| \leq \Delta P_{bat,max,charge} \\ P_{bat,k-1} - \Delta P_{bat,max,charge} & \text{if } P_{bat,k-1} - P_{bat,clip,k} > \Delta P_{bat,max,charge} \\ P_{bat,k-1} + \Delta P_{bat,max,charge} & \text{if } P_{bat,clip,k} - P_{bat,k-1} > \Delta P_{bat,max,charge} \end{cases}$$

elseif $P_{bat,clip,k} > 0$ (battery is discharging)

$P_{bat,k} =$
$$\begin{cases} P_{bat,clip,k} & \text{if } |P_{bat,clip,k} - P_{bat,k-1}| \leq \Delta P_{bat,max,discharge} \\ P_{bat,k-1} - \Delta P_{bat,max,discharge} & \text{if } P_{bat,k-1} - P_{bat,clip,k} > \Delta P_{bat,max,discharge} \\ P_{bat,k-1} + \Delta P_{bat,max,discharge} & \text{if } P_{bat,clip,k} - P_{bat,k-1} > \Delta P_{bat,max,discharge} \end{cases}$$

where the first set of equations constrain the value of $P_{bat,k}$ when $P_{bat,clip,k} < 0$ (i.e., battery 108 is charging) and the second set of equations constrain the value of $P_{bat,k}$ when $P_{bat,clip,k} > 0$ (i.e., battery 108 is discharging).

The first set of constraints specify that the value of $P_{bat}$ cannot increase or decrease by more than $\Delta P_{bat,max,charge}$ between time step k−1 and time step k when battery 108 is charging (i.e., when $P_{bat,clip,k} < 0$). Accordingly, if the clipped battery power $P_{bat,clip,k}$ at time step k is less than the battery power setpoint $P_{bat,k-1}$ at time step k−1 by an amount that exceeds $\Delta P_{bat,max,charge}$ (i.e., $P_{bat,k-1} + P_{bat,clip,k} > \Delta P_{bat,max,charge}$), the battery power setpoint $P_{bat,k}$ at time step k will be set to $P_{bat,k-1} - \Delta P_{bat,max,charge}$. Similarly, if the clipped battery power $P_{bat,clip,k}$ at time step k exceeds the battery power setpoint $P_{bat,k-1}$ at time step k−1 by an amount that exceeds $\Delta P_{bat,max,charge}$ (i.e., $P_{bat,clip,k} - P_{bat,k-1} > \Delta P_{bat,max,charge}$), the battery power setpoint $P_{bat,k}$ at time step k will be set to $P_{bat,k-1} + \Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,charge}$ (i.e., $|P_{bat,clip,k} - P_{bat,k-1}| \leq \Delta P_{bat,max,charge}$), the battery power setpoint $P_{bat,k}$ at time step k will be equal to the clipped battery power $P_{bat,clip,k}$ at time step k.

The second set of constraints specify that the value of $P_{bat}$ cannot increase or decrease by more than $\Delta P_{bat,max,discharge}$ between time step k−1 and time step k when battery 108 is discharging (i.e., when $P_{bat,clip,k} > 0$). Accordingly, if the clipped battery power $P_{bat,clip,k}$ at time step k is less than the battery power setpoint $P_{bat,k-1}$ at time step k−1 by an amount that exceeds $\Delta P_{bat,max,discharge}$ (i.e., $P_{bat,k-1} - P_{bat,clip,k} > \Delta P_{bat,max,discharge}$), the battery power setpoint $P_{bat,k}$ at time step k will be set to $P_{bat,k-1} - \Delta P_{bat,max,discharge}$. Similarly, if the clipped battery power $P_{bat,clip,k}$ at time step k exceeds the battery power setpoint $P_{bat,k-1}$ at time step k−1 by an amount that exceeds $\Delta P_{bat,max,discharge}$ (i.e., $P_{bat,clip,k} - P_{bat,k-1} > \Delta P_{bat,max,discharge}$), the battery power setpoint $P_{bat,k}$ at time step k will be set to $P_{bat,k-1} + \Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,discharge}$ (i.e., $|P_{bat,clip,k} - P_{bat,k-1}| \leq \Delta P_{bat,max,discharge}$), the battery power setpoint $P_{bat,k}$ at time step k will be equal to the clipped battery power $P_{bat,clip,k}$ at time step k.

Still referring to FIG. 11, process 1100 is shown to include optimizing the objective function subject to the constraints to determine optimal values of the clipping parameters (step 1106). In some embodiments, the optimization performed in step 1106 uses the maximum battery charging power parameter $P_{bat,max,charge}$ and the maximum battery discharging power parameter $P_{bat,max,discharge}$ as the variables to be optimized. Larger values $P_{bat,max,charge}$ and $P_{bat,max,discharge}$ result in less clipping of the unbounded battery power $P_{bat,k}^*$ and therefore allow $\text{Res}_{FR}$ to closely track the regulation signal $\text{Reg}_{signal}$. Closely tracking the regulation signal $\text{Reg}_{signal}$ may result in higher performance scores, thereby increasing the frequency response revenue. However, closely tracking the regulation signal may also increase the cost of battery degradation $\lambda_{bat}$.

Conversely, smaller values of $P_{bat,max,charge}$ and $P_{bat,max,discharge}$ result in more clipping of the unbounded battery power $P_{bat,k}^*$ and therefore cause $\text{Res}_{FR}$ to track the regulation signal $\text{Reg}_{signal}$ less closely. Tracking the regulation signal $\text{Reg}_{signal}$ less closely may result in lower performance scores, thereby decreasing the frequency response revenue. However, tracking the regulation signal less closely may also decrease the cost of battery degradation $\lambda_{bat}$. The optimization performed in step 1106 results in values of $P_{bat,max,charge}$ and $P_{bat,max,discharge}$ that represent an optimal tradeoff between frequency response revenue and battery degradation costs (i.e., the frequency response that maximizes the objective function J).

In some embodiments, the optimization performed in step 1106 optimizes both $P_{bat,max,charge}$ and $P_{bat,max,discharge}$ simultaneously. In other words, the optimization may be a multi-variable optimization. However, it is contemplated that the optimization can be a single-variable optimization in other embodiments. For example, $P_{bat,max,charge}$ and $P_{bat,max,discharge}$ can be set equal to each other (i.e., $P_{bat,max,charge} = P_{bat,max,discharge} = P_{bat,max}$) and treated as a single variable in the optimization. Alternatively, either $P_{bat,max,charge}$ or $P_{bat,max,discharge}$ can be omitted from the optimization such that the optimization is performed using only a single optimization variable.

In some embodiments, the optimization performed in step 1106 uses the maximum change in charging power parameter $\Delta P_{bat,max,charge}$ and the maximum change in discharging power parameter $\Delta P_{bat,max,discharge}$ as the variables to be optimized. Larger values $\Delta P_{bat,max,charge}$ and $\Delta P_{bat,max,discharge}$ result in less clipping of the battery power $P_{bat,clip}$ and therefore allow $\text{Res}_{FR}$ to closely track the regulation signal $\text{Reg}_{signal}$. Closely tracking the regulation signal $\text{Reg}_{signal}$ may result in higher performance scores, thereby increasing the frequency response revenue. However, closely tracking the regulation signal may also increase the cost of battery degradation $\lambda_{bat}$.

Conversely, smaller values of $\Delta P_{bat,max,charge}$ and $\Delta P_{bat,max,discharge}$ result in more clipping of the battery power $P_{bat,clip}$ and therefore cause $\text{Res}_{FR}$ to track the regulation signal $\text{Reg}_{signal}$ less closely. Tracking the regulation signal $\text{Reg}_{signal}$ less closely may result in lower performance scores, thereby decreasing the frequency response revenue. However, tracking the regulation signal less closely may also decrease the cost of battery degradation $\lambda_{bat}$. The optimization performed in step 1106 results in values of $\Delta P_{bat,max,charge}$ and $\Delta P_{bat,max,discharge}$ that represent an optimal tradeoff between frequency response revenue and battery degradation costs (i.e., the frequency response that maximizes the objective function J).

In some embodiments, the optimization performed in step 1106 optimizes both $\Delta P_{bat,max,charge}$ and $\Delta P_{bat,max,discharge}$ simultaneously. In other words, the optimization may be a multi-variable optimization. However, it is contemplated that the optimization can be a single-variable optimization in other embodiments. For example, $\Delta P_{bat,max,charge}$ and $\Delta P_{bat,max,discharge}$ can be set equal to each other (i.e., $\Delta P_{bat,max,charge} = \Delta P_{bat,max,discharge} = \Delta P_{bat,max}$) and treated as a single variable in the optimization. Alternatively, either $\Delta P_{bat,max,charge}$ or $\Delta P_{bat,max,discharge}$ can be omitted from the optimization such that the optimization is performed using only a single optimization variable.

The optimization performed in step 1106 may optimize the objective function J using sequential quadratic programming, dynamic programming, or any other optimization technique. The optimal values of $P_{bat,max,charge}$, $P_{bat,max,discharge}$, $P_{bat,max}$, $\Delta P_{bat,max,charge}$, $\Delta P_{bat,max,discharge}$, and/or $\Delta P_{bat,max}$ can be output as clipping parameters to low level controller 314 for use in adjusting the battery power setpoints $P_{bat}$.

Still referring to FIG. 11, process 1100 is shown to include using the optimal values of the clipping parameters to adjust battery power setpoints (step 1108). In some embodiments, step 1108 is performed by low level controller 314. In some embodiments, step 1108 includes applying the optimal clipping parameters $P_{bat,max,charge}$ and $P_{bat,max,discharge}$ to the unbounded power signal $P_{bat}^*$ to generate a clipped power signal $P_{bat,clip}$ as shown in the following equation:

$$P_{bat,clip,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,clip,k}$ is clipped to $P_{bat,max,discharge}$ (i.e., set equal to $P_{bat,max,discharge}$) if the unbounded value of $-P_{bat,k}^*$ exceeds $P_{bat,max,discharge}$ and is clipped to $-P_{bat,max,charge}$ (i.e., set equal to $-P_{bat,max,charge}$) if the unbounded value of $P_{bat,k}^*$ is less than $-P_{bat,max,charge}$. However, if the unbounded value of $P_{bat,k}^*$ is between $-P_{bat,max,charge}$ and $P_{bat,max,discharge}$, the value of $P_{bat,clip,k}$ is equal to the unbounded value of $P_{bat,k}^*$.

In some embodiments, step 1108 includes applying the maximum change in charging power parameter $\Delta P_{bat,max,charge}$ and the maximum change in discharging power parameter $\Delta P_{bat,max,discharge}$ to the clipped power signal $P_{bat,clip}$ as shown in the following equations:

if $P_{bat,clip,k} < 0$ (battery is charging)

$$P_{bat,k} = \begin{cases} P_{bat,clip,k} & \text{if } |P_{bat,clip,k} - P_{bat,k-1}| \leq \Delta P_{bat,max,charge} \\ P_{bat,k-1} - \Delta P_{bat,max,charge} & \text{if } P_{bat,k-1} - P_{bat,clip,k} > \Delta P_{bat,max,charge} \\ P_{bat,k-1} + \Delta P_{bat,max,charge} & \text{if } P_{bat,clip,k} - P_{bat,k-1} > \Delta P_{bat,max,charge} \end{cases}$$

elseif $P_{bat,clip,k} > 0$ (battery is discharging)

$$P_{bat,k} = \begin{cases} P_{bat,clip,k} & \text{if } |P_{bat,clip,k} - P_{bat,k-1}| \leq \Delta P_{bat,max,discharge} \\ P_{bat,k-1} - \Delta P_{bat,max,discharge} & \text{if } P_{bat,k-1} - P_{bat,clip,k} > \Delta P_{bat,max,discharge} \\ P_{bat,k-1} + \Delta P_{bat,max,discharge} & \text{if } P_{bat,clip,k} - P_{bat,k-1} > \Delta P_{bat,max,discharge} \end{cases}$$

where the first set of equations define the value of $P_{bat,k}$ when $P_{bat,clip,k} < 0$ (i.e., battery 108 is charging) and the second set of equations define the value of $P_{bat,k}$ when $P_{bat,clip,k} > 0$ (i.e., battery 108 is discharging).

In some embodiments, step 1108 includes adjusting the battery power signal $P_{bat}$ as described with reference to zero cross adjuster 524 to ensure that the battery power signal $P_{bat}$ crosses zero at approximately the same time (or closer to the same time) as the unbounded battery power $P_{bat}^*$ and/or the regulation signal $Reg_{signal}$. In some embodiments, step 1108 includes adjusting the battery power signal $P_{bat}$ as described with reference to maximum sustained power adjuster 526 and/or maximum sustained effort adjuster 528 to ensure that the moving average of the battery power $P_{bat}$ or change in battery power $\Delta P_{bat}$ does not exceed the maximum sustained power parameters and/or the maximum sustained effort parameters. These and other examples of how the power signal $P_{bat}$ can be adjusted are described in detail with reference to battery power signal clipper 518 and illustrated in FIGS. 6-10.

Still referring to FIG. 11, process 1100 is shown to include using the adjusted battery power setpoints to control an amount of power stored or discharged from a battery (step 1110). For example, the adjusted battery power setpoints $P_{bat,k}$ can be provided as an input to power inverter 106. Power inverter 106 can use the battery power setpoints $P_{bat,k}$ to control the amount of power stored in battery 108 or discharged from battery 108 at each time step k.

Figure 12:
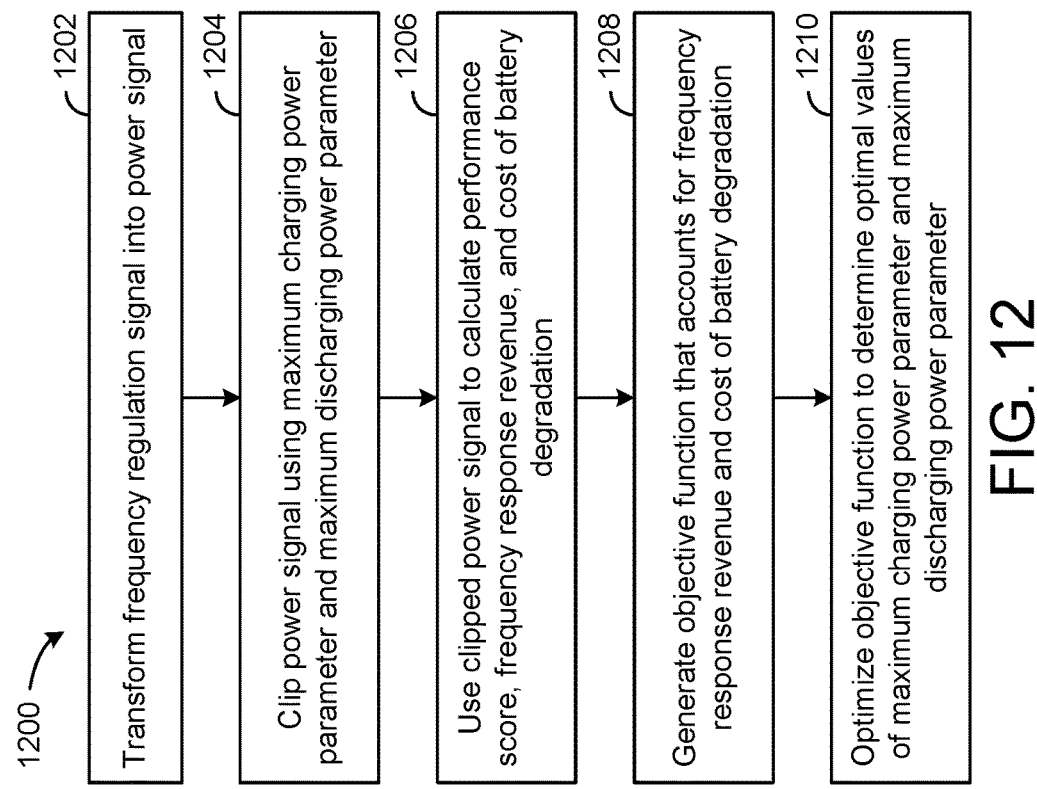
FIG. 12 is a flowchart of a process for generating optimal values of a maximum battery charging power parameter and a maximum battery discharging power parameter, according to an exemplary embodiment.

Referring now to FIG. 12, a flowchart of a process 1200 for generating optimal values of a maximum charging power parameter $P_{bat,max,charge}$ and a maximum discharging power parameter $P_{bat,max,discharge}$ is shown, according to an exemplary embodiment. Process 1200 can be performed by one or more components of frequency response optimization system 100 such as frequency response controller 112. In some embodiments, process 1200 is performed by one or more components of high level controller 312 such as clipping parameters optimizer 428.

Process 1200 is shown to include transforming a frequency regulation signal into a power signal (step 1202). In some embodiments, step 1202 includes calculating a power signal $Power_{signal}$ by multiplying the regulation signal $Reg_{signal}$ by the value of $Reg_{award}$ and adding the midpoint b, as shown in the following equation:

$$Power_{signal} = (Reg_{signal})(Reg_{award}) + b$$

where $Power_{signal}$ is the same as the desired power $P_{POI}^*$ exchanged between POI 110 and energy grid 104, which is the sum of the campus power $P_{campus}$ and the desired battery power $P_{bat}^*$.

In some embodiments, step 1202 includes calculating the desired battery power $P_{bat}^*$ by subtracting $P_{campus}$ from $Power_{signal}$ as shown in the following equation:

$$P_{bat}^* = Power_{signal} - P_{campus}$$

where $P_{bat}^*$ represents the unbounded (i.e., unmodified) battery power before any clipping parameters are applied. The power signal created in step 1202 may be either the power signal $Power_{signal}$ or the unbounded battery power $P_{bat}^*$ in various embodiments.

Process 1200 is shown to include clipping the power signal using the maximum charging power parameter $P_{bat,max,charge}$ and the maximum discharging power parameter $P_{bat,max,discharge}$ (step 1204). Step 1204 may include applying the clipping parameters $P_{bat,max,charge}$ and $P_{bat,max,discharge}$ to the unbounded power signal $P_{bat}^*$ to generate a clipped power signal $P_{bat}$ as shown in the following equation:

$$P_{bat,k} = \begin{cases} P^*_{bat,k} & \text{if } -P_{bat,max,charge} \leq P^*_{bat,k} \leq P_{bat,max,discharge} \\ P_{bat,max,discharge} & \text{if } P^*_{bat,k} > P_{bat,max,discharge} \\ -P_{bat,max,charge} & \text{if } P^*_{bat,k} < -P_{bat,max,charge} \end{cases}$$

such that the value of $P_{bat,k}$ is clipped to $P_{bat,max,discharge}$ (i.e., set equal to $P_{bat,max,discharge}$) if the unbounded value of $P_{bat,k}^*$ exceeds $P_{bat,max,discharge}$ and is clipped to $-P_{bat,max,charge}$ (i.e., set equal to $-P_{bat,max,charge}$) if the unbounded value of $P_{bat,k}^*$ is less than $-P_{bat,max,charge}$. However, if the unbounded value of $P_{bat,k}^*$ is between $-P_{bat,max,charge}$ and $P_{bat,max,discharge}$, the value of $P_{bat,k}$ is equal to the unbounded value of $P_{bat,k}^*$.

Process 1200 is shown to include using the clipped power signal to calculate a performance score, frequency response revenue, and a cost of battery degradation (step 1206). As discussed above, the value of $P_{bat}$ affects the frequency response $\text{Res}_{FR}$ of system 100 and consequently affects how closely the frequency response $\text{Res}_{FR}$ tracks the regulation signal $\text{Reg}_{signal}$. For example, the frequency response $\text{Res}_{FR}$ can be defined as a function of the battery power $P_{bat}$ as shown in the following equation:

$$\text{Res}_{FR} = \frac{P_{bat} + P_{campus} - b}{\text{Reg}_{award}}$$

Step 1206 may include using the frequency response $\text{Res}_{FR}$ to calculate the components of the performance score (i.e., $PS_{acc}$, $PS_{delay}$, and $PS_{prec}$) as described with reference to filter parameters optimizer 426. Step 1206 may include substituting $\text{Res}_{FR}$ for $\text{Res}_{signal}$ to calculate the monetized cost of battery degradation $\lambda_{bat,k}$ as described with reference to battery degradation estimator 418.

Process 1200 is shown to include generating an objective function that accounts for frequency response revenue and the cost of battery degradation (step 1208). One example of an objective function which can be generated in step 1208 is shown in the following equation:

$$J = \sum_{k=1}^{h} \left[ \text{Reg}_{award,k}(CP_{cap} + MR \cdot CP_{perf}) \right] \left[ \frac{1}{3} PS_{acc} + \frac{1}{3} PS_{delay} + \frac{1}{3} PS_{prec} \right] - \lambda_{bat,k}$$

where the term $$\left[ \text{Reg}_{award,k}(CP_{cap} + MR \cdot CP_{perf}) \right] \left[ \frac{1}{3} PS_{acc} + \frac{1}{3} PS_{delay} + \frac{1}{3} PS_{prec} \right]$$

represents the frequency response revenue and $\lambda_{bat,k}$ represents the monetized cost of battery degradation.

Process 1200 is shown to include optimizing the objective function to determine optimal values of the maximum charging power parameter $P_{bat,max,charge}$ and the maximum discharging power parameter $P_{bat,max,discharge}$ (step 1210). In some embodiments, the optimization performed in step 1210 uses the maximum battery charging power parameter $P_{bat,max,charge}$ and the maximum battery discharging power parameter $P_{bat,max,discharge}$ as the variables to be optimized. Larger values $P_{bat,max,charge}$ and $P_{bat,max,discharge}$ result in less clipping of the unbounded battery power $P_{bat,k}^*$ and therefore allow $\text{Res}_{FR}$ to closely track the regulation signal $\text{Reg}_{signal}$. Closely tracking the regulation signal $\text{Reg}_{signal}$ may result in higher performance scores, thereby increasing the frequency response revenue. However, closely tracking the regulation signal may also increase the cost of battery degradation $\lambda_{bat}$.

Conversely, smaller values of $P_{bat,max,charge}$ and $P_{bat,max,discharge}$ result in more clipping of the unbounded battery power $P_{bat,k}^*$ and therefore cause $\text{Res}_{FR}$ to track the regulation signal $\text{Reg}_{signal}$ less closely. Tracking the regulation signal $\text{Reg}_{signal}$ less closely may result in lower performance scores, thereby decreasing the frequency response revenue. However, tracking the regulation signal less closely may also decrease the cost of battery degradation $\lambda_{bat}$. The optimization performed in step 1210 results in values of $P_{bat,max,charge}$ and $P_{bat,max,discharge}$ that represent an optimal tradeoff between frequency response revenue and battery degradation costs (i.e., the frequency response that maximizes the objective function J).

In some embodiments, the optimization performed in step 1210 optimizes both $P_{bat,max,charge}$ and $P_{bat,max,discharge}$ simultaneously. In other words, the optimization may be a multi-variable optimization. However, it is contemplated that the optimization can be a single-variable optimization in other embodiments. For example, $P_{bat,max,charge}$ and $P_{bat,max,discharge}$ can be set equal to each other (i.e., $P_{bat,max,charge} = P_{bat,max,discharge} = P_{bat,max}$) and treated as a single variable in the optimization. Alternatively, either $P_{bat,max,charge}$ or $P_{bat,max,discharge}$ can be omitted from the optimization such that the optimization is performed using only a single optimization variable. The optimization performed in step 1210 may optimize the objective function J using sequential quadratic programming, dynamic programming, or any other optimization technique.

Figure 13:
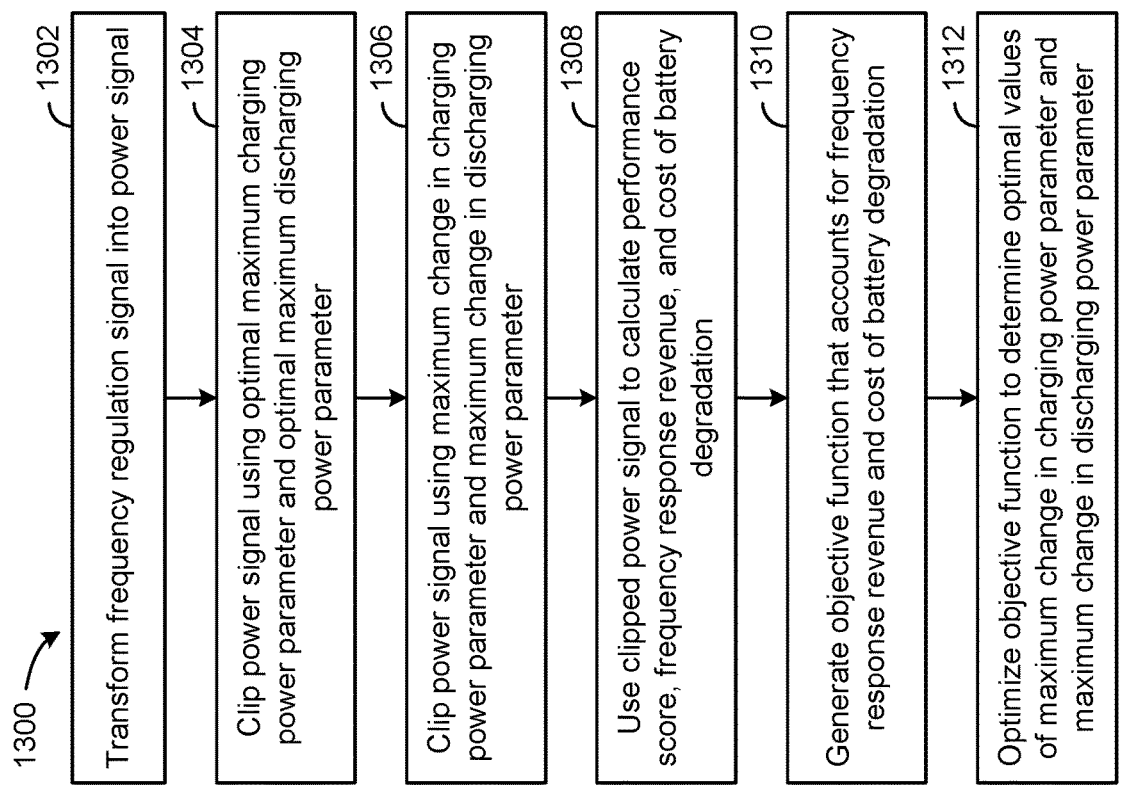
FIG. 13 is a flowchart of a process for generating optimal values of a maximum change in charging power parameter and a maximum change in discharging power parameter, according to an exemplary embodiment.

Referring now to FIG. 13, a flowchart of a process 1300 for generating optimal values of a maximum change in charging power parameter $\Delta P_{bat,max,charge}$ and a maximum change in discharging power parameter $\Delta P_{bat,max,discharge}$ is shown, according to an exemplary embodiment. Process 1300 can be performed by one or more components of frequency response optimization system 100 such as frequency response controller 112. In some embodiments, process 1300 is performed by one or more components of high level controller 312 such as clipping parameters optimizer 428.

Process 1300 is shown to include transforming a frequency regulation signal into a power signal (step 1302). In some embodiments, step 1302 includes calculating a power signal $\text{Power}_{signal}$ by multiplying the regulation signal $\text{Reg}_{signal}$ by the value of $\text{Reg}_{award}$ and adding the midpoint b, as shown in the following equation:

$$\text{Power}_{signal} = (\text{Reg}_{signal})(\text{Reg}_{award}) + b$$

where $\text{Power}_{signal}$ is the same as the desired power $P_{POI}^*$ exchanged between POI 110 and energy grid 104, which is the sum of the campus power $P_{campus}$ and the desired battery power $P_{bat}^*$.

In some embodiments, step 1302 includes calculating the desired battery power $P_{bat}^*$ by subtracting $P_{campus}$ from $\text{Power}_{signal}$ as shown in the following equation:

$$P_{bat}^* = \text{Power}_{signal} - P_{campus}$$

where $P_{bat}^*$ represents the unbounded (i.e., unmodified) battery power before any clipping parameters are applied. The power signal created in step 1302 may be either the power signal $\text{Power}_{signal}$ or the unbounded battery power $P_{bat}^*$ in various embodiments.

Process 1300 is shown to include clipping the power signal using the optimal maximum charging power parameter $P_{bat,max,charge}$ and the optimal maximum discharging power parameter $P_{bat,max,discharge}$ (step 1304). In some embodiments, the optimal values of $P_{bat,max,charge}$ and $P_{bat,max,discharge}$ are generated by performing process 1200. Step 1304 may include applying the optimal clipping parameters $P_{bat,max,charge}$ and $P_{bat,max,discharge}$ to the unbounded power signal $P_{bat}^*$ to generate a clipped power signal $P_{bat,clip}$ as shown in the following equation:

$$P_{bat,clip,k} = \begin{cases} P_{bat,k}^* & \text{if } -P_{bat,max,charge} \leq P_{bat,k}^* \leq P_{bat,max,discharge} \\ P_{bat,max,discharge} & \text{if } P_{bat,k}^* > P_{bat,max,discharge} \\ -P_{bat,max,charge} & \text{if } P_{bat,k}^* < -P_{bat,max,charge} \end{cases}$$

such that the value of $P_{bat,clip,k}$ is clipped to $P_{bat,max,discharge}$ (i.e., set equal to $P_{bat,max,discharge}$) if the unbounded value of $P_{bat,k}^*$ exceeds $P_{bat,max,discharge}$ and is clipped to $-P_{bat,max,charge}$ (i.e., set equal to $-P_{bat,max,charge}$) if the unbounded value of $P_{bat,k}^*$ is less than $-P_{bat,max,charge}$. However, if the unbounded value of $P_{bat,k}^*$ is between $P_{bat,max,charge}$ and $P_{bat,max,discharge}$, the value of $P_{bat,clip,k}$ is equal to the unbounded value of $P_{bat,k}^*$.

Process 1300 is shown to include clipping the power signal using the maximum change in charging power parameter $\Delta P_{bat,max,charge}$ and the maximum change in discharging power parameter $\Delta P_{bat,max,discharge}$ (step 1306). Step 1306 may include applying the maximum change in charging power parameter $\Delta P_{bat,max,charge}$ and the maximum change in discharging power parameter $\Delta P_{bat,max,discharge}$ to the clipped power signal $P_{bat,clip}$ as shown in the following equations:

if $P_{bat,clip,k} < 0$ (battery is charging)

$$P_{bat,k} = \begin{cases} P_{bat,clip,k} & \text{if } |P_{bat,clip,k} - P_{bat,k-1}| \leq \Delta P_{bat,max,charge} \\ P_{bat,k-1} - \Delta P_{bat,max,charge} & \text{if } P_{bat,k-1} - P_{bat,clip,k} > \Delta P_{bat,max,charge} \\ P_{bat,k-1} + \Delta P_{bat,max,charge} & \text{if } P_{bat,clip,k} - P_{bat,k-1} > \Delta P_{bat,max,charge} \end{cases}$$

elseif $P_{bat,clip,k} > 0$ (battery is discharging)

$$P_{bat,k} = \begin{cases} P_{bat,clip,k} & \text{if } |P_{bat,clip,k} - P_{bat,k-1}| \leq \Delta P_{bat,max,discharge} \\ P_{bat,k-1} - \Delta P_{bat,max,discharge} & \text{if } P_{bat,k-1} - P_{bat,clip,k} > \Delta P_{bat,max,discharge} \\ P_{bat,k-1} + \Delta P_{bat,max,discharge} & \text{if } P_{bat,clip,k} - P_{bat,k-1} > \Delta P_{bat,max,discharge} \end{cases}$$

where the first set of equations define the value of $P_{bat,k}$ when $P_{bat,clip,k} < 0$ (i.e., battery 108 is charging) and the second set of equations define the value of $P_{bat,k}$ when $P_{bat,clip,k} > 0$ (i.e. battery 108 is discharging).

The first set of equations specify that the value of $P_{bat}$ cannot increase or decrease by more than $\Delta P_{bat,max,charge}$ between time step k−1 and time step k when battery 108 is charging (i.e., when $P_{bat,clip,k} < 0$). Accordingly, if the clipped battery power $P_{bat,clip,k}$ at time step k is less than the battery power setpoint $P_{bat,k-1}$ at time step k−1 by an amount that exceeds $\Delta P_{bat,max,charge}$ (i.e., $P_{bat,k-1} + P_{bat,clip,k} > \Delta P_{bat,max,charge}$), step 1306 may include setting the battery power setpoint $P_{bat,k}$ at time step k to $P_{bat,k-1} + \Delta P_{bat,max,charge}$. Similarly, if the clipped battery power $P_{bat,clip,k}$ at time step k exceeds the battery power setpoint $P_{bat,k-1}$ at time step k−1 by an amount that exceeds $\Delta P_{bat,max,charge}$ (i.e., $P_{bat,clip,k} - P_{bat,k-1} > \Delta P_{bat,max,charge}$), step 1306 may include setting the battery power setpoint $P_{bat,k}$ at time step k to $P_{bat,k-1} + \Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,charge}$ (i.e., $|P_{bat,clip,k} - P_{bat,k-1}| \leq \Delta P_{bat,max,charge}$), step 1306 may include setting the battery power setpoint $P_{bat,k}$ at time step k equal to the clipped battery power $P_{bat,clip,k}$ at time step k.

The second set of equations specify that the value of $P_{bat}$ cannot increase or decrease by more than $\Delta P_{bat,max,discharge}$ between time step k−1 and time step k when battery 108 is discharging (i.e., when $P_{bat,clip,k} > 0$). Accordingly, if the clipped battery power $P_{bat,clip,k}$ at time step k is less than the battery power setpoint $P_{bat,k-1}$ at time step k−1 by an amount that exceeds $\Delta P_{bat,max,discharge}$ (i.e., $P_{bat,k-1} - P_{bat,clip,k} > \Delta P_{bat,max,discharge}$), step 1306 may include setting the battery power setpoint $P_{bat,k}$ at time step k to $P_{bat,k-1} + \Delta P_{bat,max,discharge}$. Similarly, if the clipped battery power $P_{bat,clip,k}$ at time step k exceeds the battery power setpoint $P_{bat,k-1}$ at time step k−1 by an amount that exceeds $\Delta P_{bat,max,discharge}$ (i.e., $P_{bat,clip,k} - P_{bat,k-1} > \Delta P_{bat,max,discharge}$), step 1306 may include setting the battery power setpoint $P_{bat,k}$ at time step k to $P_{bat,k-1} + \Delta P_{bat,max,charge}$. However, if the absolute value of the difference between the clipped battery power $P_{bat,clip,k}$ at time step k and the battery power setpoint $P_{bat,k-1}$ at time step k−1 is less than or equal to $\Delta P_{bat,max,discharge}$ (i.e., $|P_{bat,clip,k} - P_{bat,k-1}| \leq \Delta P_{bat,max,discharge}$), step 1306 may include setting the battery power setpoint $P_{bat,k}$ at time step k equal to the clipped battery power $P_{bat,clip,k}$ at time step k.

Process 1300 is shown to include using the clipped power signal to calculate a performance score, frequency response revenue, and a cost of battery degradation (step 1308). As discussed above, the value of $P_{bat}$ affects the frequency response $Res_{FR}$ of system 100 and consequently affects how closely the frequency response $Res_{FR}$ tracks the regulation signal $Reg_{signal}$. For example, the frequency response $Res_{FR}$ can be defined as a function of the battery power $P_{bat}$ as shown in the following equation:

$$Res_{FR} = \frac{P_{bat} + P_{campus} - b}{Reg_{award}}$$

Step 1308 may include using the frequency response $Res_{FR}$ to calculate the components of the performance score (i.e., $PS_{acc}$, $PS_{delay}$, and $PS_{prec}$) as described with reference to filter parameters optimizer 426. Step 1308 may include substituting $Res_{FR}$ for $Res_{signal}$ to calculate the monetized cost of battery degradation $\lambda_{bat,k}$ as described with reference to battery degradation estimator 418.

Process 1300 is shown to include generating an objective function that accounts for frequency response revenue and the cost of battery degradation (step 1310). One example of an objective function which can be generated in step 1310 is shown in the following equation:

$$J = \sum_{k=1}^{h} [Reg_{award,k}(CP_{cap} + MR \cdot CP_{perf})]\left[\frac{1}{3}PS_{acc} + \frac{1}{3}PS_{delay} + \frac{1}{3}PS_{prec}\right] - \lambda_{bat,k}$$

where the term $$[Reg_{award,k}(CP_{cap} + MR \cdot CP_{perf})]\left[\frac{1}{3}PS_{acc} + \frac{1}{3}PS_{delay} + \frac{1}{3}PS_{prec}\right]$$

represents the frequency response revenue and $\lambda_{bat,k}$ represents the monetized cost of battery degradation.

Process 1300 is shown to include optimizing the objective function to determine optimal values of the maximum change in charging power parameter $\Delta P_{bat,max,charge}$ and the maximum change in discharging power parameter $\Delta P_{bat,max,discharge}$ (step 1312). In some embodiments, the optimization performed in step 1312 uses the maximum change in charging power parameter $\Delta P_{bat,max,charge}$ and the maximum change in discharging power parameter $\Delta P_{bat,max,discharge}$ as the variables to be optimized. Larger values $\Delta P_{bat,max,charge}$ and $\Delta P_{bat,max,discharge}$ result in less clipping of the battery power $P_{bat,clip}$ and therefore allow $Res_{FR}$ to closely track the regulation signal $Reg_{signal}$. Closely tracking the regulation signal $Reg_{signal}$ may result in higher performance scores, thereby increasing the frequency response revenue. However, closely tracking the regulation signal may also increase the cost of battery degradation $\lambda_{bat}$.

Conversely, smaller values of $\Delta P_{bat,max,charge}$ and $\Delta P_{bat,max,discharge}$ result in more clipping of the battery power $P_{bat,clip}$ and therefore cause $Res_{FR}$ to track the regulation signal $Reg_{signal}$ less closely. Tracking the regulation signal $Reg_{signal}$ less closely may result in lower performance scores, thereby decreasing the frequency response revenue. However, tracking the regulation signal less closely may also decrease the cost of battery degradation $\lambda_{bat}$. The optimization performed in step 1312 results in values of $\Delta P_{bat,max,charge}$ and $\Delta P_{bat,max,discharge}$ that represent an optimal tradeoff between frequency response revenue and battery degradation costs (i.e., the frequency response that maximizes the objective function J).

In some embodiments, the optimization performed in step 1312 optimizes both $\Delta P_{bat,max,charge}$ and $\Delta P_{bat,max,discharge}$ simultaneously. In other words, the optimization may be a multi-variable optimization. However, it is contemplated that the optimization can be a single-variable optimization in other embodiments. For example, $\Delta P_{bat,max,charge}$ and $\Delta P_{bat,max,discharge}$ can be set equal to each other (i.e., $\Delta P_{bat,max,charge} = \Delta P_{bat,max,discharge} = \Delta P_{bat,max}$) and treated as a single variable in the optimization. Alternatively, either $\Delta P_{bat,max,charge}$ or $\Delta P_{bat,max,discharge}$ can be omitted from the optimization such that the optimization is performed using only a single optimization variable. The optimization performed in step 1312 may optimize the objective function J using sequential quadratic programming, dynamic programming, or any other optimization technique.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A frequency response control system comprising:
   a battery configured to store and discharge electric power;
   a power inverter configured to control an amount of the electric power stored or discharged from the battery at each of a plurality of time steps during a frequency response period; and
   a frequency response controller comprising:
     a high level controller configured to generate values of clipping parameters by performing an optimization of an objective function, the values of the clipping parameters generated as a result of the optimization and comprising a maximum allowable change in a rate at which the power is stored in the battery or discharged from the battery between consecutive time steps; and
     a low level controller configured to use the maximum allowable change in the rate at which the power is stored in the battery or discharged in the battery between consecutive time steps to modify battery power setpoints;

wherein the power inverter is configured to use the modified battery power setpoints to control the amount of the electric power stored or discharged from the battery.

2. The frequency response control system of claim 1, wherein the optimization is performed by:
generating the objective function, wherein the objective function accounts for both frequency response revenue and a cost of battery degradation as a function of the battery power setpoints modified by the clipping parameters; and
optimizing the objective function to generate the values of the clipping parameters.

3. The frequency response control system of claim 1, wherein the clipping parameters comprise at least one of:
a battery charging power parameter that defines a maximum allowable rate at which the electric power can be stored in the battery; or
a battery discharging power parameter that defines a maximum allowable rate at which the electric power can be discharged from the battery.

4. The frequency response control system of claim 3, wherein using the values of the clipping parameters to modify the battery power setpoints comprises:
comparing a battery power setpoint to the battery charging power parameter and the battery discharging power parameter;
setting the battery power setpoint equal to the battery charging power parameter in response to a determination that the battery power setpoint would cause the battery to charge at a rate that violates the battery charging power parameter; and
setting the battery power setpoint equal to the battery discharging power parameter in response to a determination that the battery power setpoint would cause the battery to discharge at a rate that violates the battery discharging power parameter.

5. The frequency response control system of claim 1, wherein the clipping parameters comprise at least one of:
a change in charging power parameter that defines the maximum allowable change in the rate at which the power is stored in the battery between consecutive time steps; or
a change in discharging power parameter that defines the maximum allowable change in the rate at which the power is discharged from the battery between consecutive time steps.

6. The frequency response control system of claim 5, wherein using the values of the clipping parameters to modify the battery power setpoints comprises:
calculating a difference between a first battery power setpoint for a first time step and a second battery power setpoint for a second time step consecutive with the first time step;
comparing the difference to the change in charging power parameter; and
setting the second battery power setpoint equal to the first battery power setpoint plus or minus the change in charging power parameter in response to a determination that the difference exceeds the change in charging power parameter.

7. The frequency response control system of claim 5, wherein using the values of the clipping parameters to modify the battery power setpoints comprises:

calculating a difference between a first battery power setpoint for a first time step and a second battery power setpoint for a second time step consecutive with the first time step;
comparing the difference to the change in discharging power parameter; and
setting the second battery power setpoint equal to the first battery power setpoint plus or minus the change in discharging power parameter in response to a determination that the difference exceeds the change in discharging power parameter.

8. The frequency response control system of claim 1, wherein the frequency response controller is configured to:
receive a frequency regulation signal from an incentive provider;
transform the frequency regulation signal into a power signal comprising a time series of the battery power setpoints.

9. The frequency response control system of claim 8, wherein the frequency response controller is configured to adjust the modified battery power setpoints to reduce a delay between:
a first time at which the frequency regulation signal or the power signal has a value of zero; and
a second time at which the modified battery power setpoints have a value of zero.

10. The frequency response control system of claim 9, wherein adjusting the modified battery power setpoints comprises:
predicting a number of time steps between a current time step and a future time step at which the frequency regulation signal or the power signal has a value of zero;
setting a zero cross bound based on the predicted number of time steps and a maximum allowable change in the modified battery power setpoints between consecutive time steps; and
causing the modified battery power setpoints to begin approaching zero in response to a determination that a modified battery power setpoint for the current time step is outside the zero cross bound.

11. The frequency response control system of claim 1, wherein the power inverter is configured to use the modified battery power setpoints to control the amount of electric power stored or discharged from the battery by:
comparing at least one of (i) a battery power setpoint or (ii) a difference between the battery power setpoint and a previous battery power setpoint to a threshold based on the values of the clipping parameters;
adjusting the battery power setpoint in response to a determination that the battery power setpoint or the difference violates the threshold.

12. A method for controlling an amount of electric power stored or discharged from a battery in a frequency response control system, the method comprising:
operating a high level controller to generate values of clipping parameters by performing an optimization of on objective function, the values of the clipping parameters being decision variables of the optimization and generated as a result of the optimization and comprising at least one of (i) a maximum allowable rate at which power is stored in the battery or discharged from the battery or (ii) a maximum allowable change in a rate at which the power is stored in the battery or discharged from the battery between consecutive time steps;
providing at least one of (i) the maximum allowable rate at which the power is stored in the battery or discharged from the battery or (ii) the maximum allowable change in the rate at which the power is stored in the battery or discharged from the battery between consecutive time steps from the high level controller to a low level controller;

operating the low level controller to modify battery power setpoints using at least one of (i) the maximum allowable rate at which the power is stored in the battery or discharged from the battery or (ii) the maximum allowable change in the rate at which the power is stored in the battery or discharged from the battery between consecutive time steps; and using the modified battery power setpoints to control the amount of the electric power stored or discharged from the battery.

13. The method of claim 12, wherein the optimization is performed by:

generating the objective function, wherein the objective function accounts for both frequency response revenue and a cost of battery degradation as a function of the battery power setpoints modified by the clipping parameters; and optimizing the objective function to generate the values of the clipping parameters.

14. The method of claim 12, wherein the clipping parameters comprise at least one of:

a battery charging power parameter that defines a maximum allowable rate at which the electric power can be stored in the battery; or a battery discharging power parameter that defines a maximum allowable rate at which the electric power can be discharged from the battery.

15. The method of claim 14, wherein using the values of the clipping parameters to modify the battery power setpoints comprises:

comparing a battery power setpoint to the battery charging power parameter and the battery discharging power parameter;

setting the battery power setpoint equal to the battery charging power parameter in response to a determination that the battery power setpoint would cause the battery to charge at a rate that violates the battery charging power parameter; and setting the battery power setpoint equal to the battery discharging power parameter in response to a determination that the battery power setpoint would cause the battery to discharge at a rate that violates the battery discharging power parameter.

16. The method of claim 12, wherein the clipping parameters comprise at least one of:

a change in charging power parameter that defines a maximum change in the amount of electric power stored in the battery between consecutive time steps; or a change in discharging power parameter that defines a maximum change in the amount of electric power discharged from the battery between consecutive time steps.

17. The method of claim 16, wherein using the values of the clipping parameters to modify the battery power setpoints comprises:

calculating a difference between a first battery power setpoint for a first time step and a second battery power setpoint for a second time step consecutive with the first time step;

comparing the difference to the change in charging power parameter; and setting the second battery power setpoint equal to the first battery power setpoint plus or minus the change in charging power parameter in response to a determination that the difference exceeds the change in charging power parameter.

18. The method of claim 16, wherein using the values of the clipping parameters to modify the battery power setpoints comprises:

calculating a difference between a first battery power setpoint for a first time step and a second battery power setpoint for a second time step consecutive with the first time step;

comparing the difference to the change in discharging power parameter; and setting the second battery power setpoint equal to the first battery power setpoint plus or minus the change in discharging power parameter in response to a determination that the difference exceeds the change in discharging power parameter.

19. The method of claim 12, further comprising:

receiving a frequency regulation signal from an incentive provider;

transforming the frequency regulation signal into a power signal comprising a time series of the battery power setpoints.

20. The method of claim 19, further comprising adjusting the modified battery power setpoints to reduce a delay between:

a first time at which the frequency regulation signal or the power signal has a value of zero; and a second time at which the modified battery power setpoints have a value of zero;

wherein adjusting the modified battery power setpoints comprises:

predicting a number of time steps between a current time step and a future time step at which the frequency regulation signal or the power signal has a value of zero;

setting a zero cross bound based on the predicted number of time steps and a maximum allowable change in the modified battery power setpoints between consecutive time steps; and causing the modified battery power setpoints to begin approaching zero in response to a determination that a modified battery power setpoint for the current time step is outside the zero cross bound.

21. A multi-building management system comprising:

building equipment that operate to affect a variable state or condition within one or more buildings;

a battery configured to store and discharge electric power for use in powering at least one of the building equipment or the one or more buildings;

a power inverter configured to control an amount of the electric power stored or discharged from the battery at each of a plurality of time steps during a frequency response period; and a frequency response controller comprising:

a high level controller configured to generate values of clipping parameters by performing an optimization of an objective function, the values of the clipping parameters generated as a result of the optimization and comprising a maximum allowable change in a rate at which the power is stored in the battery or discharged from the battery between consecutive time steps; and a low level controller configured to use the maximum allowable change in the rate at which the power is stored in the battery or discharged in the battery between consecutive time steps to modify battery power setpoints;

wherein the power inverter is configured to use the modified battery power setpoints to control the amount of the electric power stored or discharged from the battery.

* * * * *